United States Patent
Huwer et al.

(10) Patent No.: US 11,422,235 B2
(45) Date of Patent: Aug. 23, 2022

(54) OPTICAL DEVICE

(71) Applicant: Kabushiki Kaisha Toshiba, Minato-ku (JP)

(72) Inventors: Jan Huwer, Cambridge (GB); Richard Mark Stevenson, Cambridge (GB); Taofiq Paraiso, Cambridge (GB); Andrew James Shields, Cambridge (GB); Joanna Krystyna Skiba-Szymanska, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 457 days.

(21) Appl. No.: 16/678,328

(22) Filed: Nov. 8, 2019

(65) Prior Publication Data
US 2020/0150240 A1    May 14, 2020

(30) Foreign Application Priority Data
Nov. 9, 2018  (GB) .................... 1818318

(51) Int. Cl.
*H04B 10/00* (2013.01)
*G01S 7/481* (2006.01)
(Continued)

(52) U.S. Cl.
CPC .......... *G01S 7/4814* (2013.01); *G02B 6/4201* (2013.01); *H04B 10/503* (2013.01); *H04B 10/70* (2013.01)

(58) Field of Classification Search
CPC ...... H04B 10/40; H04B 10/50; H04B 10/503; G02F 1/292; G02F 1/2955
See application file for complete search history.

(56) References Cited

U.S. PATENT DOCUMENTS 5,233,673 A * 8/1993 Vali .................... G02F 1/2955
385/27
2007/0248136 A1  10/2007 Leonardo et al.
(Continued)

FOREIGN PATENT DOCUMENTS

| CN | 103457155 A | 12/2013 |
|---|---|---|
| GB | 2525399 A | 10/2015 |

(Continued)

OTHER PUBLICATIONS

Jie Sun, et al. "Large-scale nanophotonic phased array." Nature 493.7431, Jan. 10, 2013, 6 pages.
(Continued)

*Primary Examiner* — Daniel G Dobson
(74) *Attorney, Agent, or Firm* — Oblon, McClelland, Maier & Neustadt, L.L.P.

(57) ABSTRACT

An optical device includes a first semiconductor substrate, a reference laser configured to generate coherent light, a plurality of first optical components, a plurality of second optical components, one or more first controllers configured to apply phase control signals to said plurality of first optical components to apply a phase shift, and one or more second controllers configured to apply pulse control signals to said plurality of second optical components such that a light pulse is outputted during a period of time that coherent light is received. The relative phase between emitted light pulses from the plurality of second optical components is controlled by the relative phase shifts applied by the one or more first controllers.

20 Claims, 36 Drawing Sheets

(51) Int. Cl.
  *G02B 6/42* (2006.01)
  *H04B 10/50* (2013.01)
  *H04B 10/70* (2013.01)
  *H04J 14/00* (2006.01)

(56) References Cited

U.S. PATENT DOCUMENTS

| | | | |
|---|---|---|---|
| 2014/0192394 | A1 | 7/2014 | Sun et al. |
| 2016/0139266 | A1 | 5/2016 | Montoya et al. |
| 2019/0004393 | A1 | 1/2019 | Hashiya et al. |
| 2019/0391243 | A1* | 12/2019 | Nicolaescu ........... G01S 17/931 |
| 2021/0252640 | A1* | 8/2021 | Feldmann .......... B23K 26/0626 |

FOREIGN PATENT DOCUMENTS

| | | |
|---|---|---|
| GB | 2529228 A | 2/2016 |
| GB | 2540589 A | 1/2017 |
| GB | 2537821 B | 4/2017 |
| JP | 6-504633 A | 5/1994 |
| JP | 2016-1868 A | 1/2016 |
| JP | 2016-508235 A | 3/2016 |
| JP | 2017-3688 A | 1/2017 |
| KR | 10-2004-0022533 A | 3/2004 |
| WO | WO 97/30527 A1 | 8/1997 |
| WO | WO 2017/145706 A1 | 8/2017 |
| WO | WO 2018/061514 A1 | 4/2018 |
| WO | WO 2018/160729 A2 | 9/2018 |

OTHER PUBLICATIONS

Firooz Aflatouni, et al. "Nanophotonic projection system." Optics Express 23.16, 2015, pp. 21012-21022.

Keyvan Sayyah, et al., "Two-dimensional pseudo-random optical phased array based on tandem optical injection locking of vertical cavity surface emitting lasers", Optics Express 23, 2015, pp. 19405-19416.

Slawomir Piatek, "Lidar and Other Techniques", Hamamatsu, https://www.hamamatsu.com/sp/hc/osh/lidar_webinar_12.6.17.pdf.

Japanese Office Action dated Feb. 9, 2021 in Japanese Patent Application No. 2019-200082 (with English translation), 17 pages.

Examination Report dated Mar. 31, 2022 in corresponding GB Application No. 1818318.6.

* cited by examiner

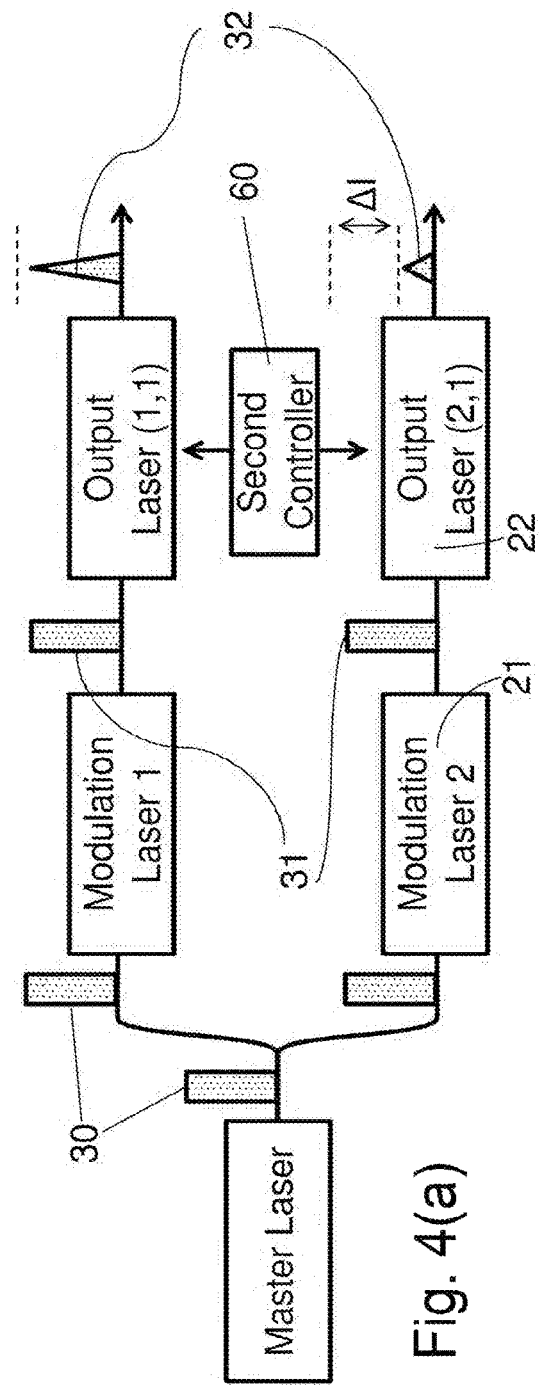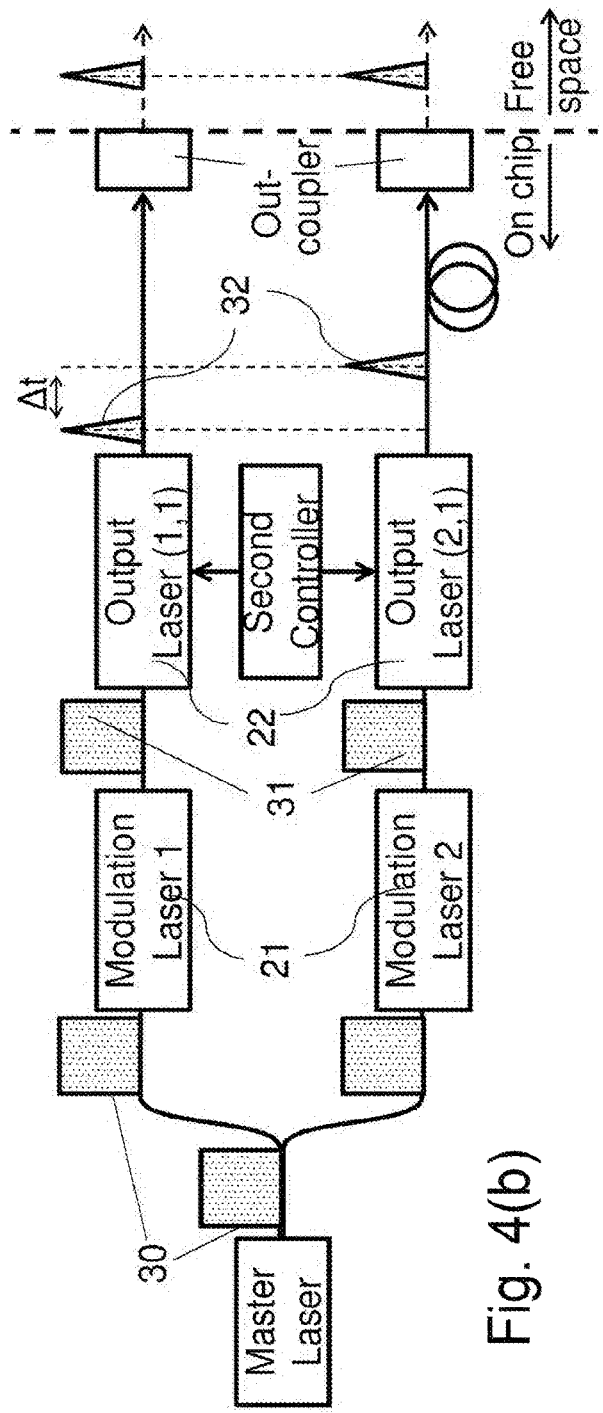
Fig. 4(a)
Fig. 4(b)

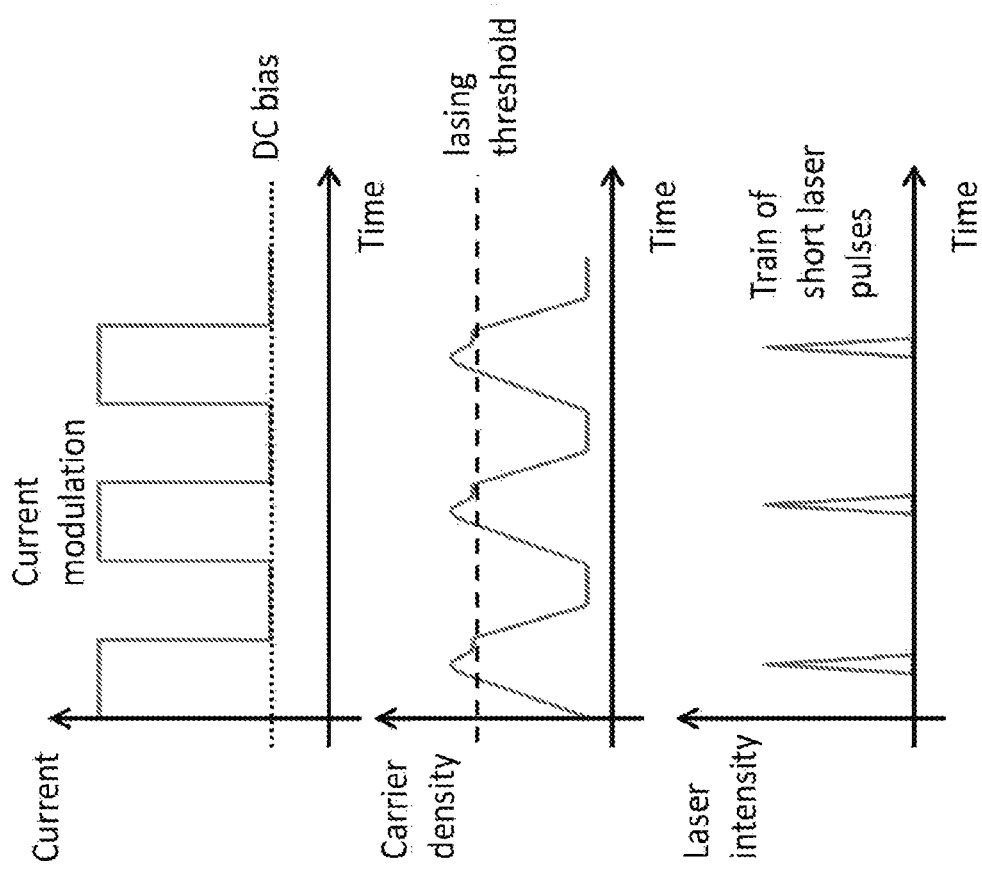
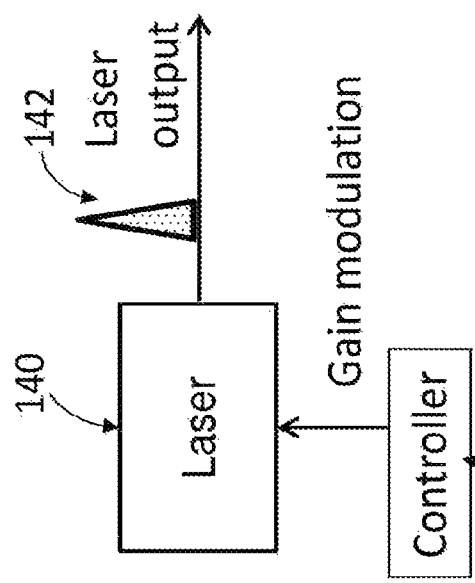
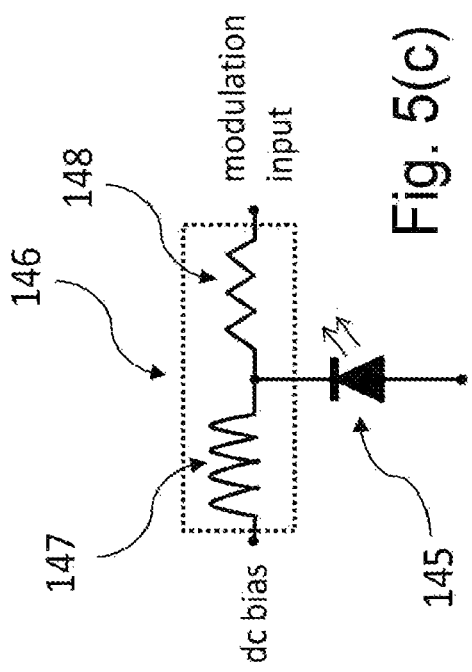

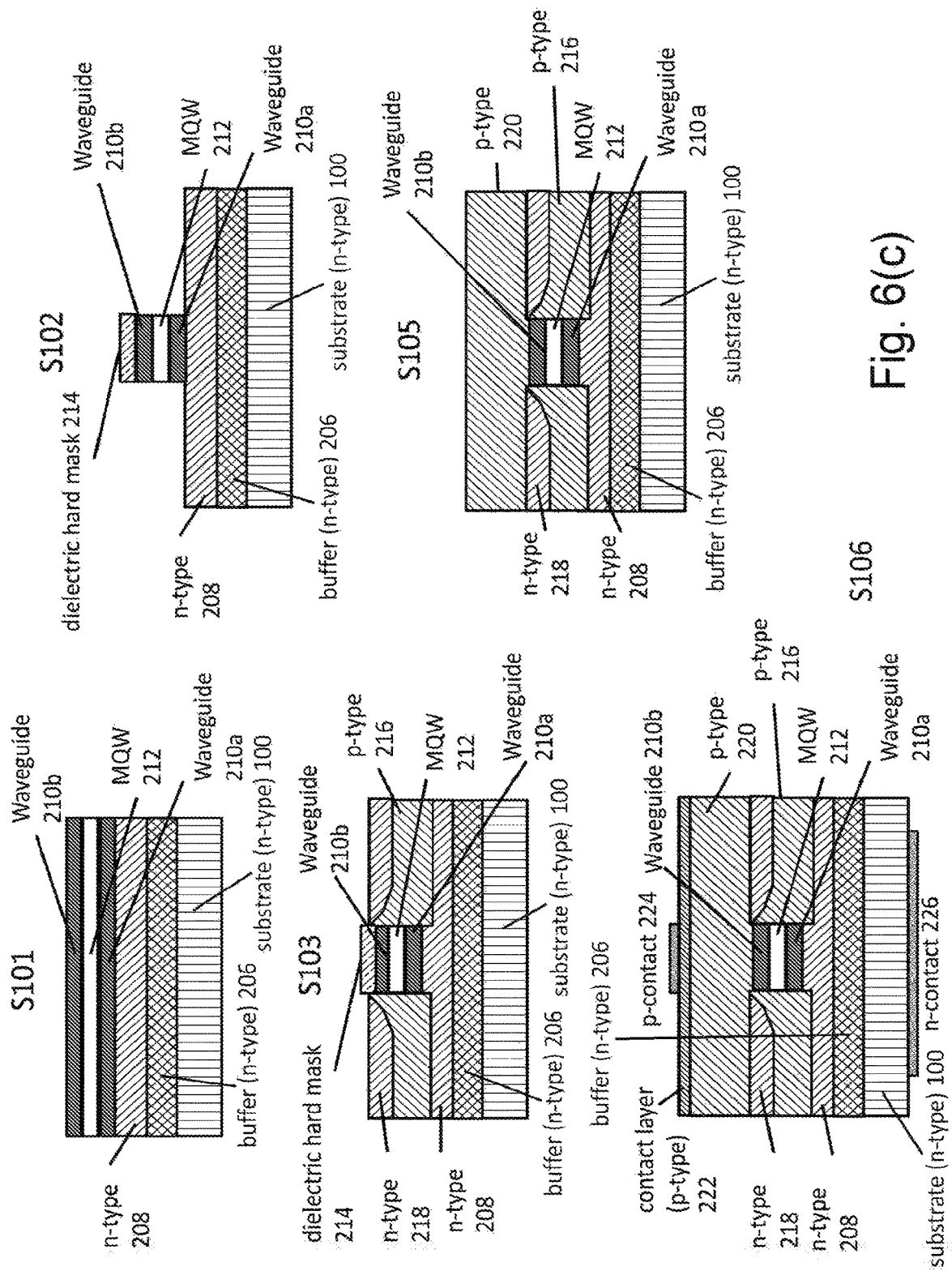

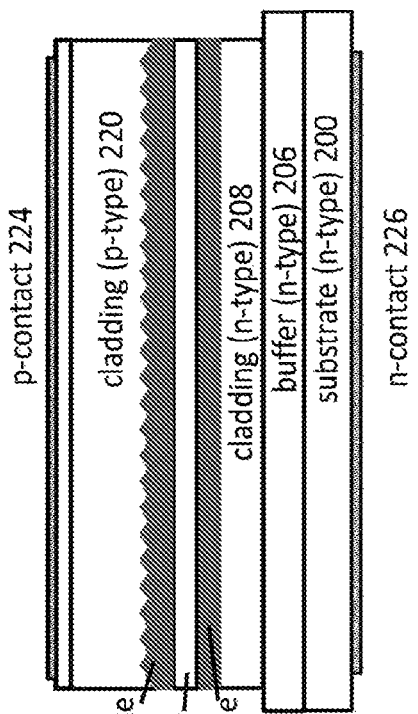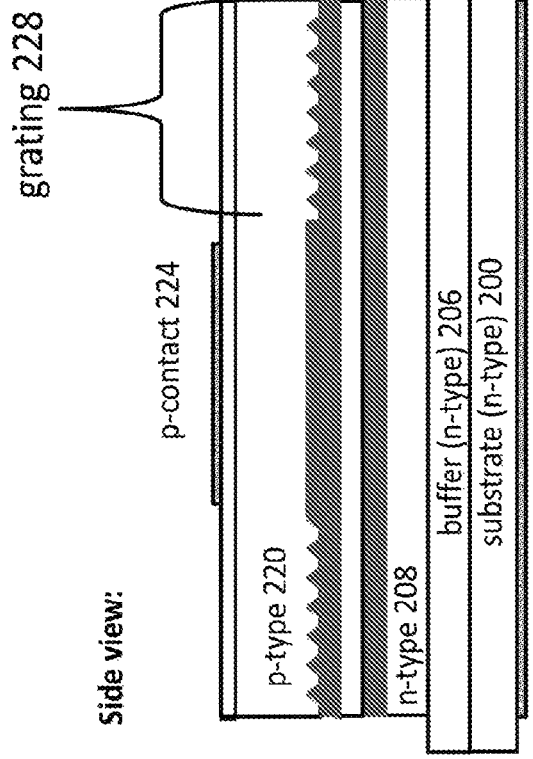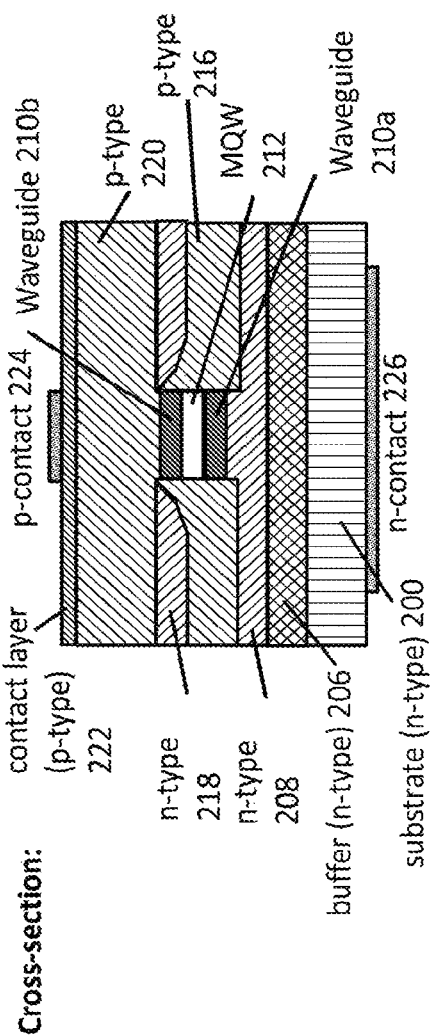
Fig. 7(a)
Fig. 7(b)
Fig. 7(c)

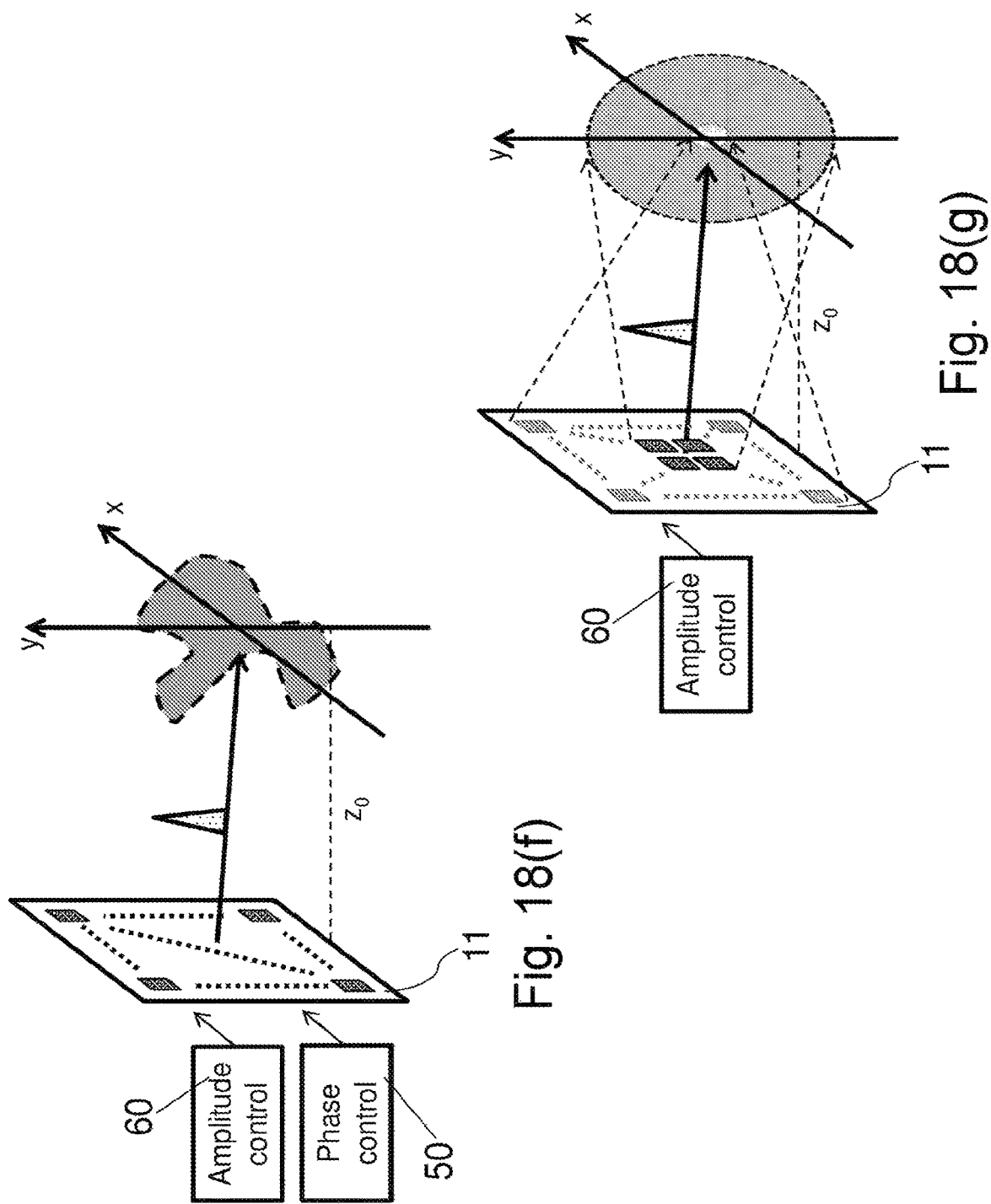

OPTICAL DEVICE

CROSS-REFERENCE TO RELATED APPLICATIONS

This application is based upon and claims the benefit of priority from prior United Kingdom Application number GB1818318.6 filed on 9 Nov. 2018, the entire contents of which are incorporated herein by reference.

FIELD

Embodiments described herein relate to optical devices, methods of operating optical devices and methods of fabricating optical devices.

BACKGROUND

Optical phased arrays use control of the phase of light emitted from a two-dimensional surface to steer the direction of an emitted light beam. Optical phased arrays have utility in various applications, for example LIDAR (Light Detection and Ranging).

Optical phased arrays also have utility in, for example, quantum key distribution (QKD). QKD is a technique which results in the sharing of cryptographic keys between two parties; a transmitter, often referred to as "Alice", and a receiver, often referred to as "Bob". The attraction of this technique is that it provides a test of whether any part of the key can be known to an unauthorised eavesdropper, often referred to as "Eve". In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

There is a continuing need to improve the fabrication of optical phased arrays. There is furthermore a continuing need to improve reliability and compactness of optical phased arrays.

BRIEF DESCRIPTION OF FIGURES

Systems and methods in accordance with non-limiting examples will now be described with reference to the accompanying figures in which:

FIG. 1 (*b*) is a schematic illustration of an optical array containing 36 elements.

FIG. 3 (*c*) shows the current applied to a modulation laser.

FIG. 3 (*d*) shows the current applied to a modulation laser to obtain a phase shift by using pulses of fixed time durations but different amplitudes.

FIG. 3 (*e*) shows the current applied to a modulation laser to obtain a phase shift by using pulses of different time durations but fixed amplitudes.

FIG. 4 (*b*) is a schematic illustration of an arrangement for controlling the emission time of the output light pulses by controlling the output lasers with a second controller.

FIG. 4 (*c*) shows the current applied to an output laser.

FIG. 4 (*d*) shows the current applied to an output laser, where some pulses have been omitted or attenuated.

FIG. 4 (*e*) shows the light pulses output by an output laser when the driving current shown in FIG. 4 (*d*) is applied.

FIG. 5 (*a*) is a schematic illustration of a gain switched laser.

FIG. 5(*b*) shows the driving current signal waveform (upper), the carrier density variation (middle) and the output laser intensity (lower) of a gain switched laser.

FIG. 5 (*c*) is a schematic illustration of an electrical driving circuit for a semiconductor laser.

FIG. 6(*b*) is a flow chart of a method of growth and fabrication of monolithically integrated coherent light sources in accordance with an embodiment.

FIG. 6 (*c*) shows the device after selected steps of the fabrication process of FIG. 6 (*b*) for a device having a DFB laser.

FIG. 6 (*d*) shows the device after selected steps of the fabrication process of FIG. 6 (*b*) for a device having a stripe laser.

FIG. 7 (*a*) shows the structure of an optical device in accordance with an embodiment, in which the laser is a DBR laser.

FIG. 7 (*b*) shows the structure of an optical device in accordance with an embodiment, in which the laser is a DFB laser.

FIG. 7 (*c*) shows the cross-section of the structure of an optical device in accordance with the embodiments of FIG. 7(*a*) and FIG. 7(*b*).

FIG. 9 (*b*) shows the structure of a device after selected steps of the process of FIG. 9 (*a*), for an optical device having DFB lasers.

FIG. 11 (*b*) shows the structure of a device after selected steps of the process of FIG. 11 (*a*).

FIG. 14 (b) shows a schematic illustration of an out-coupling element used for operation at 1550 nm.

FIG. 16 (b) shows a schematic illustration of an array of out-coupling elements arranged in a random 2D m×n array.

FIG. 18 (b) shows a schematic illustration of the position of the far field illuminated spot being randomly scanned over the field of view by a pre-defined pattern.

FIG. 18 (c) shows the intensity of the far-field pattern across the x axis direction.

FIG. 18 (d) shows the schematic illustration of two adjacent out-couplers separated by a distance d and the conditions for constructive interference.

FIG. 18 (e) shows an operation mode which may be used to control the scanning in a LIDAR system for example.

FIG. 18 (f) shows amplitude and phase control for all pixels, enabling the generation of custom illumination patterns instead of a single spot.

FIG. 18 (g) shows how the size of the far-field illuminated spot is varied by controlling the intensity of individual pixels in the array.

FIG. 22 (b) shows an example QKD transmitter comprising the optical array operating in QKD mode.

FIG. 22 (c) is a schematic illustration of a QKD system according to an embodiment, where the QKD system comprises the optical array and a receiver.

DETAILED DESCRIPTION

Figure 1A:
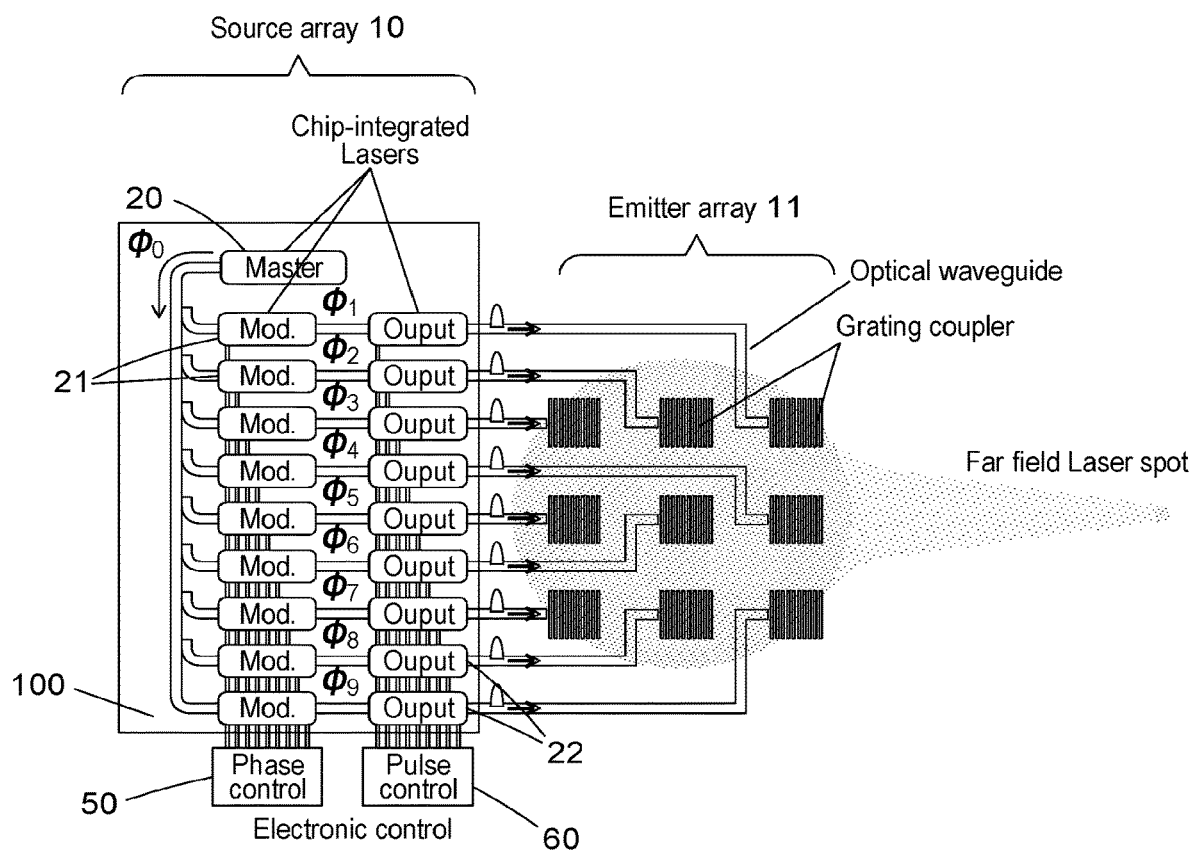
FIG. 1 (*a*) is a schematic illustration of an optical device comprising an optical array for generating a plurality of coherent light pulses on an integrated chip and an emitter array for emitting light from a chip to the far-field.

According to one example, there is provided an optical device, comprising: a first semiconductor substrate; a reference laser, configured to generate coherent light; a plurality of first optical components, wherein the reference laser is optically coupled to the plurality of first optical components, wherein each of the plurality of first optical components is configured to output coherent light during a period of time that coherent light from the reference laser is received; a plurality of second optical components, the second optical components configured to produce optical intensity modulation, wherein each of the plurality of first optical components is optically coupled to at least one corresponding second optical component; wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier; one or more first controllers, configured to apply phase control signals to said plurality of first optical components to apply a phase shift; one or more second controllers, configured to apply pulse control signals to said plurality of second optical components such that a light pulse is outputted during a period of time that coherent light is received, the relative phase between emitted light pulses from the plurality of second optical components being controlled by the relative phase shifts applied by the one or more first controllers; wherein the reference laser, plurality of first optical components and plurality of second optical components are integrated laterally on the semiconductor substrate in the plane parallel to the surface of the substrate.

According to another example, the one or more second controllers are further configured to modify said pulse control signal to vary the intensity of the emitted light pulses.

According to another example, the first semiconductor substrate comprises InP.

According to one example, the optical device according further comprises a 2 dimensional array of optical out-couplers, optically connected to the plurality of second optical components, wherein the optical out-couplers are configured to output light in a direction having a component perpendicular to the surface of the first substrate.

In one example, the out-couplers comprise optical grating regions.

In one example, the out-couplers comprise waveguides having a first section aligned in the plane parallel to the surface of the substrate and curving to form a second section aligned in a direction perpendicular to the surface of the first substrate.

According to one example, the out-couplers are integrated on the first semiconductor substrate.

In one example, the out-couplers are integrated on a second semiconductor substrate.

In one example the optical out-couplers are arranged in a random array.

In one example the optical out-couplers are arranged in a regular array.

In one example, the phase control signals comprise electrical signals.

In one example, the intensity of the emitted light pulses is modulated at frequencies greater than or equal to 1 GHz.

In one example, the position of the far-field light emitted from the device is controlled by the phase control signals.

In another example, the size of the far-field light pattern emitted from the device is controlled by varying the intensity of the emitted light pulses.

In one example, the shape of the far-field light pattern emitted from the device is controlled by the phase control signals.

According to another example, there is provided a system comprising the optical device, and further comprising a detector unit configured to detect reflected light from an object, and means to determine the distance of the object from the detection. In one example, the system is a LiDAR system.

According to another example, there is provided a quantum communication system comprising the optical device.

According to another example, there is provided a method of fabricating an optical device, comprising the steps of:

forming a reference laser, configured to generate coherent light, a plurality of first optical components, wherein the reference laser is optically coupled to the plurality of first optical components and a plurality of second optical components, the second optical components configured to produce optical intensity modulation, wherein each of the plurality of first optical components is optically coupled to at least one corresponding second optical component, wherein the reference laser, plurality of first optical components and plurality of second optical components are integrated laterally on the semiconductor substrate in the plane parallel to the surface of the substrate, wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier;

electrically contacting first electrodes to the first optical components, wherein the first electrodes are connected to one or more first controllers, configured to apply phase control signals to said plurality of first optical components to apply a phase shift and to control the first optical components such that each of the plurality of first optical components is configured to output coherent light during a period of time that coherent light from the reference laser is received; and electrically contacting second electrodes to the second optical components, wherein the second electrodes are connected to one or more second controllers, configured to apply pulse control signals to said plurality of second optical components such that a light pulse is outputted during a period of time that coherent light is received, the relative phase between the emitted light pulses from the plurality of second optical components being controlled by the relative phase shifts applied by the one or more first controllers.

According to another example, there is provided a method of operating an optical device, comprising:

generating coherent light at a reference laser;

supplying said coherent light to a plurality of first optical components;

applying phase control signals to said plurality of first optical components to apply a phase shift;

outputting coherent light from each of the plurality of first optical components during a period of time that coherent light from the reference laser is received;

supplying said coherent light from each of the plurality of first optical components to at least one corresponding second optical component configured to produce optical intensity modulation;

applying pulse control signals to said plurality of second optical components such that a light pulse is outputted during a period of time that coherent light is received, the relative phase between the emitted light pulses from the plurality of second optical components being controlled by the relative phase shifts applied by the one or more first controllers;

wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier; and wherein the reference laser, plurality of first optical components and plurality of second optical components are integrated laterally on a first semiconductor substrate in the plane parallel to the surface of the substrate.

In a further example, the method of operating the optical device further comprises encoding information in the phase between two light pulses emitted in different time periods by applying the phase control signals.

FIG. 1 (a) is a schematic illustration of an optical device in accordance with an example. The optical device comprises an optical array 10. The optical array 10 is an optical phased array. The optical array 10 is a source array.

The optical array 10 comprises a first semiconductor substrate 100. A reference laser 20 is integrated on the semiconductor substrate 100, and is configured to generate coherent light.

A plurality of first optical components 21 are also integrated onto the semiconductor substrate 100, and are optically coupled to the reference laser 20. In this example, the first optical components 21 are first lasers, also referred to as modulation lasers. Each of the plurality of first optical components 21 is configured to output coherent light during a period of time that the coherent light from the reference laser 20 is received, as will be described below.

A plurality of second optical components 22 are also integrated onto the semiconductor substrate 100. The second optical components 22 are configured to produce optical intensity modulation. In this example, the second optical components are second lasers, also referred to as output lasers. Each of the plurality of first optical components 21 is optically coupled to a corresponding second optical component 22.

A first controller 50 is configured to apply phase control signals to the plurality of first optical components 21 to apply a phase shift. A second controller 60 is configured to apply pulse control signals to the plurality of second optical components 22 such that at least one light pulse is emitted during a period of time that the coherent light is received.

The relative phase between the emitted light pulses from the plurality of second optical components 22 is controlled by the relative phase shifts applied by the first controller 50. The reference laser 20 injection locks the modulation lasers together, providing a single phase reference. The phase difference between the light emitted from the output lasers 22 therefore depends only on the phase shift applied by the phase control element (first controller 50), as well as any path length difference. Any path length difference (including the path length between the elements and any phase difference introduced by variation in timing of emission) can be accounted for in the phase shift applied by the first controller 50, such that the phase difference between the light emitted from the output lasers 22 is determined by the first controller 50.

The reference laser 20, plurality of first optical components 21 and plurality of second optical components 22 are integrated laterally on the semiconductor substrate 100 in the plane parallel to the surface of the substrate. The optical connections are made by sections of optical waveguide integrated into the chip as will be described in further detail in relation to the fabrication processes described below. The optical components together with the substrate form a planar waveguide circuit. The array is an in-plane integrated array. As will be explained in detail below, such an array may be fabricated using top-down fabrication techniques. The light is emitted from each of the master laser 20, modulation lasers 21 and output lasers 22 in the in-plane direction.

The array is an optically interconnected laser array network where the lasers and optical interconnects lie in the same plane. A reference laser 20 is optically connected to M modulation lasers 21, where M is greater than or equal to 2. Each modulation laser 21 is optically connected to $O_M$ output lasers, where $O_M$ is greater than or equal to 1. In this case, $O_M$ is equal to 1, however the modulation lasers 21 may alternatively be coupled to more than one output laser 22. The phase of all the lasers are injection locked relative to reference laser 20, as will be described below. Phase control means, comprising the first controller 50, is configured to set the relative phase between all output lasers 22, by applying phase shifts to the modulation lasers 21.

Figure 1B:
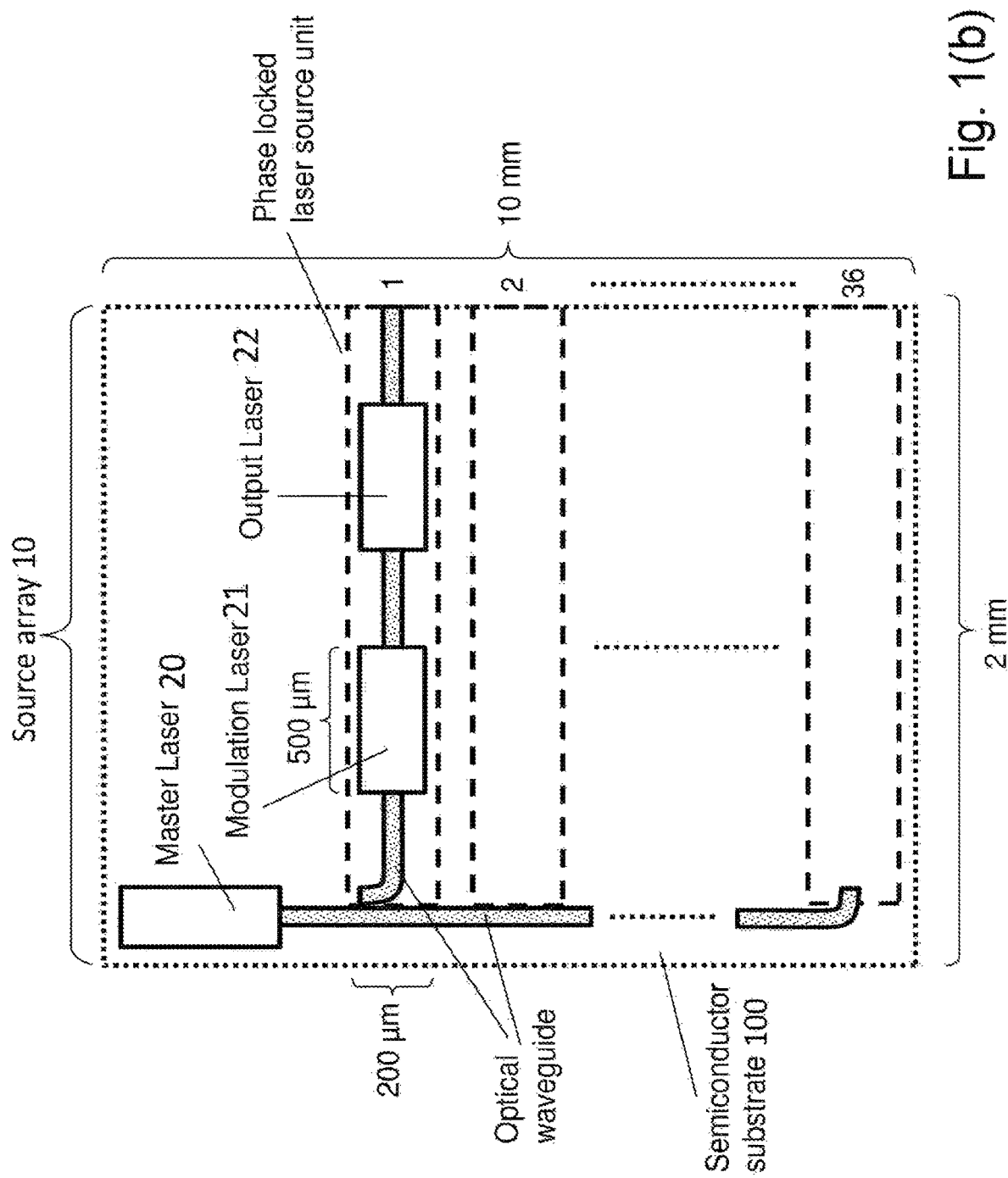

FIG. 1(b) is a schematic illustration of a source array 10 with M=36 and $O_M$=1. In this example, the source array substrate has a size of 10 mm×2 mm. The modulation laser 21 is approximately 500 μm×200 μm. According to one example, the size of the optical device comprising the source array 10 and the emitter array 11 is 10 mm×10 mm.

The reference laser 20 (also referred to as the master laser) is a semiconductor laser diode. The reference laser 20 generates coherent light, in other words light with a constant relative phase. It is to be understood that in practice, light generated by a laser is not perfectly coherent. However, a laser is considered to be a coherent light source because the generated light has a high level of coherence. The semiconductor laser diode 20 may comprise layers configured to confine the generated light, and may be a distributed feedback laser or a ridge laser for example. The structure and fabrication of the lasers will be described in more detail below.

The master laser 20 may be a gain-switched semiconductor laser. FIG. 5(a) shows a schematic illustration of a gain-switched semiconductor laser 140. A gain-switched laser generates light when the laser is switched above the lasing threshold and generates almost no light when the laser is switched below the lasing threshold. A controller 141 controls modulation of the gain of the laser by modification of the pump power, in a time varying manner. The laser is pumped electrically, by applying a current. In order to modulate the gain of a semiconductor laser, the controller 141 modulates the current applied to the laser.

The reference laser 20 may thus be periodically switched above and below the lasing threshold by application of a time varying current. For example, a controller (not shown) may be connected to the reference laser 20 to modulate the gain of the master laser 20, by applying a current through an electrical connection. In this manner, the master laser 20 generates light pulses. The controller (not shown) comprises a driving circuit which applies a time varying current such that the master laser 20 is switched periodically above the lasing threshold, generating light pulses. The current applied to the master laser 20 has the form of a series of current modulation pulses. The master laser 20 outputs light when the carrier density is above the lasing threshold.

FIG. 5(b) shows three graphs illustrating a gain modulation of a semiconductor gain-switched laser. The upper graph shows the current applied to the laser on the vertical axis, with time on the horizontal axis. The DC bias is indicated by a horizontal dotted line. The current applied to the laser has the form of a series of current modulation pulses. The wave is a square-type waveform. In this case, the current is not reduced to zero in between the current modulation pulses, but only reduced to a bias value (which is indicated by the dotted line).

The current modulation signal is applied to the laser and switches the gain of the laser above and below the lasing threshold periodically. The second graph shows the carrier density of the laser on the vertical axis, against time on the horizontal axis. The lasing threshold is indicated by a dashed horizontal line. When a current modulation pulse is applied to the laser, the injected carriers increase the carrier density and the photon density increases. The rapid increase of the photon density causes a decrease in the carrier density. This in turn decreases the photon density, which increases the carrier density. When the current modulation pulse switches back down to the DC bias level, and the laser emission dies off.

The laser output generated by the modulation signal is shown in the lower graph. The vertical axis shows the laser intensity, with time on the horizontal axis. The laser outputs light when the carrier density is above the lasing threshold. Photons generated by spontaneous emission inside the laser cavity are amplified sufficiently by stimulated emission to generate an output signal. The length of the delay between the application of the current modulation pulse and the generation of the output light depends on several parameters, such as the laser type, cavity length and pumping power.

FIG. 5(c) shows a schematic illustration of an electrical driving circuit for a semiconductor gain-switched laser diode 145. The cathode of laser diode 145 is connected to bias-T 146 comprising inductor 147 and resistor or capacitor 148. Via inductor 147 a DC bias current is sent through the laser diode. This provides the gain bias (the minimum level of the current indicated by the dotted line in FIG. 5(b)). Via resistor or capacitor 148 an AC modulation current is sent through the laser diode, providing the gain modulation needed for gain-switching the laser above and below the lasing threshold. In this case, the modulation input to the bias-T 146 is provided by controller 141.

The master laser 20 generates long light pulses. To generate long pulses, the gain bias is chosen to be closer to the lasing threshold. This means that the carrier density crosses the lasing threshold earlier, which gives the light pulse more time to evolve. Initially the light intensity will overshoot and quickly reduce the carrier density. This in turn causes the photon density to decrease and the carrier density to increase, in turn increasing the light intensity. This competing process causes oscillations of the light intensity at the beginning of the pulse which are strongly damped, leading quickly to a steady-state where the intensity is constant. The oscillations are called relaxation oscillations. The laser pulse ends when the current pulse ends and switches the current to the bias value again. The duration of each of the long light pulses may be greater than or equal to 200 ps, or may be greater than or equal to 100 ps for example.

Alternatively, the master laser 20 may be operated in continuous wave mode. In continuous wave mode, a constant current signal is applied, with an amplitude above the lasing threshold. The laser continuously outputs light.

Figure 2:
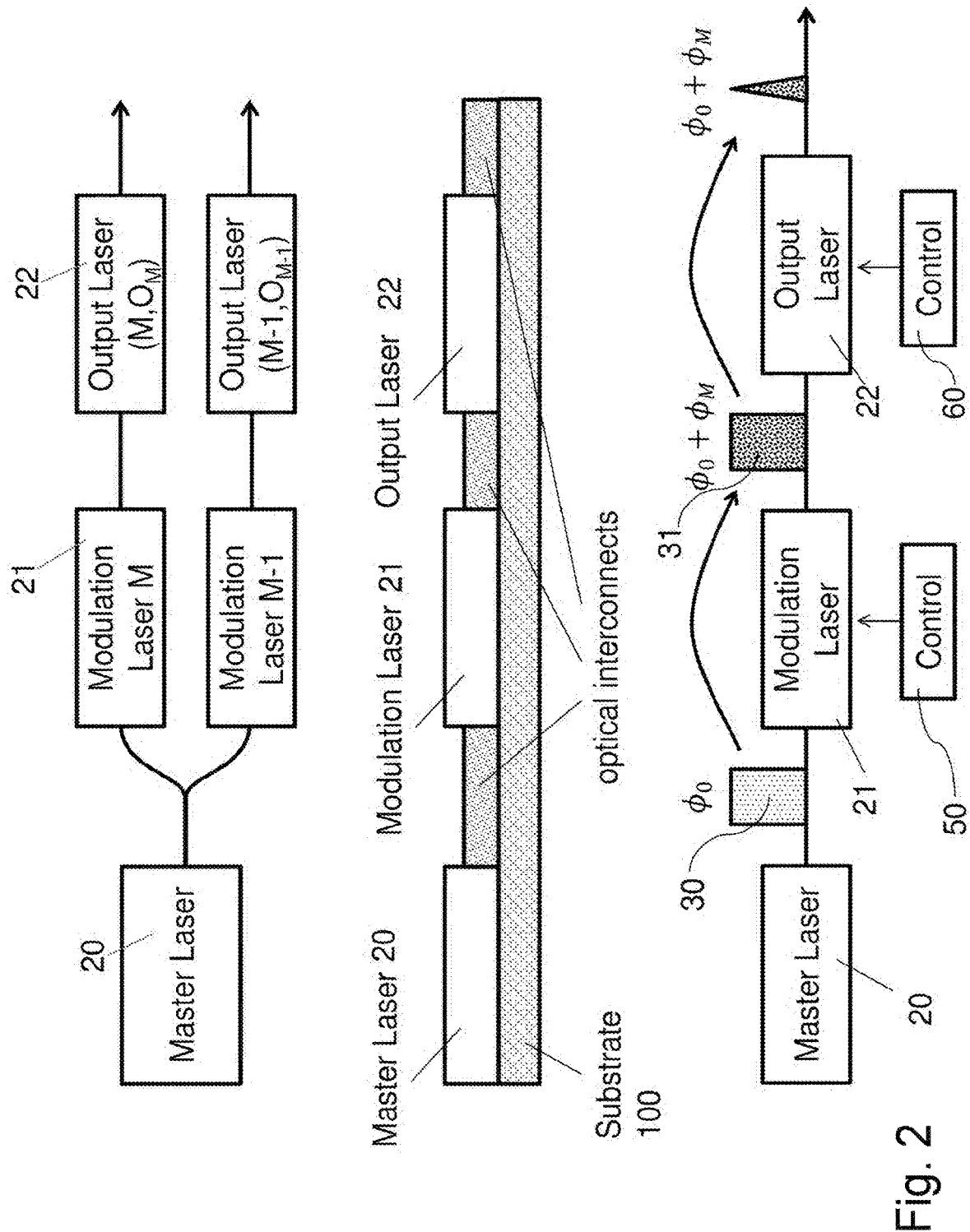
FIG. 2 is a schematic illustration of an arrangement for providing coherent light pulses that are phase and intensity modulated.

FIG. 2 shows an example coupling between the master laser 20, first lasers 21 and second lasers 22. Only two first lasers 21 and second lasers 22 are shown in the figure for illustration, however as is clear from FIG. 1, further first lasers 21 and second lasers 22 may be connected in the same manner. Each of the first lasers 21 is referred to as a modulation laser 21, and each of the second lasers 22 is referred to as an output laser 22.

The output of the master laser 20 is injected into a plurality of waveguides, each coupled to a modulation laser 21. The master laser 20 is coupled to an output waveguide. One or more couplers connect the output waveguide to the plurality of waveguides coupled to the modulation lasers 21. The couplers may be based on evanescent coupling, where two waveguides run close to each other such that there is spatial overlap of the evanescent tails of the optical fields confined in both waveguides, resulting in transfer of optical energy from one waveguide to another. The amount of optical energy transferred is set by the geometry of the coupler. A 1:M coupler is used, where M is the number of modulation lasers 21. The 1:M coupler may be comprised of multiple asymmetric 1:2 couplers. In this example, as shown in FIG. 1 (a) the source array 10 comprises a plurality of asymmetric 1:2 couplers connected in series. Each coupler directs a fraction of the light to a waveguide coupled to a single modulation laser 21. The splitting ratio at each coupler is set such that the same amount of light is transferred to each modulation laser 21. Using asymmetric splitters coupled in series may provide a compact design.

Alternatively, the output of the master laser 20 is injected into an output waveguide, the output waveguide being connected to a multimode interference (MMI) coupler. The MMI coupler is configured to do 1:M splitting. The MMI is configured such that light input into the MMI interferes with itself and is guided towards M output waveguides, with each output waveguide containing the same amount of energy. Each output waveguide is coupled to a modulation laser 21.

Alternatively, the output of the master laser 20 is injected into an output waveguide, the output waveguide being connected to a cascade of 1:N couplers, where N<M. In the first stage of the cascade, the 1:N coupler directs light from the input waveguide towards N output waveguides, each carrying the same optical energy. In the second stage of the cascade, each output waveguide from the first stage is directed towards a further N output waveguides by a 1:N coupler, such that $N^2$ outputs are available. In the same manner, further stages can be added to the cascade such that at least M outputs are available. The outputs are then coupled to the modulation lasers 21.

Alternatively, the output of the master laser 20 is injected into an output waveguide, the output waveguide being connected to a cascade of 1:2 Mach-Zehnder Interferometer (MZI) couplers. The cascade would operate in the same way as described above for the 1:N coupler. In another example, the power splitting ratio of each MZI could be dynamically adjusted, for example by including a phase modulator in one arm of the MZI.

The modulation lasers 21 are also semiconductor laser diodes. The modulation lasers 21 also generate coherent light. The modulation lasers 21 may be distributed feedback lasers or ridge lasers for example, and the structure and fabrication of the lasers will be described in more detail below.

The modulation lasers 21 may be periodically switched above and below the lasing threshold by application of a time varying current. For example, the first controller 50 is connected to each modulation laser 21 to modulate the gain of the modulation laser 21, by applying a current through an electrical connection. In this manner, the modulation lasers 21 generate long light pulses. The first controller 50 comprises a driving circuit which applies a time varying current to each modulation laser 21 such that the modulation laser 21 is switched periodically above the lasing threshold, generating long light pulses in the same manner as described above in relation to the master laser 20. The duration of each of the long light pulses may be greater than or equal to 200 ps, or may be greater than or equal to 100 ps for example.

The first controller 50 is connected to each modulation laser 21 via electrical contacts at the modulation lasers 21. A vertical or lateral p-n junction may be formed at each modulation laser 21, as will be described in relation to the fabrication process described below. An electrical signal is applied by the first controller across the junction in order to gain switch the modulation lasers 21. The same gain switch signal may be applied to each modulation laser 21. An additional phase control signal may be added to the gain switch signal as will be described in more detail below. The phase control signal may be varied between the lasers 21.

Light from the modulation lasers 21 is generated by injection seeding (also referred to as laser seeding or coherence seeding). During operation of the modulation laser 21 without injection of light from the master laser 20 (i.e. without coherence seeding), when the modulation laser 21 is switched above the lasing threshold a light pulse is initiated by spontaneous emission. When coherent light from the master laser 20 is injected into the modulation laser 21, and the modulation laser 21 is switched above the lasing threshold during the time that the coherent light is injected, a light pulse from the modulation laser 21 is initiated by stimulated emission caused by the injected coherent light from the master laser 20. This is called coherence seeding. In order for coherence seeding to occur, the frequency of the injected light must match the frequency of the modulation laser 21 to within a certain range. In one embodiment, for LiDAR applications described below, the difference in the frequency of the light supplied by the master laser 20 and the frequency of the modulation laser 21 is less than 1.6 GHz.

When coherence seeding occurs, each time the modulation laser 21 is switched above the lasing threshold, the generated light has a fixed phase relation to the injected coherent light.

Thus the master laser 20 emits long coherent light pulses or continuous wave light as described above. The modulation lasers 21 emit long coherent light pulses. However, the long coherent light pulses emitted by the modulation lasers 21 are generated during a time period that the coherent light generated by the master laser 20 is received. Therefore the long coherent light pulses generated by the modulation lasers 21 have a fixed phase relationship to the coherent light generated by the master laser 20. Since light from each modulation laser 21 is generated by injection seeding, there is a fixed phase relationship between the light emitted from each of the modulation lasers 21. In other words, the phase difference between light emitted from one modulation laser and light emitted from another modulation laser is not random, but is determined by the phase shift applied at the modulation lasers and any path length difference. The phase shift applied at the modulation lasers can take account of any path length difference, such that the phase difference is controlled only by the phase shift applied.

Long light pulses generated by the master laser 20 may exhibit a frequency chirp at the front of the pulse due to the change of the index of refraction inside the laser cavity related to the changing carrier density. For coherence seeding therefore, where pulses of light from the master laser 20 are used, the middle part of the long pulses from the master laser 20 may be used, where the laser is emitting in steady-state. Long light pulses are therefore generated from the modulation lasers 21 when the middle part of a long light pulse is supplied, and are not generated when the start of the pulse is supplied. In this case, the long light pulses emitted by the master laser 20 may be longer than the long light pulses emitted by the modulation lasers 21. Alternatively, as explained above, the master laser 20 may emit continuous wave light.

The master laser 20 may comprise a single aperture. However, the modulation lasers 21 comprise a first aperture and a second aperture, into which the coherent light from the master laser 20 is injected. The laser apertures can comprise mirrors. The modulation lasers 21 may comprise one very highly reflecting mirror and one mirror with lower reflectivity. This means that almost all of the photons inside the resonator will leave through the lower reflecting mirror. In order to cause coherence seeding, coherent light is therefore supplied to the modulation laser 21 through the highly reflecting mirror. The intensity of the light incident on the highly reflecting mirror must be large enough that enough light enters the laser cavity for the coherence seeding to take place. The light generated in the modulation laser 21 then exits through the mirror with lower reflectivity. The mirror with higher reflectivity is therefore the first aperture (through which coherent light 30 is supplied) and the mirror with lower reflectivity is the second aperture (through which the coherent light 31 is emitted). Alternative arrangements are possible, whereby timing control allows light to input and output the modulation laser 21 through a single aperture.

For successful coherence seeding the fraction of the coherent light 30 that enters the optical cavity of the modulation laser 21 should be within certain limits which depend on the type of laser that is used. In one embodiment, the optical power of the injected coherent light 30 is at least 1000 times lower than the optical output power of the modulation laser 22. In one embodiment, the optical power of the injected coherent light is at least 100 times lower than the optical output power of the modulation laser 21. The master laser 20 can comprise a fixed optical attenuator that reduces the intensity of the light 30 emitted. Alternatively, the master laser 20 can comprise an adjustable optical attenuator that is adjusted only slowly. The intensity of the generated light 31 depends on the intensity of the inputted coherent light 30. With the correct driving conditions, no light 31 is generated at all if no coherent light is injected.

The first controller 50 is configured to apply phase control to the modulation lasers 21. Phase shifts are applied to the modulation lasers 21, such that the light output 31 from the modulation laser 21 is phase shifted with respect to the light received 30 from the master laser 20.

FIG. 3 (a) shows a schematic illustration of an example manner of applying a phase shift. In this figure, the modulation laser 21 is running continuously. A temporal change in the driving current applied to the modulation laser adds an additional phase shift $\phi_M$ to the phase $\phi_0$ of the injected light from the master laser 20. The light from the master laser is also referred to as the input pulse 30. $\phi_M$ can be controlled by changing the time $\tau$ over which the current is modulated (to a fixed current amplitude). Alternatively, $\phi_M$ can be controlled by changing the current amplitude (for a fixed time period) for example. Both duration and amplitude may be used to control the phase shift.

The relative phase shift applied to the modulation lasers 21 is set by the first controller 50, where the first controller 50 is configured to apply time varying driving currents to said plurality of modulation lasers to generate long coherent light pulses, and is further configured to apply additional perturbations to the current signals to set the phase shift applied by each modulation laser 21. The phase shift induced is controlled, that is, the same current modulation or perturbation will always cause the same phase shift. The light received from the master laser 20 is coherent, and the light output by the modulation laser 21 is phase shifted coherent light. The light output by the modulation laser 21 is also referred to as the phase modulated pulse 31 (PM pulse). In the example shown in FIG. 3 (b), before the modulation lasers, the optical pulses in each branch have no relative phase shift ($\Delta\phi=0$). The phase shift $\Delta\phi=\phi_{(1,2)}$ between the output of modulation laser 1 and modulation laser 2 is controlled by the control signals applied to the modulation lasers.

Figure 3A:
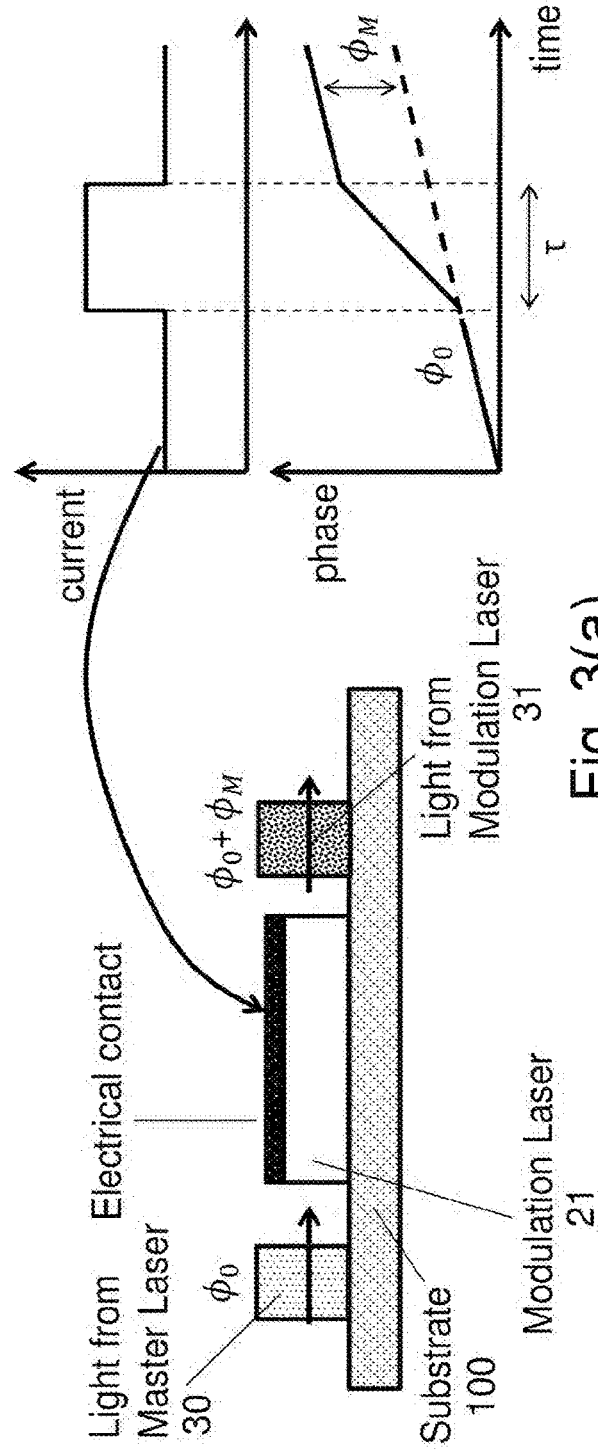
FIG. 3 (*a*) shows phase modulation of an input light pulse in a modulation laser by applying a current pulse, and FIG. 3 (*b*) shows the phase difference between the output pulses of two modulation lasers controlled by a first controller.
Figure 3B:
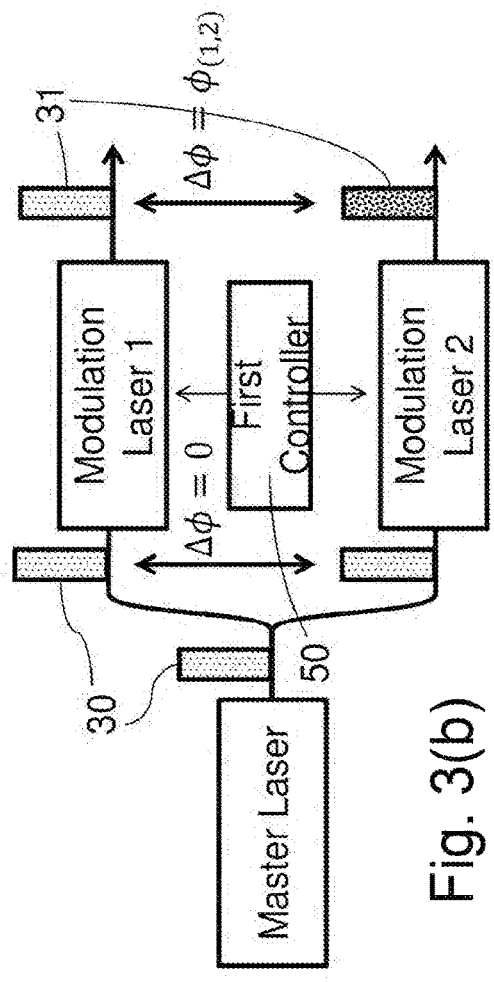
Figure 3C:
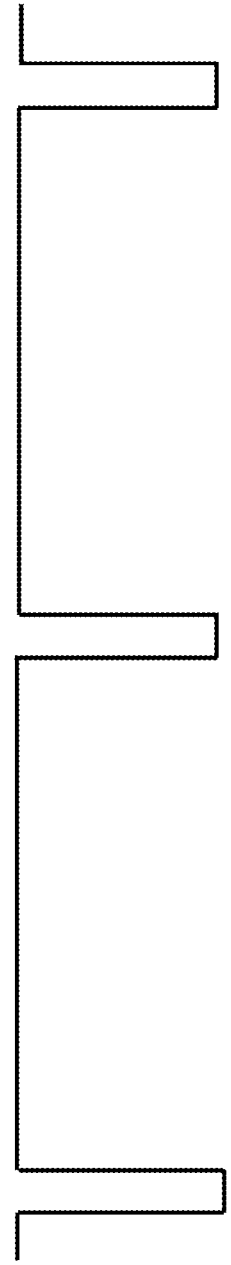
Figure 3D:
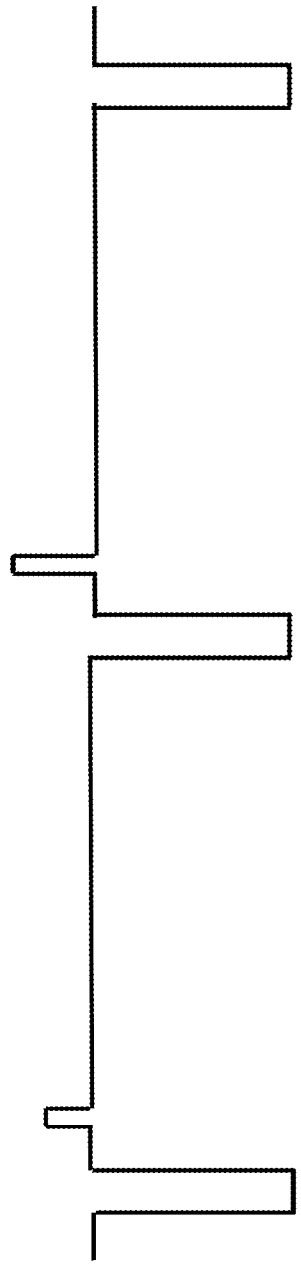
Figure 3E:
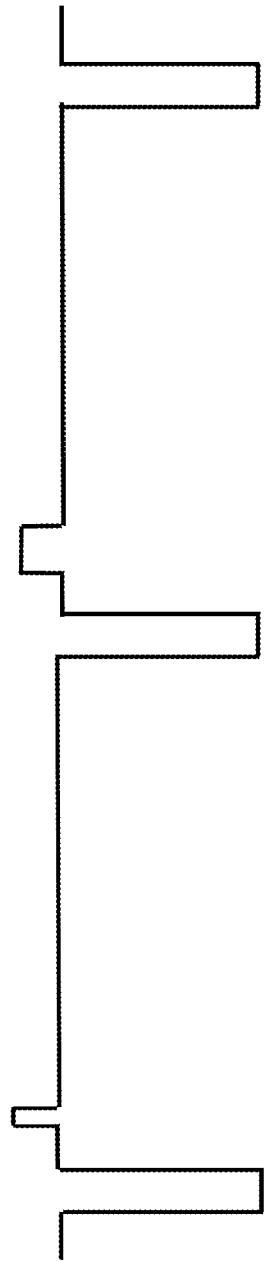

The phase control signal is therefore applied by the first controller 50 through electrical contacts to the modulation lasers 21 to vary the current applied to the modulation lasers 21. A phase shift is applied by applying a perturbation to the gain switch signal. The amplitude and duration of the perturbation that is applied affects the phase shift that is generated. The perturbation may be a short current pulse. FIG. 3(c) shows an example of the form of a current applied to the modulation laser 21, by the first controller 50, in order to generate long light pulses. The signal has the form of a series of square type pulses, where the duration of the periods between the pulses is shorter than the duration of the pulses. The signal can be formed by combining an AC current with a DC bias current via a bias-T as described previously. FIG. 3(d) shows the current applied when modified to apply a phase shift using fixed time durations. A smaller current pulse is added through the AC input of the bias tee. The first controller 50 may comprise separate elements that generate the smaller current pulses for each modulation laser 21, which are then combined with the square pulse AC signal. The combined signal is then inputted to the AC input of the bias tee. The amplitude of the smaller current pulses is varied in order to apply differing phase shifts. FIG. 3(e) shows the current applied when modified to apply a phase shift using fixed amplitudes. The duration of the smaller current pulses is varied in order to apply differing phase shifts.

The modulation lasers 21 may alternatively be run in continuous wave mode. In this case, the applied phase shifts would also account for the previously applied phase shifts. Furthermore, in order to prevent a drift from the reference phase, the modulation lasers 21 may still be switched on and off periodically, to re-set the phase locking.

Although the light emitted from the modulation lasers 21 has a fixed phase relationship to the light emitted from the master laser 20, there may be a phase offset between the modulation lasers 21 due to path length differences and/or differences in timing of emissions. Furthermore, further phase offsets may be introduced by any path length difference between the modulation lasers 21 and the output lasers 22, difference in emission timings at the output lasers 22, and difference in path length to the out-coupling elements (described later). The phase shift applied at the modulation lasers 21 and the pulse control applied at the output lasers 22 are controlled so that the pulses arrive simultaneously at the emitter array out-coupling elements (described in further detail below) having the desired phase difference. This may mean taking into account phase off-sets when applying the phase shift at the modulation lasers 21. Phase offset can be calculated by performing an initial calibration, with no phase applied at the modulation lasers 21.

An output waveguide from each modulation laser 21 is coupled as input to an output laser 22. Each output laser 22 is connected to a modulation laser 21. Long pulses of coherent light 31 from a modulation laser 21 are injected into the corresponding output laser 22. The output lasers 22 are also semiconductor laser diodes. The output lasers 22 may be distributed feedback lasers or ridge lasers for example, and the structure and fabrication of the lasers will be described in more detail below. The output lasers 22 further comprise an intensity modulator (not shown), such that the output of each output laser 22 is injected into the input of an intensity modulator. An intensity modulator modulates the intensity of incoming light pulses. In an "off" state, the intensity modulator reduces the intensity of the light to a low level. In an "on" state, the intensity modulator allows a larger fraction of the incoming light to exit. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

The output lasers 22 are also periodically switched above and below the lasing threshold by application of a time varying current. The second controller 60 is connected to each output laser 22 to modulate the gain of the output laser 22, by applying a current through an electrical connection. In this manner, the output lasers 22 generate short light pulses. The second controller 60 comprises a driving circuit which applies a time varying current to each output laser 22 such that the output laser 22 is switched periodically above the lasing threshold, generating short light pulses in the manner described in relation to FIG. 5(*a*) to (*c*). In this case, the driving signal generates short laser pulses (of the order of picoseconds in duration). The current modulation signal is applied to the laser and switches the gain of the laser above and below the lasing threshold periodically. When a current modulation pulse is applied to the laser, the injected carriers increase the carrier density and the photon density increases. The rapid increase of the photon density causes a decrease in the carrier density. This in turn decreases the photon density, which increases the carrier density. At this point the current modulation pulse is timed to switch back down to the DC bias level, and the laser emission dies off quickly. The laser output therefore consists of short laser pulses as shown in the lower graph of FIG. 5 (*b*).

The second controller 60 is connected to each output laser 22 via electrical contacts at the output lasers 22, and to the intensity modulator associated with each output laser 22 also via electrical contacts. A vertical or lateral p-n junction may be formed at each output laser 22, as will be described in relation to the fabrication process described below. An electrical signal is applied by the second controller 60 across the junction in order to gain switch the output lasers 22. An electrical signal is applied by the second controller 60 to the intensity modulator in order to adjust the relative intensity of the emitted pulses. In one example, the gain switch signal applied to each output laser 22 can be used to control the relative intensity of the emitted pulses, and for example, the same gain switch signal may be applied to each output laser 22, modified for each output laser 22 to control the relative timing and intensity of the emitted pulses.

Alternatively, a gain switch signal may be applied by the second controller 60 to each output laser 22, modified for each output laser 22, to control the relative timing of the emitted pulses, while a separate intensity modulation signal may be applied by the second controller 60 to the intensity modulator of each output laser 22, modified for the intensity modulator of each output laser 22, to control the relative intensity of the emitted pulses. In this example, when the relative intensities of the emitted pulses are controlled by applying a separate intensity modulation signal to the intensity modulator of each output laser 22, a change in the wavelength of the pulses emitted by each element of the source array 10 may be avoided or minimised. In the LiDAR and QKD applications described below, a wavelength shift in the light emitted by each element in the source array is avoided or minimised.

Light from the corresponding modulation laser 21 enters the output laser 22 through a first aperture. The second controller 60 applies a time varying current to each output laser 22 such that each output laser is switched above the lasing threshold at least once during the time that the PM pulse 31 is incident on the output laser 22, generating at least one short light pulse 32.

As well as controlling the timing and duration of the emitted pulses, the second controller 60 may also control the intensity of the pulses emitted from the output lasers 22. FIG. 4 (*a*) shows a schematic illustration of intensity modulated (IM) pulses 32 from two output lasers 22 where the second controller is configured to provide different bias currents to the output lasers such that the IM pulses 32 have different intensities. For example, the second controller may comprise an attenuator that reduces the amplitude of the time varying current for different output lasers 22 at defined times to generate short light pulses of lower intensity. The attenuator can block current signals completely such that the particular output laser 22 emits no pulse. Alternatively, the current pulse source itself may provide a pattern of pulses which vary in intensity, for example it may comprise a pattern generator. The intensity control is performed separately for each output laser 22, such that differences in relative intensity can be controlled between the output lasers 22.

In another example, as well as controlling the timing and duration of the emitted pulses by applying a time varying current to each output laser 22, the second controller 60 may also control the intensity of the pulses emitted by applying an intensity modulation signal to the intensity modulator connected to each output laser 22. For example, the second controller 60 may comprise an attenuator that reduces the amplitude of the time varying intensity modulation signal for each intensity modulator connected to each output laser 22 at defined times to generate short light pulses of lower intensity. The intensity modulator can block current signals completely such that the no pulse is emitted. Alternatively, the second controller 60 may provide a signal which varies in intensity, for example it may comprise a pattern generator. The intensity control is performed separately for each intensity modulator associated to each output laser 22, such that differences in relative intensity can be controlled between the outputs of the source array 10.

The second controller 60 controls the current applied to the output laser 22 in order to change the intensity of the short laser pulses. The second controller 60 may comprise a separate element corresponding to each output laser 22 that modifies the square pulse AC signal applied to the laser to change the amplitude, and therefore control the intensity.

In other examples, intensity control may additionally or alternatively be performed by controlling the intensity of the master laser 20 and/or the modulation lasers 21.

Figure 4C:
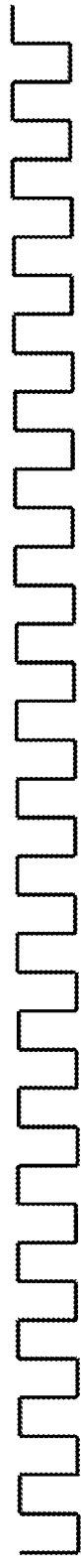
FIG. 4 (*a*) is a schematic illustration of an arrangement for modulation of the intensity of the output light pulses by controlling the output lasers with a second controller.
Figure 4D:
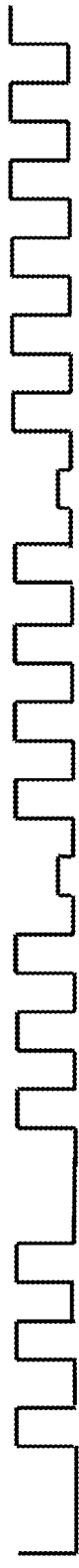
Figure 4E:

FIG. 4(c) shows a time varying current in the form of a regular series of square shaped pulses, which is applied to the output laser 22 by the second controller 60 in order to generate the short light pulses. The signal may be formed by combining an AC current with a DC bias current via a bias-T as described previously. FIG. 4(d) shows the time varying current after modification for intensity control. The modified signal is then inputted to the AC input of a bias tee and the output current of the bias-T is applied to the output laser 22. The signal has been modified such that two electrical pulses have been omitted. When applied to the particular output laser 22, these missing electrical pulses will result in no light pulses emitted in those time periods. The signal has also been modified such that two electrical pulses have a reduced amplitude. When these electrical pulses are applied to the particular output laser 22, pulses with a reduced intensity are generated. FIG. 4(e) shows the light pulses emitted from the laser.

The output lasers 22 also comprise a second aperture, through which the light is emitted. The generated short light IM pulses 32 are emitted from a second aperture in the output laser 22 and the coherent light 31 is injected through a first aperture. The output laser apertures can be mirrors. The laser 22 can comprise one very highly reflecting mirror and one mirror with lower reflectivity. This means that almost all of the photons will leave through the lower reflecting mirror. In order to cause coherence seeding, coherent light is therefore supplied to the output laser 22 through the highly reflecting mirror. The intensity of the light incident on the highly reflecting mirror must be large enough that enough light enters the laser cavity for the coherence seeding to take place. The short pulses 32 generated in the output laser 22 then exit through the mirror with lower reflectivity. The mirror with higher reflectivity is therefore the first aperture (through which coherent light 31 is supplied) and the mirror with lower reflectivity is the second aperture (through which the short light pulses 32 are emitted). Alternative arrangements are possible, whereby timing control allows light to input and output the modulation laser 21 through a single aperture.

Light from the output lasers 22 is also generated by injection seeding. The injected light is that output from the modulation laser 21. During operation of the output laser 22 without injection of light from the modulation laser 21 (i.e. without coherence seeding), when the output laser 22 is switched above the lasing threshold a light pulse is initiated by spontaneous emission. When coherent light from the modulation laser 21 is injected, and the output laser 22 switched above the lasing threshold during the time that the coherent light is injected, a light pulse from the output laser 22 is initiated by stimulated emission caused by the injected coherent light. In order for coherence seeding to occur, the frequency of the injected light must match the frequency of the output laser 22 to within a certain range. For example, in LiDAR applications described below, the difference in the frequency of the light supplied by the modulation laser 21 and the frequency of the output laser 22 is less than 1.6 GHz.

When coherence seeding occurs, each time the output laser 22 is switched above the lasing threshold, the generated light pulse(s) has a fixed phase relation to the injected coherent light. Since light from each output laser 22 is generated by injection seeding, there is again fixed phase relationship between the light emitted from each of the output lasers 22. In other words, the phase difference between light emitted from one output laser and light emitted from another output laser is not random, but is determined by the phase shift applied at the modulation lasers (which also accounts for any path length difference).

Thus the modulation laser 21 emits coherent light as described above. The output lasers 22 emit short coherent light pulses, generated during the time period that the coherent light is received. Therefore the short coherent light pulses generated by the output lasers 22 have a fixed phase relationship to the phase of the coherent light generated by the modulation laser 21.

Again, long light pulses generated by the modulation laser 21 may exhibit a frequency chirp at the front of the pulse. For coherence seeding therefore, the middle part of the long pulses may be used, where the laser is emitting in steady-state. Light pulses are therefore generated from the output lasers 22 when the middle part of a long light pulse is supplied, and are not generated when the start of the pulse is supplied.

Again, for successful coherence seeding the fraction of the coherent light 31 that enters the optical cavity of the output laser has to be within certain limits which depend on the type of gain-switched laser that is used. In one embodiment, the optical power of the injected coherent light 31 is at least 1000 times lower than the optical output power of the gain-switched output laser 22. In one embodiment, the optical power of the injected coherent light is at least 100 times lower than the optical output power of the gain-switched laser 22. The modulator laser 21 can comprise a fixed optical attenuator that reduces the intensity of the long light pulses emitted. Alternatively, the modulator laser 21 can comprise an adjustable optical attenuator that is adjusted only slowly. The intensity of the generated short pulses depends on the intensity of the coherent light. With the correct driving conditions, no short pulses are generated at all if no coherent light is injected. The modulator laser 21 can therefore comprise an intensity modulator that varies the intensity of the generated long light pulses before they are supplied to the gain-switched output laser 22, in order to vary the intensity of the generated short light pulses.

The switching of the output laser 22 is synchronised with the arrival of the pulses 31. An example is illustrated in FIG. 4(b): a time varying signal is applied to master laser 20 in order to generate long input pulses 30; the long input pulses 30 are injected into the modulation lasers 21, a first control signal is applied by the first controller (not shown), to emit long PM pulses 31 into the output lasers 22, and time varying signals are applied by the second controller to the output lasers 22 in order to generate short light pulses 32. The timings of the signals applied to all lasers, including the phase control and intensity control signals, may be synchronised to a master clock.

FIG. 4(b) shows a schematic illustration of long pulses from the master laser being input into the output lasers. The second controller also controls the relative time delay Δt between light pulses being emitted from different output lasers 22 in the array. The delay Δt may be less than the length of the long coherent light pulses 31 such that the IM pulses 32 are intra-period pulses. By controlling the relative timing of the current pulses applied to each of the output lasers 22, the relative timings of the emissions from the output lasers 22 can be controlled. For example, the current pulses may be synchronised to be applied to all output lasers at the same time, such that the short pulses are emitted from the output lasers 22 at the same time. Alternatively, the current pulses may be delayed relative to each other, resulting in time differences Δt between the pulses emitted from each output laser 22. The timing may be controlled to take into account path length differences between each output laser 22 and its corresponding out-coupler (described in further detail below), such that the light pulses are emitted from the output lasers 22 at different times, but arrive at the out-couplers at the same time. In LiDAR applications as described below, a difference in the arrival times of light pulses at the out-couplers is avoided or minimised.

In order to switch the output laser above the lasing threshold, the second controller 60 may supply the time varying current to an AC input of a bias-T connected to the gain-switched output laser 22 in the same manner as described previously. A DC bias current may be supplied to a DC input. The time varying current may have a square type wave form, with a frequency exceeding 1 GHz. The gain-switched output laser 22 has a good extinction ratio between the state when pulses are emitted and the "off" state. It can be used to generate very short pulses. In one embodiment, the duration of each of the short light pulses is less than 200 ps. In one embodiment, the duration of each of the short light pulses is less than 50 ps. In one embodiment, the duration of each of the short light pulses is of the order of a few picoseconds. In one embodiment, where the time varying current is a square wave current with a frequency of 1 GHz, the short light pulses are 1 ns apart.

Although square type waveforms have been described for generation of light pulses for the various lasers in the above description, other time varying waveforms may be used, for example an electrical sine wave generated by a frequency synthesizer. The time varying currents can comprise signals with arbitrary pulse shape.

For some applications, for example QKD applications, it may be desirable to ensure no phase coherence between pulses corresponding to subsequent long coherent light pulses emitted from the master laser 20. The laser emission from the master laser 20 is started by spontaneous emission. This is a random process, which means that the phase of the generated long light pulse will be random. In order that the random process of spontaneous emission is responsible for starting the laser emission for all long light pulses, the reference laser cavity needs to be completely empty before each long light pulse is generated. The number of photons in the cavity decays exponentially as soon as the carrier density falls below the lasing threshold. It may take around 100 ps until most of the photons have left the cavity, ensuring that no phase coherence exists with the subsequently generated long light pulse from the reference laser.

The gain-switched output laser 22 may be switched above the lasing threshold more than once during the time a single long coherent light pulse is incident on the gain-switched output laser 22.

Several output lasers 22 may be optically coupled to one modulation laser 21. This may be used, for example, in applications where the output pulses 32 from several output lasers 22 do not require an adjustable relative phase difference between them.

The master laser 20, the modulation lasers 21 and the output lasers 22 are edge emission lasers, and are laterally combined on the first substrate 100. Light is emitted from the lasers in the plane of the layers, i.e. in a direction perpendicular to the stacking direction of the layers. The master laser 20, the modulation laser 21 and the output laser 22 are integrated onto a first surface of the first substrate 100.

The master laser 20, modulation lasers 21 and output lasers 22 may have the same structure. Alternatively, different lasers may be used, for example the master laser 20 may be a higher power laser, whereas the modulation lasers 21 may have a higher coherence for example. This may be realised by using different lengths for the different lasers, depending on requirements.

The optical device can be grown by metal organic vapour phase epitaxy (MOVPE). MOVPE is suitable due to the multiple overgrowth steps in the process. The device can be grown using a monolithically integrated approach or alternatively can be flip-chip bonded on a foreign carrier.

The substrate may be InP. InP substrates can be used for devices operating at telecom wavelengths, as its crystallographic structure allows emission at energies from telecom bands. For example, in the LiDAR applications described below, an operating wavelength of 1550 nm is used.

Alternatively, it is possible to use GaAs as a substrate. GaAs can be used to form emitters at 1.3 um. For example, in the QKD applications described below, an operating wavelength of 900 nm is used.

The individual components may be grown on InP and then flip-chip bonded to a different substrate. The substrate may comprise an integrated heat sink, which may be synthetic diamond for example.

One or more electrical contacts are formed to the lasers. The contacts connect to the corresponding controllers, used to apply control signals to switch the lasers on and off, and to apply phase and intensity control. For example, AuGeNi may be used as an n-type contact metal and the p-contact metal may be any one of PdZnAu, AuCrAuZnAu or AuBe. Shallow p-type contact can be achieved with PdGeTiPt. Schottky or quasi-ohmic contacts can be obtained with TiAu or CrAu metallisations depending on p-layer doping concentrations. An n-type electrode is formed comprising the n-contact and a p-type electrode is formed comprising the p-contact.

For fabrication of the device, dry etching of InP based materials can be used, for example with $Cl_2$ based chemistry at high temperatures diluted with Ar or $N_2$, $CH_4$. Dielectric dry etching may also be used, and can be performed using $CHF_3$ or $CF_4$ based chemistry, with a dielectric hard mask formed using $Si_3N_4$ or $SiO_2$. Further details of methods of fabrication of specific examples of such devices are described below. Wet etching of the InP can also be achieved for instance with a $H_2SO_4 + H_2O_2$ mixture but is not recommended for laser/waveguide fabrication due to isotropic character of the etching and sloppy sidewalls.

Various lateral shapes of the master laser 20, the modulation laser 21 and the output laser 22 can be formed, for example rectangular or square cross-section.

The master laser 20, the modulation lasers 21 and the output lasers 22 may be distributed feedback (DFB) lasers, distributed Bragg reflector (DBR) lasers or ridge lasers.

The lasers may comprise a grating region. The grating region may be separate from the active region or the active region may comprise the grating. A laser where the active region and grating are separate is referred to as DBR (distributed Bragg reflector) laser. A DBR is shown in FIG. 7(a). A laser where the active region comprises the grating is a DFB laser. A DFB laser is shown in FIG. 7(b).

Ridge lasers are also referred to as stripe lasers. A Fabry-Perot laser is a type of ridge or stripe laser. The terms stripe and ridge refer to the form of the laser waveguide. Fabry Perot refers to the form of the laser cavity i.e. two parallel mirrors made up by the end faces of the waveguide. Ridge lasers comprise waveguides with well-defined facets.

The material structure comprises a core surrounded by cladding material. The cladding material may be lattice matched to an InP substrate. In one embodiment, the cladding material is InP and the core is AlInGaAs, for example. AlInGaAs may be used because it has a higher refractive index compared to InP.

Figure 6A:
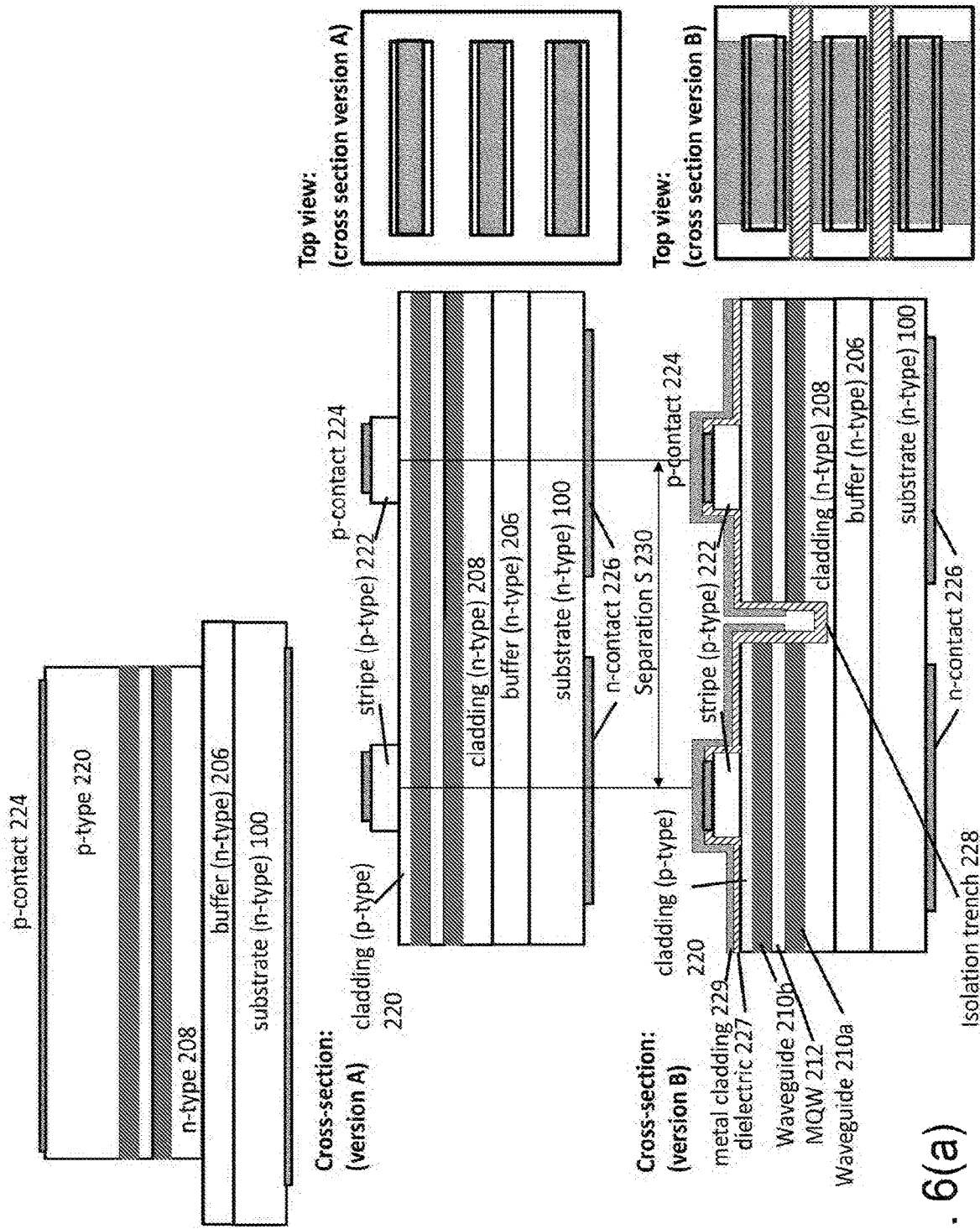
FIG. 6 (*a*) shows the structure of an array of two ridge lasers arranged side by side.

A schematic of a ridge laser is shown in FIG. 6 (a). The device comprises a substrate 100. On one surface of the substrate is an n-contact 226. Overlying and in contact with the opposite surface to the substrate 200 is the buffer layer 206. Both the substrate 100 and the buffer layer 206 are n-type. Alternatively, the device may have a reversed structure, in which the substrate 200 is p-type. Overlying and in contact with the buffer layer 206 is the n-type, cladding layer 208. Overlying and in contact with the n-type layer 208 is a first waveguide material 210a. Overlying and in contact with the first waveguide material 210a is a MQW layer 212. Overlying and in contact with the MQW layer 210 is a second waveguide material 210b. A p-type, cladding layer 220 is overlying and in contact with the second waveguide layer 210b. The cladding layer may be InAlAs. A ridge of a p-type material 222 is overlying and in contact with the p-type layer 220. A p-contact metal 224 is overlying and in contact with the ridge 222. In one embodiment, the p-type contact layer 222 is InGaAs. According to one example, when two ridge lasers are placed next to each other (when viewed in cross section) to form an array, as shown in version A of FIG. 6 (a), a separation of the order of hundreds of micrometres may be defined to avoid cross talk between the two lasers. According to another example, as shown in version B of FIG. 6 (a), an isolation trench 228 may be etched. The isolation trench 228 may be filled with a dielectric layer 227 and/or a metal cladding 229. This example may result in more compact arrays. The isolation trenches 228 may avoid cross-talk between adjacent lasers.

FIG. 6 (b) is a flow chart of a method of growth and fabrication of a monolithically integrated lasers that can be used to fabricate an optical device having a master laser 20, a modulation laser 21, and an output laser light 22 which are the same type, for example both DFB lasers or both stripe lasers, in a lateral combination. The method may be used to fabricate a device such as described in relation to any of FIGS. 6 (a), 7 (a), 7 (b) and 8. The devices use a vertical junction. FIG. 6 (c) shows the device after selected steps of the fabrication process of FIG. 6 (b).

In devices fabricated by this method, the master laser 20, the modulation laser 21, and the output laser light 22 are integrated monolithically on a substrate, for example an n-type InP substrate.

In step S101, a buffer layer 206 is grown on the substrate 100, followed by an active area structure. The active area structure may be referred to as an active region. The buffer layer may be 200 nm thick for example. It may be n-type InP. The active area structure may be a multi quantum well (MQW) structure, where the method is used to fabricate DFB lasers or stripe lasers. A MQW structure is described in more detail in relation to FIG. 7 below. The active structure may comprise an n-type layer 208, a first waveguide layer 210a, a MQW layer 212 and a second waveguide layer 210b. This stage may be referred to as "0-level growth". The waveguide layers 210a and b may be InGaAs layers. The cladding layers, i.e. n-type layer 208 and p-type layer above the waveguide region 210b may be InAlAs, lattice matched to InP. The MQW active area within the waveguide may be InAs/InGaAs.

For a stripe laser, a p-type layer 220 is grown overlying and in contact with the second waveguide layer 210b and a p-type layer 222 is grown overlying and in contact with the p-type layer 220. The p-type layer 222 is a heavily doped p-type material, in which the carrier concentration is higher than layer 220. This can be omitted providing layer 220 has sufficient doping.

In step S102, the device is removed from the growth machine for "0-level fabrication". This step comprises deposition of a dielectric hard mask 214, which may be a $Si_3N_4$ or a $SiO_2$ layer for example. The thickness of this dielectric layer may be dependent on the thickness of the active area and the dry etch selectivity. A photo resist is then spun on the dielectric layer, and a strip is defined in the photo resist by optical lithography. For example, the strip may be 1.5-2.5 μm in width and 500 μm length. For a DFB laser, the strip may be longer to include the grating length. The depth will depend on the wafer design. After development, the strip pattern defined in the resist is transferred to the dielectric layer through dry etching based on $CF_4$ or $CHF_3$ chemistry, for example. Next, the remaining resist on the surface is removed, for example in a resist remover solution or by $O_2$ plasma ashing. Next, a semiconductor dry etch is carried out. $Cl_2$ based chemistry may be used to provide good quality vertical sidewalls. The etch is performed down to the n-type layer 208 for a DFB laser. For a stripe laser, the etch is performed down to the p-type layer 220.

The sample is then ready for step S103: "1-level overgrowth". The dielectric hard mask 214 is left on the strip area for this step. This prevents local overgrowth on top of the active area. A p-type layer 216 followed by an n-type layer 218 are then grown. The etched area of the device is planarized. Planarization is a growth process performed at certain conditions in order to fill the etched areas with new epitaxial material. The top of the ridge is covered with a dielectric mask so growth does not occur there. The adatoms will preferentially form a layer at the bottom of the trench etched in the previous step.

Step S104 is "1-level fabrication". In this step, the dielectric hard mask 214 is removed. This may involve dipping the sample in HF or dry etching.

At this stage, step S104a, "active grating fabrication", may optionally follow if a DFB laser or a DBR laser is being fabricated. Alternatively, the fabrication method may proceed directly from step S102 to step S106 for a stripe laser.

Step S104a involves spinning the sample with an electron beam lithography resist and defining the grating pattern with electron beam lithography. The grating dimensions may depend on the laser output wavelength. After development the pattern is transferred by wet or dry shallow etching. Gratings are formed by etching part of the waveguide layer 210b off, for example by etching trenches in the waveguide layer 210b. The trenches may have a groove-shaped pattern. The dimensions of the grating are calculated according to the operation wavelength of the device. The grating on the surface of the waveguide layer 210b opposing the surface overlying and in contact with the MQW layer acts in a similar manner to a mirror. For a DBR laser, a grating may be formed at both ends of the component to create a cavity. The gratings at each end may have different reflectivity to enable output of the light from one end. For a DFB laser, a grating may be formed throughout the active region.

Step S105 is "2-level overgrowth". This involves growing an epitaxial p-type layer 220, which may be patterned by grating if optional step S104a has been performed. This layer may be 200 nm thick. Although the p-type layer 220 is grown across the entire device, due to the n-type layer 218 and p-type layer 216 the current is provided only to the active area.

Step S106 is "2-level fabrication", which involves definition of contact areas with optical lithography, depositions of n and p metal contacts and annealing. The n metal contact is deposited on the opposite surface of the substrate 200 to the coherent light source 20 and gain switched laser 24. The p metal contact is deposited on the p-type layer 220.

In the case where the device comprises two stripe lasers, vertical trenches are etched at each end of the coherent light source 20 and the gain switched laser 24 to provide end mirrors.

Similar devices can be fabricated in two independent runs, diced and then flip chip mounted and aligned on a foreign platform. For example two InP-based lasers can be mounted on a common Si carrier substrate.

Figure 6B:
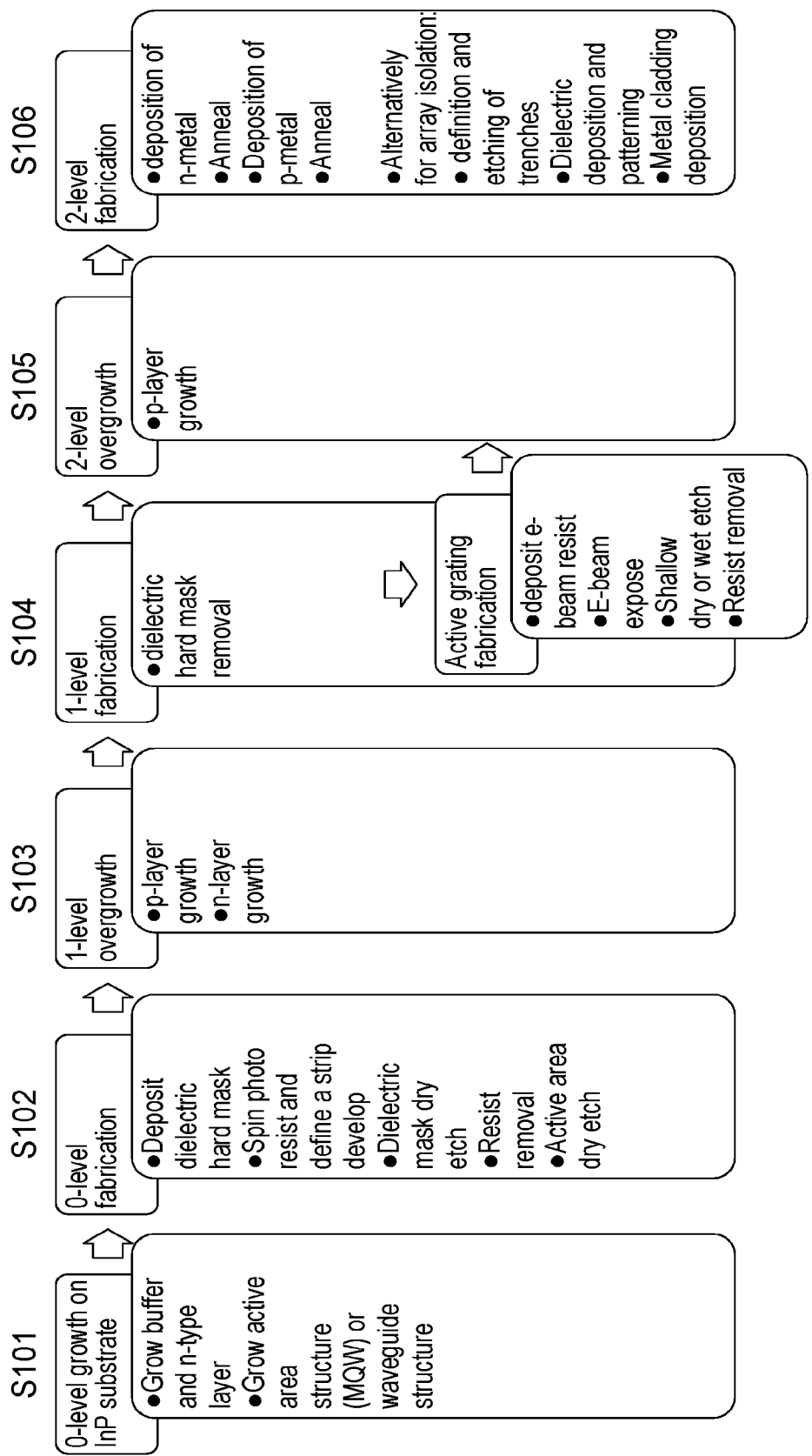

FIG. 6(c) shows the structure of the sample after the steps of FIG. 6(b), for an optical device having a DFB laser.

After step S101, the sample comprises a substrate 200, a buffer layer 206 overlying and in contact with the substrate 200, an n-type layer 208 overlying and in contact with the buffer layer 206, a first waveguide layer 210a overlying and in contact with the n-type layer 208, an MQW layer 212 overlying and in contact with the first waveguide layer 210a and a second waveguide layer 210b overlying and in contact with the MQW layer 212.

After step S102, the dielectric hard mask 214, second waveguide layer 210b, MQW layer 212 and first waveguide layer 210a are a ridge which is overlying and in contact with the n-type layer 208.

After step S103, the p-type layer 216 is overlying and in contact with the n-type layer 208 either side of the ridge, and the n-type layer 218 is overlying and in contact with the p-type layer 216.

After step S105, the dielectric hard mark 214 has been removed, and the p-type layer 220 is overlying and in contact with the ridge and the n-type layer 218.

After step S106, a p-type contact layer 222 is overlying and in contact with the p-type layer 220. A p-contact metal 224 is overlying and in contact with the p-type contact layer 222. An n-contact metal 226 is in contact with the opposite surface of the substrate to the p-contact metal 224.

Figure 6D:
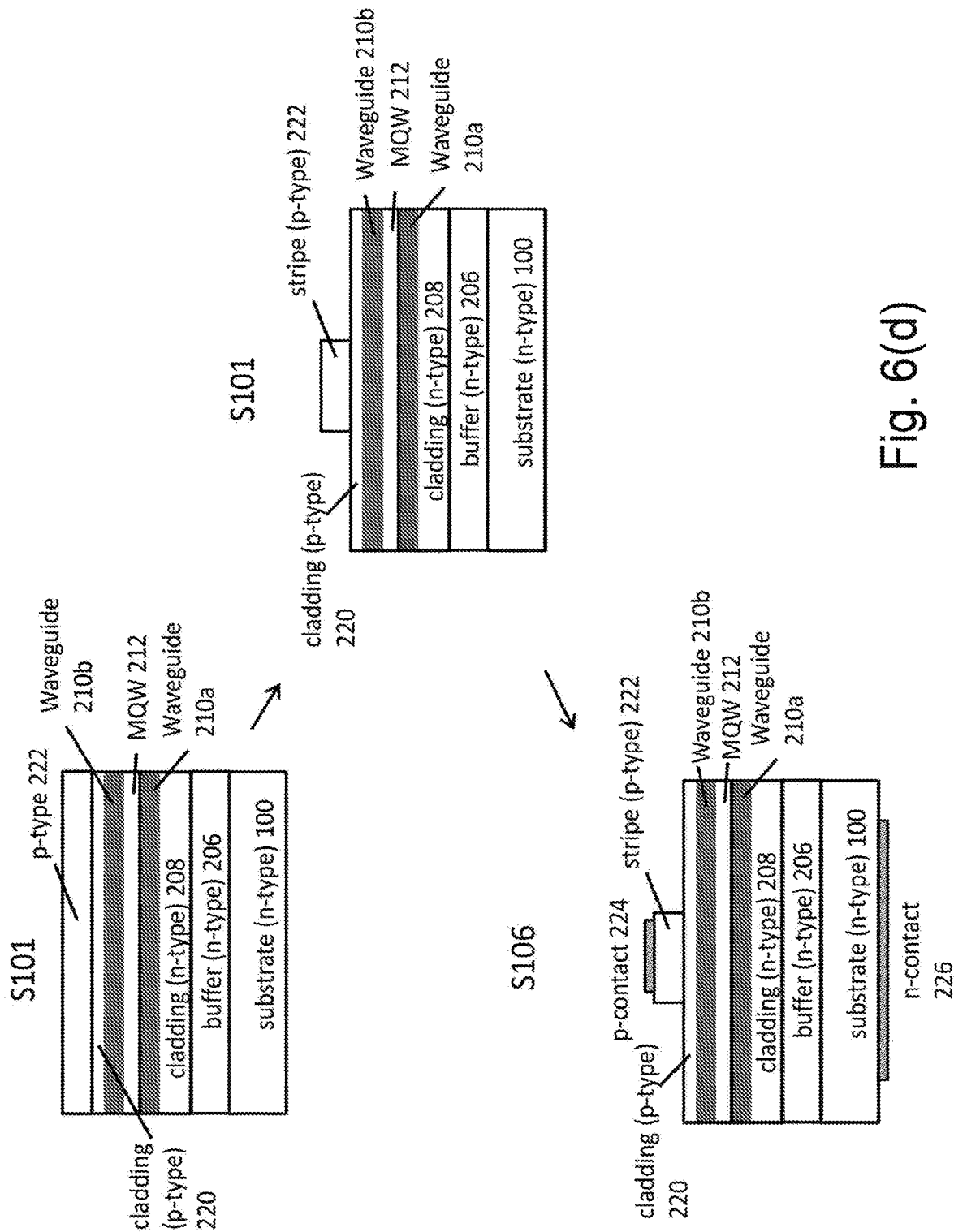

FIG. 6(d) shows the structure of the sample after each step for a stripe laser.

After step S101, the sample comprises a substrate 200, a buffer layer 206 overlying and in contact with the substrate 200, an n-type layer 208 overlying and in contact with the buffer layer 206, a first waveguide layer 210a overlying and in contact with the n-type layer 208, an MQW layer 212 overlying and in contact with the first waveguide layer 210a and a second waveguide layer 210b overlying and in contact with the MQW layer 212, a p-type layer 220 overlying and in contact with the second waveguide layer 210b and a p-type layer 222 overlying and in contact with the p-type layer 220.

After step S102, the p-type layer 222 is a ridge which is overlying and in contact with the p-type layer 220.

After step S106, a p-contact metal 224 is overlying and in contact with the p-type layer 222. An n-contact metal 226 is in contact with the opposite surface of the substrate to the p-contact metal 224.

A DBR is shown in FIG. 7(a). A DFB laser is shown in FIG. 7(b). The active area in both cases comprises a multi quantum well region (MQW). The MQW region comprises a plurality of quantum well layers. Where the laser is configured for 1.55 um operation, the MQW region comprises alternating layers of materials such as, for example: AlInGaAs/InP, AlInGaAs/AlInAs, InGaAsP/InP, InGaAsP/AlInAs or InGaAs/AlInGaAs. All these layers are lattice matched to an InP substrate.

The device comprises a substrate 100. On one surface of the substrate is an n-contact 226. Overlying and in contact with the opposite surface to the substrate 200 is the buffer layer 206. Both the substrate 200 and the buffer layer 206 are n-type layers. Alternatively, the structure can be reversed, such that the substrate 200 is a p-type layer. The layers may be n-doped InP. Overlying and in contact with the buffer layer 206 is the n-type layer 208. The n-type layer 208 may be n-doped InP. Overlying and in contact with a strip of the n-type layer 208 is a first waveguide material 210a. Overlying and in contact with the first waveguide material 210a is a MQW layer 212. Overlying and in contact with the MQW layer 210 is a second waveguide material 210b. On either side of the strip and overlying and in contact with the n-type material 208 is a p-type material 216, which may be p-doped InP. The n-type layer 218 is overlying and in contact with the p-type layer 216, and may be n-doped InP. The p-type layer 220 is overlying and in contact with the second waveguide layer 210b and the n-type layer 218, and may be p-doped InP. A p-type contact layer 222 is overlying and in contact with the p-type layer 220. In one embodiment, the p-type contact layer 222 is heavily doped InP, i.e. having a dopant concentration higher than that of layer 220. A p-contact metal 224 is overlying and in contact with part of the p-contact layer 222. A schematic of the device cross section is shown in FIG. 7(c).

As shown in the side view in FIG. 7(a), the MQW strip runs along the length of the device. There is a first p-type contact layer 224 over part of the MQW strip. On either side of the part of the strip under the first p-contact 224 along the direction in which light is emitted, there is a diffraction grating in the second waveguide material.

A current is applied between the first p-contact 224 and the n-contact 226 in order to generate light in the MQW strip of the coherent light source 20. Light generated in the MQW strip of the laser is emitted along the MQW layer. The light is laterally confined by the p-type layer 216 and vertically confined by the waveguide layers 210a and b. The light exits the MQW layer through an aperture of the laser; the apertures are described below.

The structure of DFB lasers viewed in cross section (FIG. 7(c)) is the same as that of the DBR lasers. FIG. 7(b) shows the grating of the DFB that is along the entire structure on the surface of the waveguide region 210b. The DFB lasers do not have discrete mirrors, instead the grating provides optical feedback distributed over the active region and the light is reflected by the grating. This is different from FIG. 7(a), which shows DBR lasers in which discrete mirrors are formed by gratings at the ends of the laser, and the active regions and gratings are separate.

Where multiple different devices, such as a master laser, modulation lasers, and output lasers, are monolithically grown, a physical gap is created between them, which may be achieved by etching trenches for example. This gap can be filled with a material with a similar index of refraction, after the trenches are etched.

Figure 8:
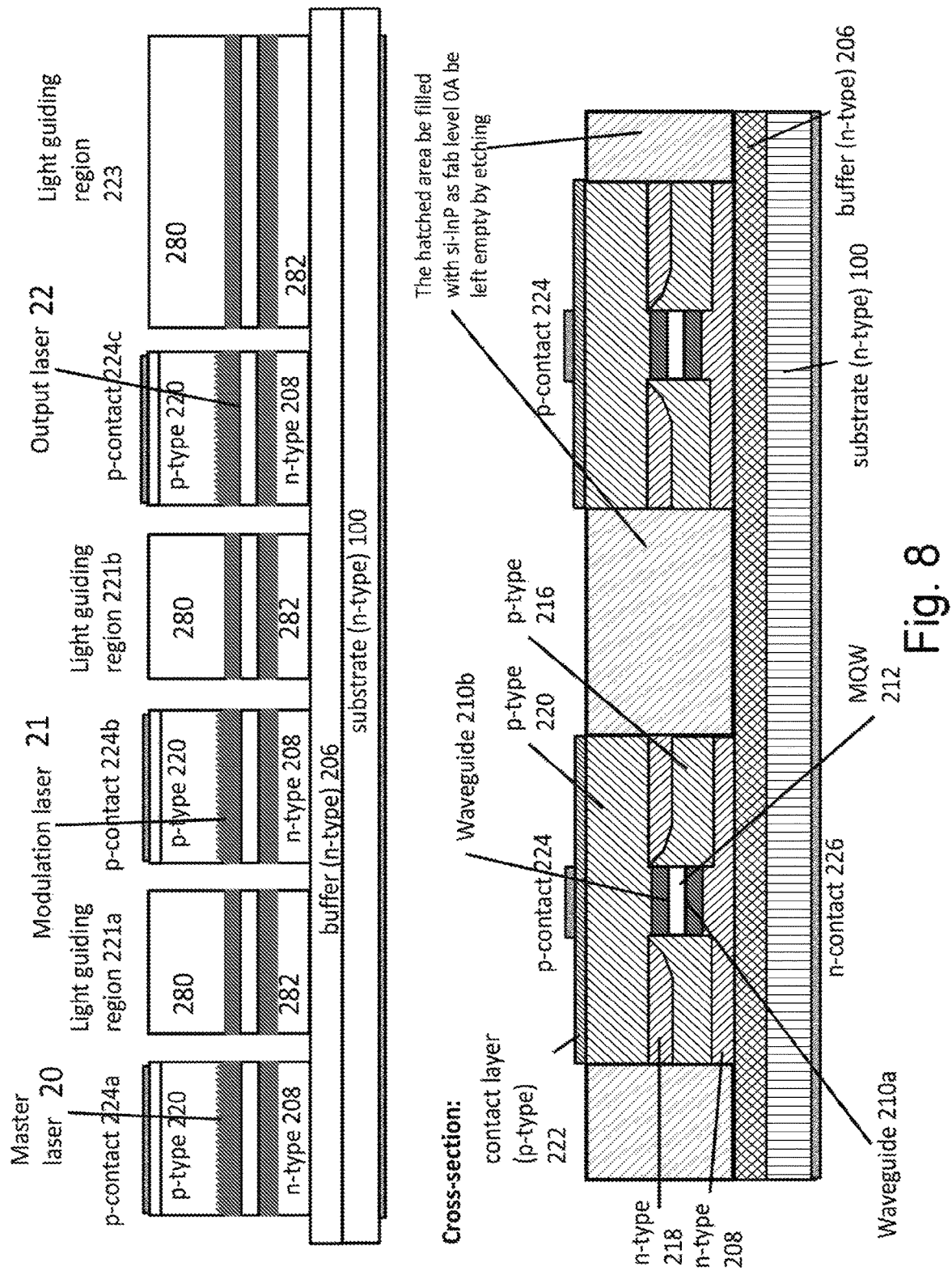
FIG. 8 shows the structure of an optical device in accordance with an embodiment, in which the master laser, modulation laser, and output lasers are DFB lasers.

FIG. 8 shows a schematic illustration of an optical array in which a master laser 20, a modulation laser 21 and an output laser 22 are all DFB lasers and comprising light guiding regions, in a lateral combination. Although in the figure, in order to illustrate the coupling, the three lasers are shown in a line, in fact the master laser 20 couples to multiple lasers in the array, and therefore is not aligned with the other lasers, as shown in FIG. 1 for example.

Each DFB laser has the structure described in relation to FIGS. 7(b) and (c). Alternatively however, the master laser 20, the modulation laser 21 and the output laser 22 are, for example, DBR lasers (as described in relation to FIG. 7 (a)) or ridge lasers (as described in relation to FIG. 6 (a)). The lasers may each be of different type; for example, the master laser 20 may be a DFB laser while the modulation laser 21 and the output laser 22 may be ridge lasers.

FIG. 8 shows a side view along the length of the device, i.e., along the direction along which light is emitted. There are light guiding regions 221a between the master laser 20 and the modulation laser 21, and light guiding regions 221b between the modulation laser 21 and the output laser 22. There is a gap between the master laser 20 and the light guiding region 221, and a gap between the light guiding region 221a and modulation laser 21. There is a gap between the modulation laser 21 and the light guiding region 221b, and a gap between the light guiding region 221b and the output laser 22. There is another light guiding region 223 positioned on the opposite side of the output laser 22 to the first light guiding region 221b. There is a gap between the output laser 22 and the light guiding region 223. The gaps may extend across the entire device in the direction perpendicular to the direction in which light is emitted. The gaps extend down to the buffer layer 206. Light travels between the master laser 20 and the modulation laser 21 though free space in the gaps and the light guiding region 221a. Light travels between the modulation laser 21 and the output laser 22 though free space in the gaps and the light guiding region 221b.

FIG. 8 also shows a cross-section through a direction perpendicular to the direction along which light is emitted are shown. Since multiple lasers may be located alongside each other in a direction perpendicular to the direction along which light is emitted, as shown in FIG. 1 for example, gaps may also be included to separate the lasers in this direction. In another example, the gaps may be filled using, for example si-InP during the level 0A growth step shown in FIG. 9(a).

The light guiding regions comprise a first layer 280 overlying and in contact with the buffer layer 206, a waveguide region overlying and in contact with the first layer 280 and a second layer 282 overlying and in contact with the waveguide region. Light is confined vertically and laterally in the waveguide region. The first layer 280 and second layer 282 may be InP for example. The waveguide region may comprise an InGaAs layer with InAlAs cladding regions.

FIG. 9 (a) shows a flow chart of a method of growth and fabrication of monolithically integrated master laser 20, modulation laser 21 and output laser 22 using a lateral junction. The method can be used to fabricate an array having a master laser 20, modulation lasers 21 and output lasers 22 which are the same types in a lateral combination. The method may be used to fabricate a device such as described in relation to FIG. 8 and FIG. 10.

In this method, the lasers are integrated monolithically on a substrate, for example a si-InP substrate. A si-InP substrate is used to create a lateral junction, in which all the current flows between the lateral n- and p-contacts.

In step S301, a buffer layer 206 is grown followed by an active area structure. In one embodiment, the buffer layer is 200 nm thick. In one embodiment, the buffer layer is semi insulating InP. The active area structure could comprise a multi quantum well (MQW) structure as described in relation to previous figures. This step is referred to as "0-level growth".

The sample is then taken out of the growth machine for step S302, "0-level fabrication". This involves deposition of a dielectric hard mask, which can be a $Si_3N_4$ or $SiO_2$ layer. The thickness of this dielectric layer may be dependent on the thickness of the active area grown and the dry etch selectivity. Next, a photo resist is spun and an n-trench area is defined by optical lithography. After development, the pattern defined in the resist is transferred to the dielectric layer, for example through dry etching based on $CF_4$ or $CHF_3$ chemistry. Next, the remaining resist on the surface is removed in resist remover solution or by $O_2$ plasma washing. Next, a semiconductor dry etch is carried out. $Cl_2$ based chemistry may be used to provide good quality vertical sidewalls.

According to one example, the semiconductor dry etch described above for S302 may be used to form isolation trenches between adjacent lasers in an array, according to the device described in relation to FIG. 8.

According to another example, "0-level fabrication" can include two further steps: "0A-level growth" and "0A-level fabrication". In "0A-level growth" involves the growth of a semi insulating InP layer. After growth, a dielectric hard mask (which can be $Si_3N_5$ or $SiO_2$ as above) is deposited and the hard mask is patterned using for example the same process as for step S302. A semiconductor dry etch is again carried out as per S302 to remove the semiconductor from unwanted areas, such as the areas containing the lasers.

The sample is then ready for step S303, "1-level overgrowth". The dielectric hard mask is left on the area outside of the n-trench. This will provide selective area growth. The n-type layer 228 is grown in the n-trench and the etched area is planarized. The n-type layer 228 may be InP for example.

In step S304, "1-level fabrication" the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and the dry etch selectivity. A photoresist is spun to define a p-trench area by optical lithography and developed. The pattern is transferred to dielectric layer by dry etching, for example based on $CHF_3$ or $CF_4$ chemistry. The resist is then removed, as before. The p-trench area is then dry etched based on $Cl_2$ chemistry.

Step S305, "2-level overgrowth" involves growing an epitaxial p-type layer 230 on top of the etched p-trench area. The p-type layer 230 may be InP for example. The dielectric layer left in previous growth steps enables selective area epitaxy.

Step S306, "2-level fabrication" involves removing the dielectric hard mask by HF dip or dry etching. For a DFB laser, a new dielectric layer is deposited which is then spun with resist and electron beam patterned with grating pattern. This is then dry or wet etched into the dielectric area.

In the final steps n- and p-type contacts are defined on top of the n- and p-type trenches respectively by optical lithography. Appropriate metals for n- and p-contacts are deposited, lifted off and annealed.

Similar devices can be fabricated in two independent runs, diced and then flip chip mounted and aligned on a foreign platform. For example, two InP-based lasers can be flip chip mounted onto a common Si carrier substrate.

Figure 9A:
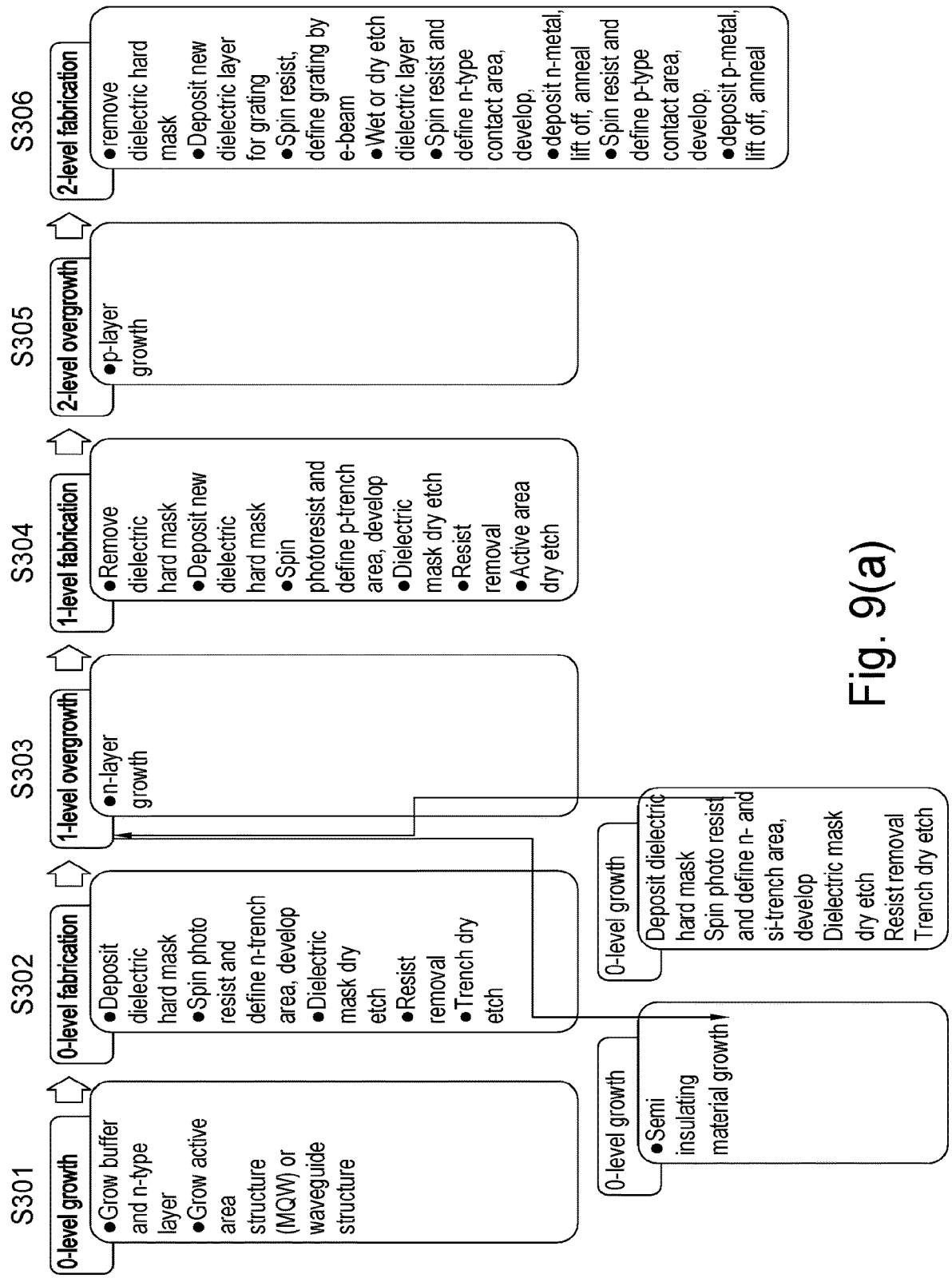
FIG. 9 (*a*) is a flow chart of a method of growth and fabrication of monolithically integrated lasers in accordance with an embodiment.
Figure 9B:
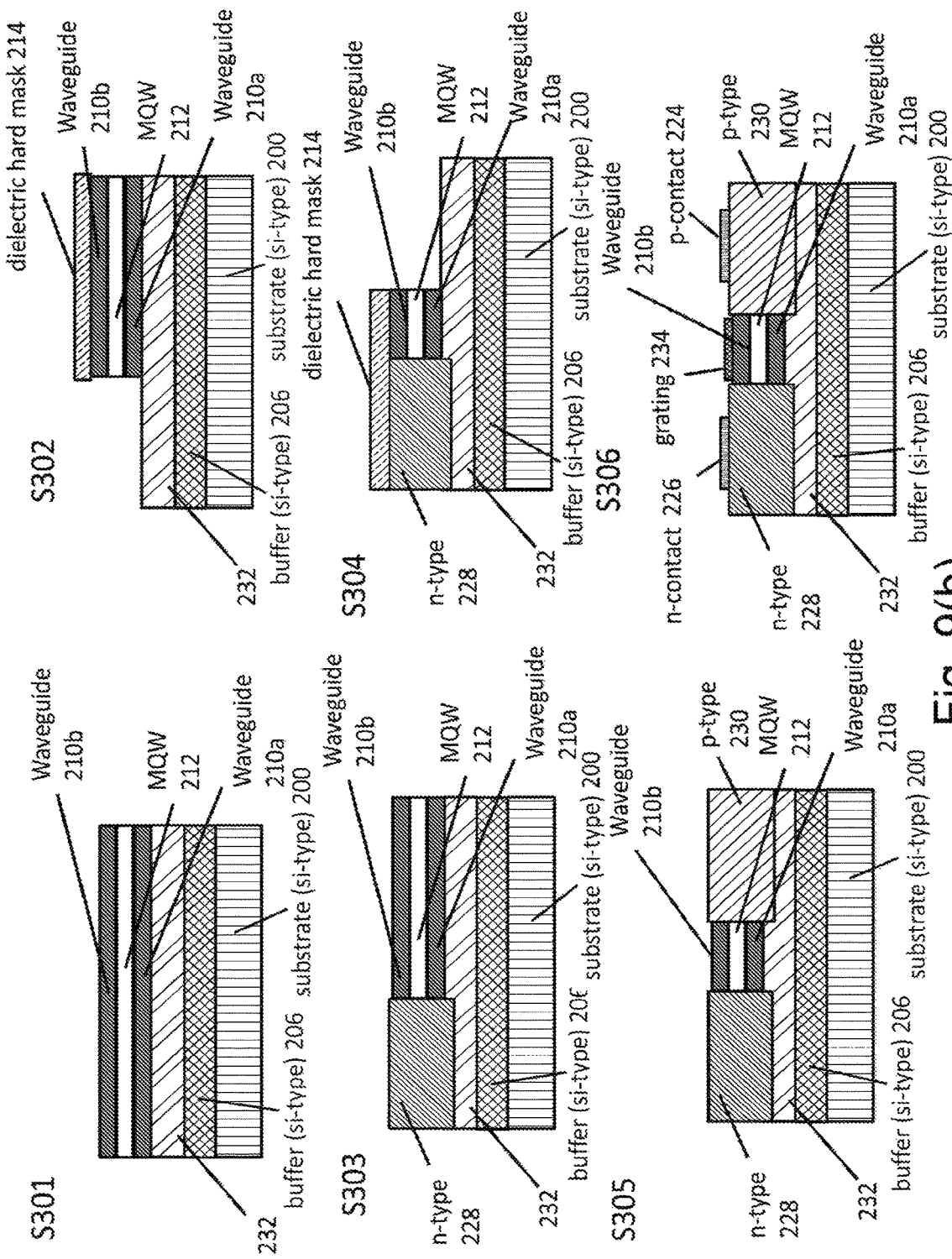

FIG. 9(b) shows the structure of the sample after the steps of FIG. 9(a), for an optical device having DFB lasers.

After step S301, the sample comprises a substrate 200, a buffer layer 206 overlying and in contact with the substrate 200, a layer 232 overlying and in contact with the buffer layer 206, a first waveguide layer 210a overlying and in contact with the layer 232, an MQW layer 212 overlying and in contact with the first waveguide layer 210a and a second waveguide layer 210b overlying and in contact with the MQW layer 212.

After step S302, a plateau comprising the dielectric hard mask 214, second waveguide layer 210b, MQW layer 212 and first waveguide layer 210a is overlying and in contact with part of the layer 232.

After step S303, the n-type layer 228 is overlying and in contact with the layer 232, adjacent to the plateau, and the dielectric hard mask 214 has been removed.

After step S304, there is a plateau comprising the dielectric hard mask 214, overlying and in contact with the n-type layer 228 and the stack comprising the second waveguide layer 210b, MQW layer 212 and first waveguide layer 210a. The plateau is overlying and in contact with part of the layer 232.

After step S305, the n-type layer 228; stack comprising the second waveguide layer 210b, MQW layer 212 and first waveguide layer 210a; and the p-type layer 230 are overlying and in contact with the layer 232. The n-type layer 228 is adjacent to one side of the stack and the p-type layer 230 is adjacent to the opposite side of the stack.

After step S306, a grating is formed on the second waveguide layer 210b. A p-contact metal 224 is overlying and in contact with the p-type layer 230. An n-contact metal 226 is overlying and in contact with the n-type layer 228.

Figure 10:
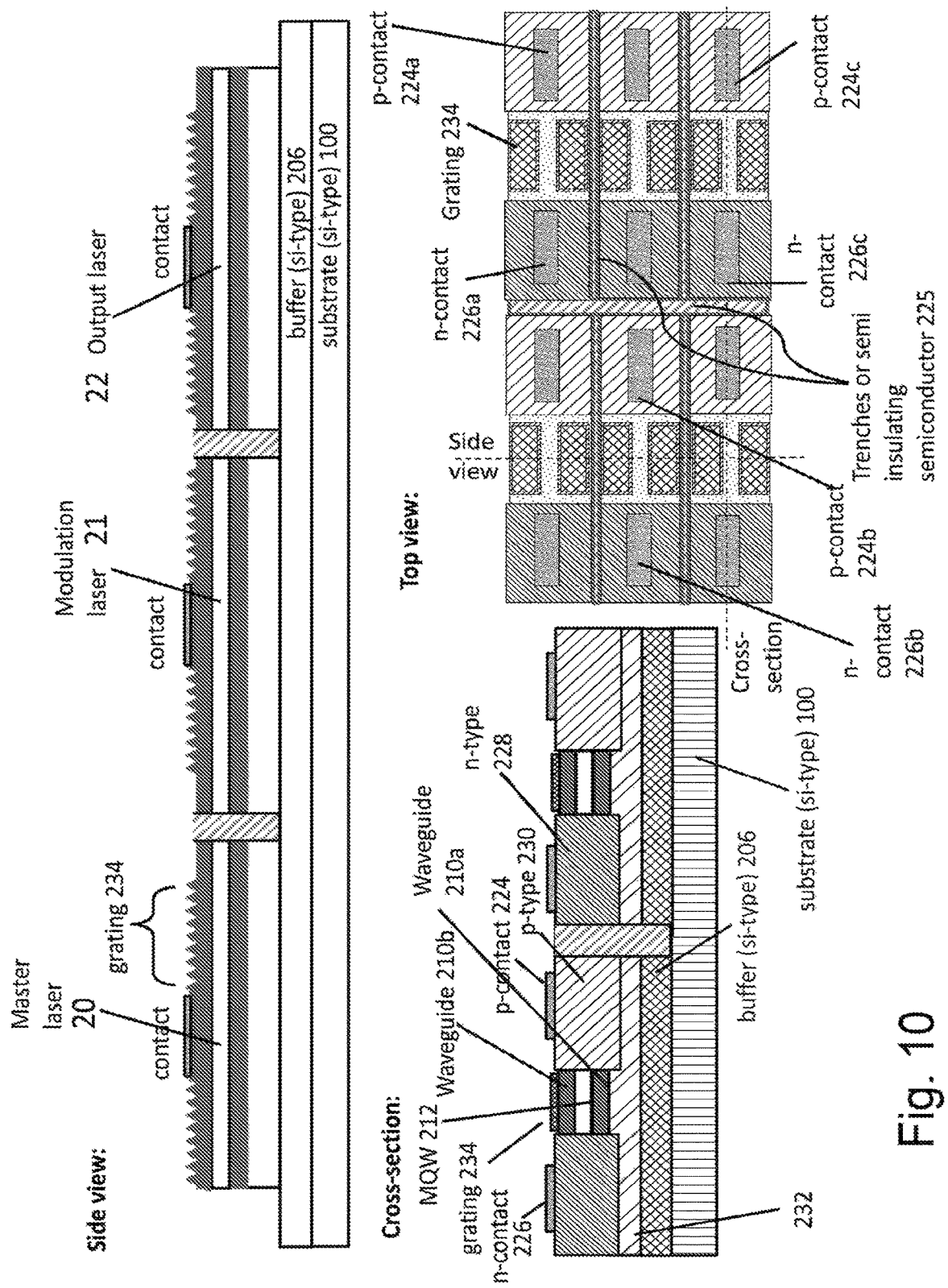
FIG. 10 shows the structure of an optical device in accordance with an embodiment, in which the master laser, modulation laser, and output lasers are all DBR lasers, in a lateral junction and in a lateral combination.

FIG. 10 shows a schematic illustration of an example array in which the master laser 20, the modulation laser 21 and the output laser 22 are all DBR lasers, in a lateral junction and in a lateral combination. Alternatively, the master laser 20, the modulation laser 21 and the output laser 22 could be DFB lasers. The figure shows a side view along the length of the device, i.e. along the direction along which light is emitted, a cross-section through a direction perpendicular to the direction along which light is emitted are shown, and a top view down on the device from above, i.e. in the stacking direction of the layers.

The device comprises a substrate 200, a buffer layer 206 overlying and in contact with the substrate 200 and a layer 232 overlying and in contact with the buffer layer 206. The layer 232 is an extension of the buffer layer. The n-type layer 228; stack comprising the second waveguide layer 210b, MQW layer 212 and first waveguide layer 210a; and the p-type layer 230 are overlying and in contact with the layer 232. The stack is between the n-type layer 228 and the p-type layer 230. The n-type layer 228 is adjacent to one side of the stack and the p-type layer 230 is adjacent to the opposite side of the stack. A p-contact metal 224 is overlying and in contact with the p-type layer 230. An n-contact metal 226 is overlying and in contact with the n-type layer 228.

As shown in the side view and top view, MQW strips run along the length of the device, with gaps in the MQW strips between the master laser 20 and the modulation laser 21, and between the modulation laser 21 and the output laser 22. The gaps may be empty or filled with semi insulating semiconductor. A first p-contact 224a and n-contact 226a are on either side of one section of the MQW strip in the direction perpendicular to the direction of emission of light. On either side of the section of the strip in the direction of the emission of light there is a diffraction grating in the second waveguide material. This forms the master laser 20. A second p-contact 224b and n-contact 226b are on either side of a second section of the MQW strip in the direction perpendicular to the direction of emission of light, which is further along the length of the device from the master light source 20. On either side of the second section of the strip in the direction of the emission of light, there is a diffraction grating in the second waveguide material. This forms the modulation laser 24. A third p-contact 224c and n-contact 226c are on either side of a third section of the MQW strip in the direction perpendicular to the direction of emission of light, which is further along the length of the device from the modulation laser 21. On either side of the third section of the strip in the direction of the emission of light, there is a diffraction grating in the second waveguide material. This forms the output laser 22.

The top view shows the first p-contact 224a on one side of the strip and the first n-contact 226a on the other side of the strip, in the direction perpendicular to the emission of light. These contacts form part of the master laser 20. The second p-contact 224b on one side of the strip and the second n-contact 226b on the other side of the strip, in the direction perpendicular to the emission of light form the modulation laser 21. The third p-contact 224c on one side of the strip and the third n-contact 226c on the other side of the strip, in the direction perpendicular to the emission of light form the output laser 22.

A current is applied between the first p-contact 224a and the first n-contact 226a in order to generate light at the master laser. Light generated in the MQW strip of the master laser 20 is emitted along the MQW layer. The light is laterally confined by the p-type layer 230 and the n-type layer 228, and vertically confined by the waveguide layers 210a and b. The light enters the MQW layer of the modulation laser 21. A time varying current is applied between the second p-contact 224b and the second n-contact 226b of the modulation laser 21. Light generated in the MQW strip of the modulation laser 21 is emitted along the MQW layer. The light is laterally confined by the p-type layer 230 and the n-type layer 228, and vertically confined by the waveguide layers 210a and b. The light enters the MQW layer of the output laser 22. A time varying current is applied between the third p-contact 224c and the third n-contact 226c of the gain switched output laser 22.

Figure 11A:
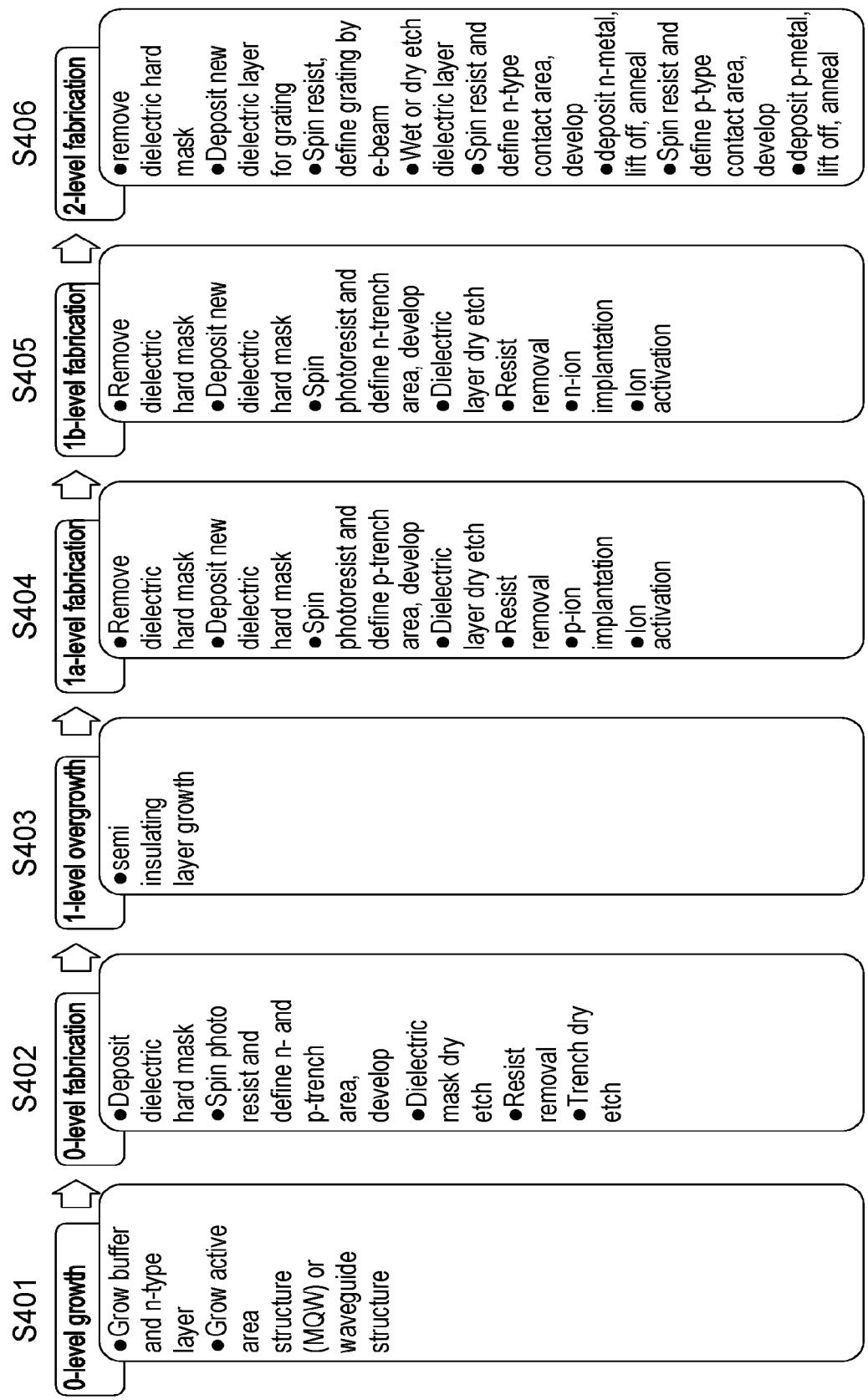
FIG. 11 (*a*) is a flow chart of a method of growth and fabrication of monolithically integrated lasers in accordance with an embodiment where the junction is a lateral junction and is formed via ion implantation.

FIG. 11(a) shows a flow chart of a method of growth and fabrication of a monolithically integrated master laser 20, modulation laser 21 and gain switched output laser 22 in a lateral junction via ion implantation according to an example. The method can be used to fabricate an optical device having lasers which are the same types in a lateral combination. The method may be used to fabricate a device such as described in relation to FIG. 12.

In a device fabricated by this method, the master laser 20, modulation laser 21 and output laser 22 are integrated monolithically on a substrate, for example Si—InP.

In step S401, a buffer layer is grown followed by an active area structure. The buffer layer may be 200 nm. The buffer layer may be Si—InP. The active area structure could be multi quantum well (MQW) structure as described in relation to FIG. 7a above. This step is referred to as "0-level growth".

The sample is then taken out of the growth machine for step S402, "0-level fabrication". This involves deposition of a dielectric hard mask, which could be a $Si_3N_4$ or $SiO_2$ layer for example. The thickness of this layer may be dependent on the thickness of the active area grown and the dry etch selectivity. Next, a photo resist is spun and the n- and p-trench areas are defined by optical lithography. After development, the pattern defined in the resist is transferred to the dielectric layer through dry etching, based on $CF_4$ or $CHF_3$ chemistry for example. Next, the remaining resist on the surface is removed in a resist remover solution or by $O_2$ plasma ashing. Next, a semiconductor dry etch is carried out.

$Cl_2$ based chemistry may be used to provide good quality vertical sidewalls. The depth of the etch may be dependent on the thickness of the active area.

The sample is then ready for step S403, "1-level overgrowth". The dielectric hard mask is left on the device area. This provides selective area growth. The semi insulating layer is grown and the etched area planarized. The semi-insulating layer may be InP for example.

In the step S404, "1a-level fabrication", the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and the dry etch selectivity. A photoresist is spun to define a p-trench area by optical lithography and developed. The pattern is transferred to the dielectric layer by dry etching based on $CHF_3$ or $CF_4$ chemistry. This is selective area etch of the dielectric mask. The resist is then removed. The p-trench area is then implanted with ions which are then activated to create p-doping in the semi insulating layer. Wherever the mask is removed the ions are implanted into the semi-insulating layer. Where the mask remains, the ions will not be implanted.

In the step S405, "1b-level fabrication" the dielectric hard mask is removed. This involves dipping the sample in HF or dry etching. At this point a new dielectric layer is deposited that will act as a new hard mask for dry etching. Again, the thickness of this layer may be dependent on the thickness of the active area grown and dry etch selectivity. A photoresist is spun to define an n-trench area by optical lithography and developed. The pattern is transferred to dielectric layer by dry etching based on $CHF_3$ or $CF_4$ chemistry. The resist is then removed. The n-trench area is then implanted with ions which are then activated to create n-doping in the semi insulating layer.

Step S406, "2-level fabrication", involves removing the dielectric hard mask by HF dip or dry etching. For fabrication of a DFB laser, a new dielectric layer is deposited which is then spun with resist and electron beam patterned with a grating pattern. This is then dry or wet etched into the dielectric area.

In the final steps n- and p-type contacts are defined on top of n- and p-type trenches accordingly by optical lithography. Appropriate metals for n- and p-contacts are deposited, lifted off and annealed.

Similar devices can be fabricated in two independent runs, diced and then flip chip mounted and aligned on a foreign platform. For example two InP-based lasers can be flip chip mounted on a common Si carrier substrate.

Figure 11B:
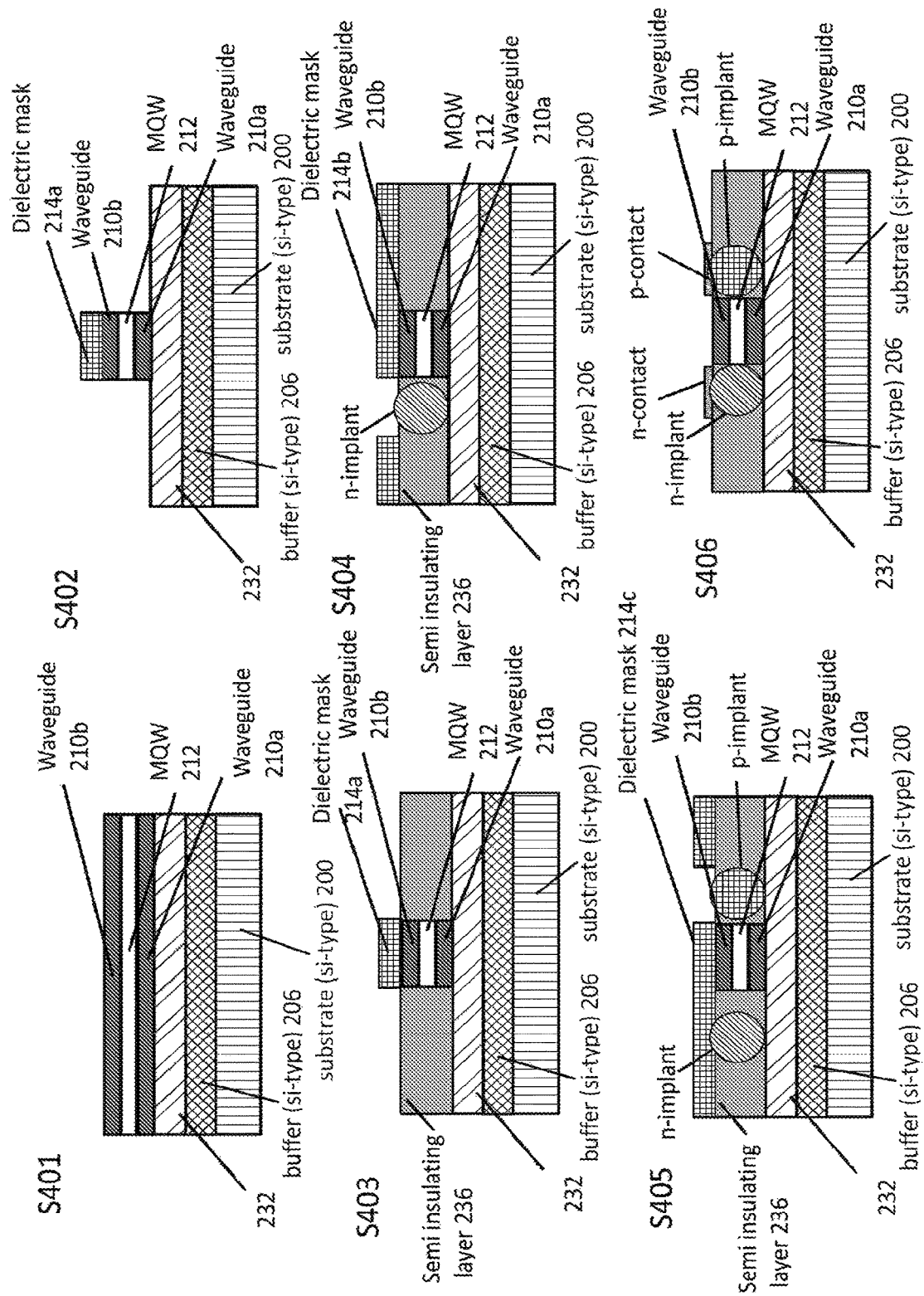

FIG. 11(b) shows the fabrication stages of the method described in relation to FIG. 11(a).

After step S401, the sample comprises a substrate 200, a buffer layer 206 overlying and in contact with the substrate 200, an layer 232 overlying and in contact with the buffer layer 206, a first waveguide layer 210a overlying and in contact with layer 232, an MQW layer 212 overlying and in contact with the first waveguide layer 210a and a second waveguide layer 210b overlying and in contact with the MQW layer 212.

After step S402, the dielectric hard mask 214a, second waveguide layer 210b, MQW layer 212 and first waveguide layer 210a are a ridge which is overlying and in contact with the layer 232.

After step S403, the semi-insulating layer 236 is overlying and in contact with the layer 232 either side of the ridge.

After step S404, a second dielectric hard mask 214b is overlying and in contact with the ridge, the semi-insulating layer 236 on one side of the ridge and part of the semi-insulating layer 236 on the other side of the ridge. There is a region of n-doping in the part of the semi-insulating layer 236 not under the dielectric hard mask 214b.

After step S405, a third dielectric hard mask 214b is overlying and in contact with the ridge, the semi-insulating layer 236 with the n-doping region on one side of the ridge and part of the semi-insulating layer 236 on the other side of the ridge. There is a region of p-doping in the part of the semi-insulating layer 236 not under the dielectric hard mask 214c.

After step S406, a p-type contact is overlying and in contact with the p-doping region in the semi-insulating layer 236. An n-contact is overlying and in contact with the n-doping region in the semi-insulating layer 236.

Figure 12:
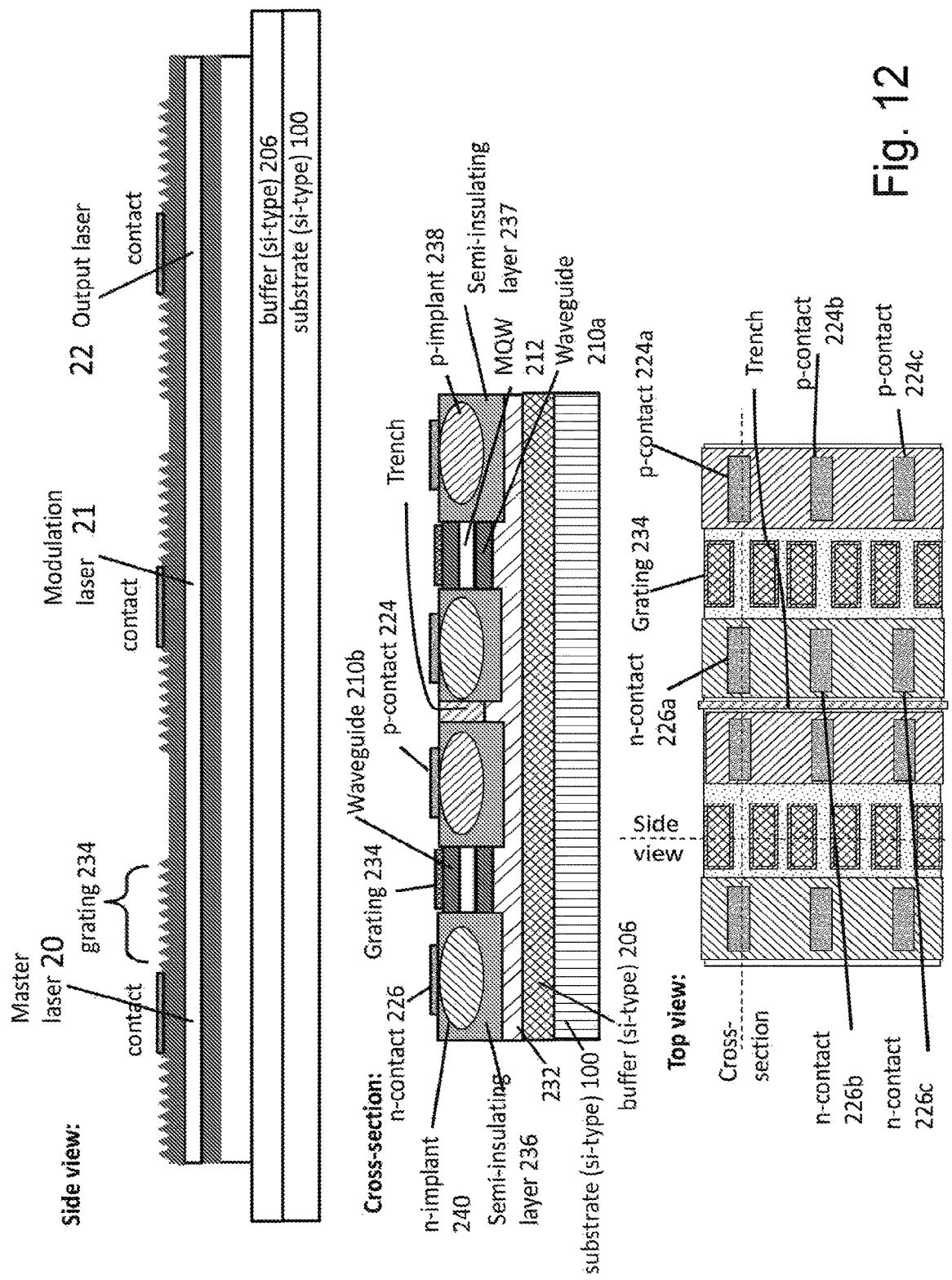
FIG. 12 shows the structure of an optical device in accordance with an embodiment, in which the master laser, modulation laser and output laser are all DBR lasers, in a lateral junction and in a lateral combination and fabricated via ion implantation.

FIG. 12 shows a schematic illustration of an optical device in accordance with an embodiment, in which the master laser 20, modulation laser 21 and gain switched output laser 22 are all DBR lasers, in a lateral junction and in a lateral combination and fabricated via ion implantation. Alternatively, the master laser 20, modulation laser 21 and gain switched output laser 22 could be DFB lasers. The figure shows a side view along the length of the device, i.e. along the direction along which light is emitted, a cross-section through a direction perpendicular to the direction along which light is emitted are shown and a top view down on the device from above, i.e. in the stacking direction of the layers.

The device comprises a substrate 100, a buffer layer 206 overlying and in contact with the substrate 200 and a layer 232 overlying and in contact with the buffer layer 206. A semi-insulating layer 237; stack comprising the second waveguide layer 210b, MQW layer 212 and first waveguide layer 210a; and the semi-insulating layer 237 are overlying and in contact with the layer 232. The stack is between the semi-insulating layer 236 and the semi-insulating layer 237. The semi-insulating layer 236 is adjacent to one side of the stack and the semi-insulating layer 237 is adjacent to the opposite side of the stack. The semi-insulating layer 236 comprises n-implant region 240 and the semi-insulating layer 237 comprises p-implant region 238. A p-contact metal 224 is overlying and in contact with the semi-insulating layer 237. An n-contact metal 226 is overlying and in contact with the semi-insulating layer 236.

As shown in the side view and top view, the MQW strip runs along the length of the device. A first p-contact 224a and n-contact 226a are on either side of part of the MQW strip in the direction perpendicular to the direction of emission of light. On either side of the part of the strip in the direction of the emission of light there is a diffraction grating in the second waveguide material. This forms the master laser 20. A second p-contact 224b and n-contact 226b are on either side of a second part of the MQW strip in the direction perpendicular to the direction of emission of light, which is further along the length of the device from the master light source 20. On either side of the second part of the strip in the direction of the emission of light, there is a diffraction grating in the second waveguide material. This forms the modulation laser 24. A third p-contact 224c and n-contact 226c are on either side of a third part of the MQW strip in the direction perpendicular to the direction of emission of light, which is further along the length of the device from the modulation laser 21. On either side of the third part of the strip in the direction of the emission of light, there is a diffraction grating in the second waveguide material. This forms the output laser 22.

The top view shows the first p-contact 224a on one side of the strip and the first n-contact 226a on the other side of the strip, in the direction perpendicular to the emission of light. These contacts form part of the master laser 20. The second p-contact 224b on one side of the strip and the second n-contact 226b on the other side of the strip, in the direction perpendicular to the emission of light form the modulation laser 21. The third p-contact 224c on one side of the strip and the third n-contact 226c on the other side of the strip, in the direction perpendicular to the emission of light form the output laser 22.

A current is applied between the first p-contact 224a and the first n-contact 226a in order to generate light at the master laser. Light generated in the MQW strip of the master laser 20 is emitted along the MQW layer. The light is laterally confined by the semi-insulating layer 236 and the semi-insulating layer 237, and vertically confined by the waveguide layers 210a and b. The light enters the MQW layer of the modulation laser 21. A time varying current is applied between the second p-contact 224b and the second n-contact 226b of the modulation laser 21. Light generated in the MQW strip of the modulation laser 21 is emitted along the MQW layer. The light is laterally confined by the semi-insulating layer 236 and the semi-insulating layer 237, and vertically confined by the waveguide layers 210a and b. The light enters the MQW layer of the output laser 22. A time varying current is applied between the third p-contact 224c and the third n-contact 226c of the gain switched output laser 22. Light generated in the MQW strip of the output laser 22 is emitted along the MQW layer. The light is laterally confined by the semi-insulating layer 236 and the semi-insulating layer 237, and vertically confined by the waveguide layers 210a and b.

The cross-section and top views of FIG. 12 show two sets of lasers placed side by side. Each set comprises a master laser 20, a modulation laser 21, and an output laser 22, as described above. Adjacent sets of lasers are separated by a trench etched in the semi-insulating layer 237. Separation using a trench may avoid or minimise cross-talk between adjacent lasers.

Figure 13:
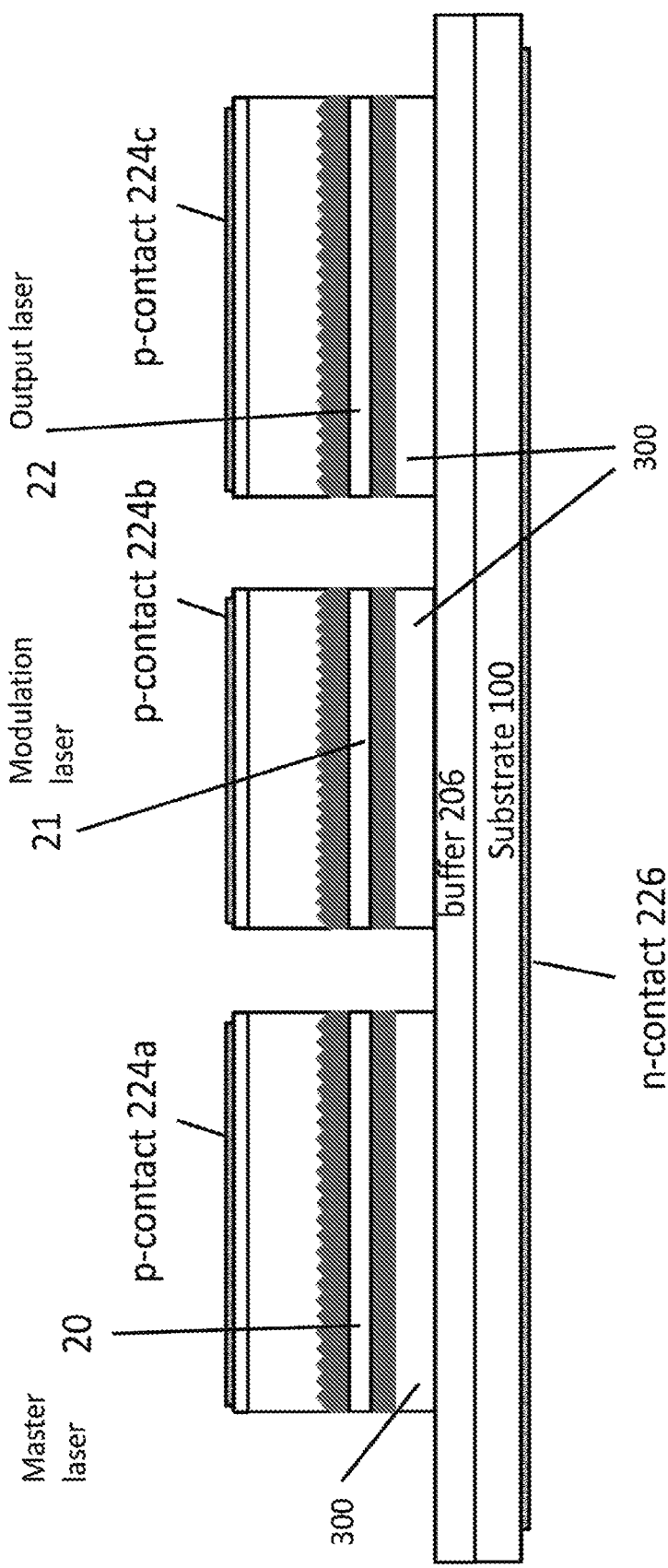
FIG. 13 shows the structure of an optical device in accordance with an embodiment, in which the master laser, modulation laser and output laser are all DFB lasers, in a lateral combination, each laser is formed separately and then flip-chip bonded to a common substrate.

FIG. 13 shows a schematic illustration of an optical array in accordance with an example, in which the master laser 20, modulation lasers 21 and output lasers 22 are in a lateral combination and are separate chips flip-chip bonded to a common substrate 100.

In this case, the master laser 20, the modulation lasers 21 and the output lasers 22 are DFB lasers. However, one or more of the master laser 20, the modulation lasers 21 or the output lasers 22 may be a stripe laser for example.

The master laser 20 is fabricated as described in relation to FIG. 6(b) above. The diffraction grating is configured such that a single DFB laser is formed. The master laser 20 may be formed on an InP substrate for example. The modulation lasers 21 and the output lasers 22 are fabricated separately, again as described in relation to FIG. 6(b) above. The diffraction grating is again configured such that a single DFB laser is formed. The output laser 22 may also be formed on an InP substrate for example. The result of these processes is two separate InP based DFB lasers.

Each DFB laser is then diced and flip chip mounted and aligned on a foreign platform. The foreign platform may be a Si substrate. Each DFB laser wafer is diced and each individual DFB laser is placed on a foreign substrate. The DFB lasers are aligned accurately. The devices are then thermally or pressure bonded to the platform. Adhesion can be provided by a metal layer for example, using metal to metal bonding.

FIG. 13 shows a side view along the length of the device, i.e. along the direction along which light is emitted.

The device comprises a substrate 100. On one surface of the substrate is an n-contact 226. Overlying and in contact with the opposite surface to the substrate 100 is the buffer layer 206. Overlying and in contact with the buffer layer 206 is the master laser 20, the modulation laser 21, and the gain switched output laser 22. The layers 300 at the surface of the master laser 20, the modulation laser 21, and the gain switched output laser 22 overlying and in contact with the buffer layer 206 are InP.

As shown in the side view, there is a gap between the master laser 20 and modulation laser 21. There is also a gap between the modulation laser 21 and the output laser 22. The gaps may extend across the entire device in the direction perpendicular to the direction in which light is emitted. The gaps extends down to the buffer layer 206.

A current is applied between the first p-contact 224a and the first n-contact 226a in order to generate light at the master laser. Light generated in the MQW strip of the master laser 20 is emitted along the MQW layer. The light is laterally confined by the p-type layer 230 and the n-type layer 228, and vertically confined by the waveguide layers 210a and b. The light enters the MQW layer of the modulation laser 21. A time varying current is applied between the second p-contact 224b and the second n-contact 226b of the modulation laser 21. Light generated in the MQW strip of the modulation laser 21 is emitted along the MQW layer. The light is laterally confined by the p-type layer 230 and the n-type layer 228, and vertically confined by the waveguide layers 210a and b. The light enters the MQW layer of the output laser 22. A time varying current is applied between the third p-contact 224c and the third n-contact 226c of the gain switched output laser 22.

In the above described arrays, each of the plurality of first optical components 21 comprises a laser. However, alternatively, one or more of the plurality of first optical components comprises a phase modulator instead. The phase modulators may be electro-optic modulators, wherein the refractive index of the material is a function of applied electric field. Changes in refractive index result in changes in optical path length and this results in changes in the phase shift applied by phase modulator. Different voltages are applied to the phase modulator so as to impart a different phase shift. The reference laser 20 is optically coupled to a plurality of waveguides, each comprising a phase modulator, the phase modulators being the first optical components 21. Each waveguide is coupled to the input of the corresponding output laser 22. The coherent light from the master laser 20 travels along the waveguide, and a phase shift is applied during a period of time that the coherent light from the reference laser is received in the phase modulator. Each of the plurality of phase modulators is therefore configured to output coherent light during a period of time that the coherent light from the reference laser 20 is received. In this case, the coherent light from the reference laser 20 itself is output, with an additional phase shift applied. The phase shift is applied by the first controller 50.

A phase modulator such as described can comprise a crystal, such as a LiNbO$_3$ crystal, in which the refractive index is a function of electric field strength. Alternatively, each phase modulator may be a thermo-optic modulator, wherein the optical path length is a function of the temperature, and the temperature is varied for example, by means of micro heaters integrated on the substrate. Changes in optical path length result in changes in phase shift applied by the phase modulator. The relative phase shift applied to the plurality of phase modulators is set by one or more first controllers, configured to apply phase control signals to said plurality of phase modulators.

In the above described arrays, each of the plurality of second optical components 22 comprises a laser. However, alternatively, one or more of the plurality of second optical components comprises an intensity modulator. An intensity modulator modulates the intensity of incoming light pulses. In an "off" state, the intensity modulator reduces the intensity of the light to a low level. In an "on" state, the intensity modulator allows a larger fraction of the incoming light to exit. An intensity modulator may modulate the intensity of the light by changing the absorption coefficient of the material in the modulator, for example an electro-absorption modulator. An electro-absorption modulator is a semiconductor device for which the voltage applied to the device changes the absorption coefficient, and therefore the intensity of light travelling through the device. In another embodiment the intensity modulator is based on a Mach-Zehnder interferometer. A Mach-Zehnder based intensity modulator changes the phase difference between the two arms of the interferometer to modulate the output intensity.

One or more of the first optical components 21 are each coupled to a waveguide. Each waveguide comprises an intensity modulator corresponding to the second optical components 22. The coherent light from the modulation laser 21 travels along the waveguide, and an intensity modulation is applied during a period of time that the coherent light from the reference laser is received in the intensity modulator, to generate a short light pulse. Each of the plurality of intensity modulators is therefore configured to output at least one short light pulse during a period of time that the coherent light from the modulation laser 21 is received. In this case, the light from the modulation laser 21 itself is output, with an intensity modulation applied to generate one or more short light pulses. The intensity modulator is controlled by the second controller 60. Further intensity control of the intensity of the short light pulse may be applied.

Alternatively, one or more of the plurality of first optical components and/or one or more of the plurality of second optical components comprises a semiconductor optical amplifier (SOA) instead of a laser. The optical amplifier may comprise an MQW. A SOA may also be gain-switched. Therefore a controller may be connected to a SOA and switch the SOA between an "on" state and an "off" state by applying a time-varying signal. For example, where a first optical component is a SOA, the first controller applies a time-varying signal to alter the gain, and to apply a phase shift in the same manner as described above in relation to a laser. Similarly, where a second optical component is a SOA, the second controller applies a time varying signal to control emission time and intensity of the short pulses. In order to modulate the gain of a SOA, a controller applies a time varying signal, for example a time varying current which may have the form of a series of current modulation pulses. When a current modulation pulse is applied to the SOA, the injected carriers increase the carrier density and light inputted into the SOA is amplified sufficiently by stimulated emission to generate an output. At this point the current modulation pulse may be timed to switch back down to the DC bias level, and the output dies off quickly, to generate short light pulses. Longer pulses may alternatively be generated, where a SOA is used in place of the first optical component. When the SOA 22 is switched into an "on" state, the incident light is amplified and emitted from the SOA 22. When the SOA 22 is switched into an "off" state, incoming light is absorbed.

Returning to FIG. 1, the figure shows a schematic illustration of a source array 10 optically connected to an emitter array 11. The operation and components of the source array 10 have been described above. The emitter array 11 comprises an array of out-coupling elements that are optically connected via optical waveguides to the second optical components 22.

Out-coupling elements are optical components configured to receive light from a waveguide in a first direction, the in-plane direction, and transmit said light in free-space in a second direction. The second direction has a component in the out of plane direction. In the examples shown in FIG. 14 (a), the second direction is substantially parallel to the out of plane direction.

By using out-coupling elements to transmit the light from the array device, the locations of the master laser 20, first optical components 21 and second optical components 22 is decoupled from the emission. For example, the lasers may be located in a location close to an external part of the system for better heat dissipation. The passive 2D emission array is located with the emission optics. The emission optics may comprise an enclosure and aperture/window for example. Use of the optical phase array design means that focussing optics are not required. Furthermore, the relative locations of the master laser 20, first optical components 21 and second optical components 22 can be chosen based on heat dissipation for example, rather than emission constraints. For example, the lasers may be spaced apart from each other, to improve heat dissipation, which the out-couplers are arranged close together such that interference occurs. In one example, neighbouring out-couplers are separated by a distance equal to half of the operating wavelength. In another example, neighbouring out-couplers are separated by a distance of the order of tens of micrometres.

Furthermore, the individual laser length of the laser based components can be increased for narrower linewidth and more power. This can provide improved signal to noise ratio.

Figure 14A:
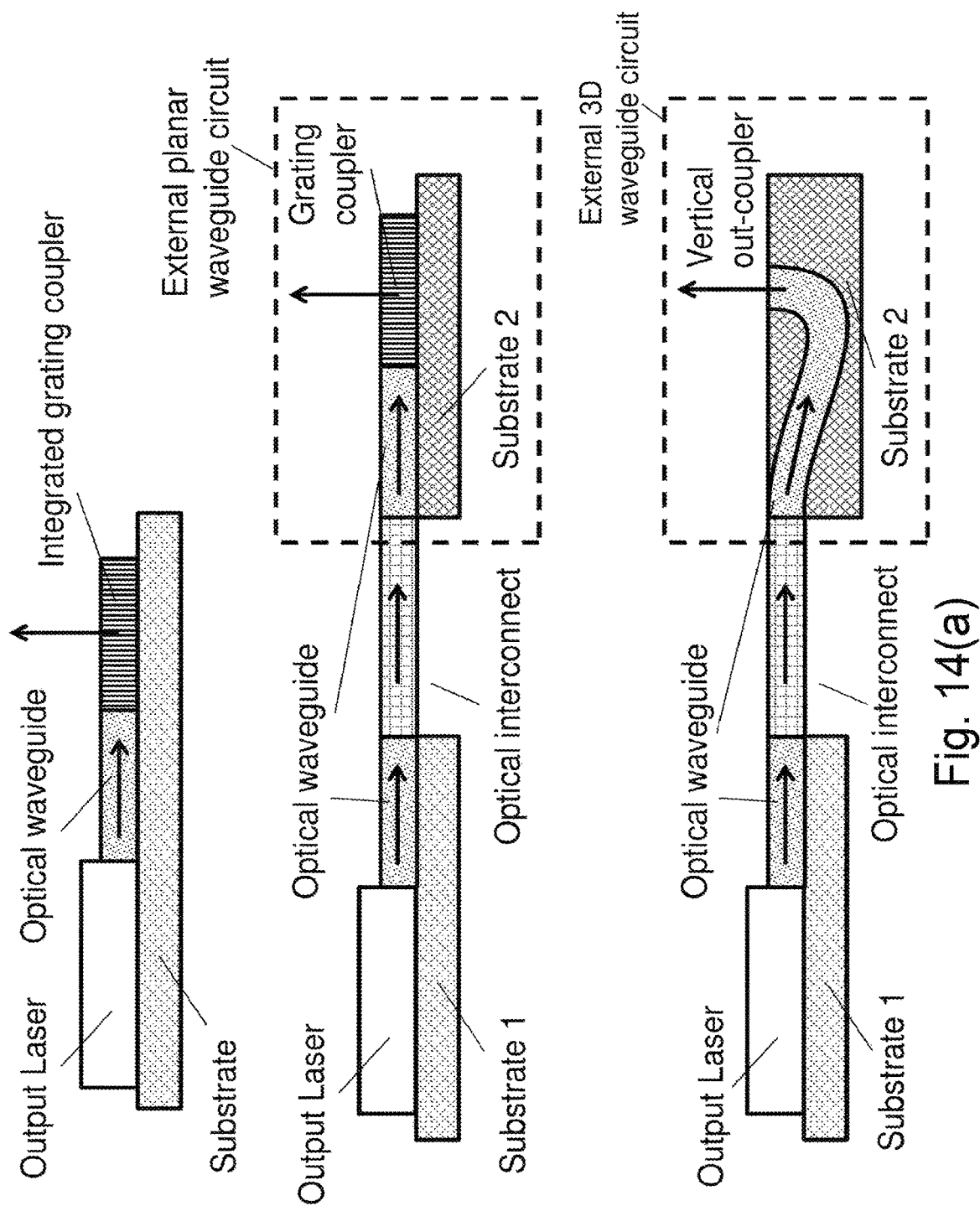
FIG. 14 (a) shows a schematic illustration of out-coupling elements used in optical array.

FIG. 14 (a) shows a schematic illustration of example out-coupling elements that may be used in the emitter array 11.

The emitter array 11 comprises the out-coupling elements and optical waveguides that connect to the out-coupling elements. These may be disposed on a substrate. The substrate may be a semiconductor substrate. For example, the substrate may be the first substrate comprising the source array 10, such that the source array 10 and the emitter array 11 are integrated on the same substrate. All the elements are thus integrated onto a single chip; meaning this resulting device may be compact and cheap to manufacture using top-down fabrication approaches. An example where the out-coupling elements and the emitter array 11 are integrated on a single chip is shown in the upper figure in FIG. 14 (a).

Alternatively, the array of out-coupling elements and the optical waveguides that connect to the out-coupling elements are disposed on a second substrate, the second substrate being separate from the first substrate. The second substrate may be of the same material as the first substrate. Alternatively, the second substrate may be a different material. The second substrate may be arranged in a plane substantially parallel to the first direction, which is parallel to the plane of the first substrate. Alternatively, the plane of the second substrate may form an angle with the plane of the first substrate. An example where the out-coupling elements and the emitter array are integrated on separate substrates is shown in the middle and lower figures in FIG. 14 (a).

The out-coupling elements transform a bound optical mode in a waveguide to a free-space radiating mode.

Figure 14B:
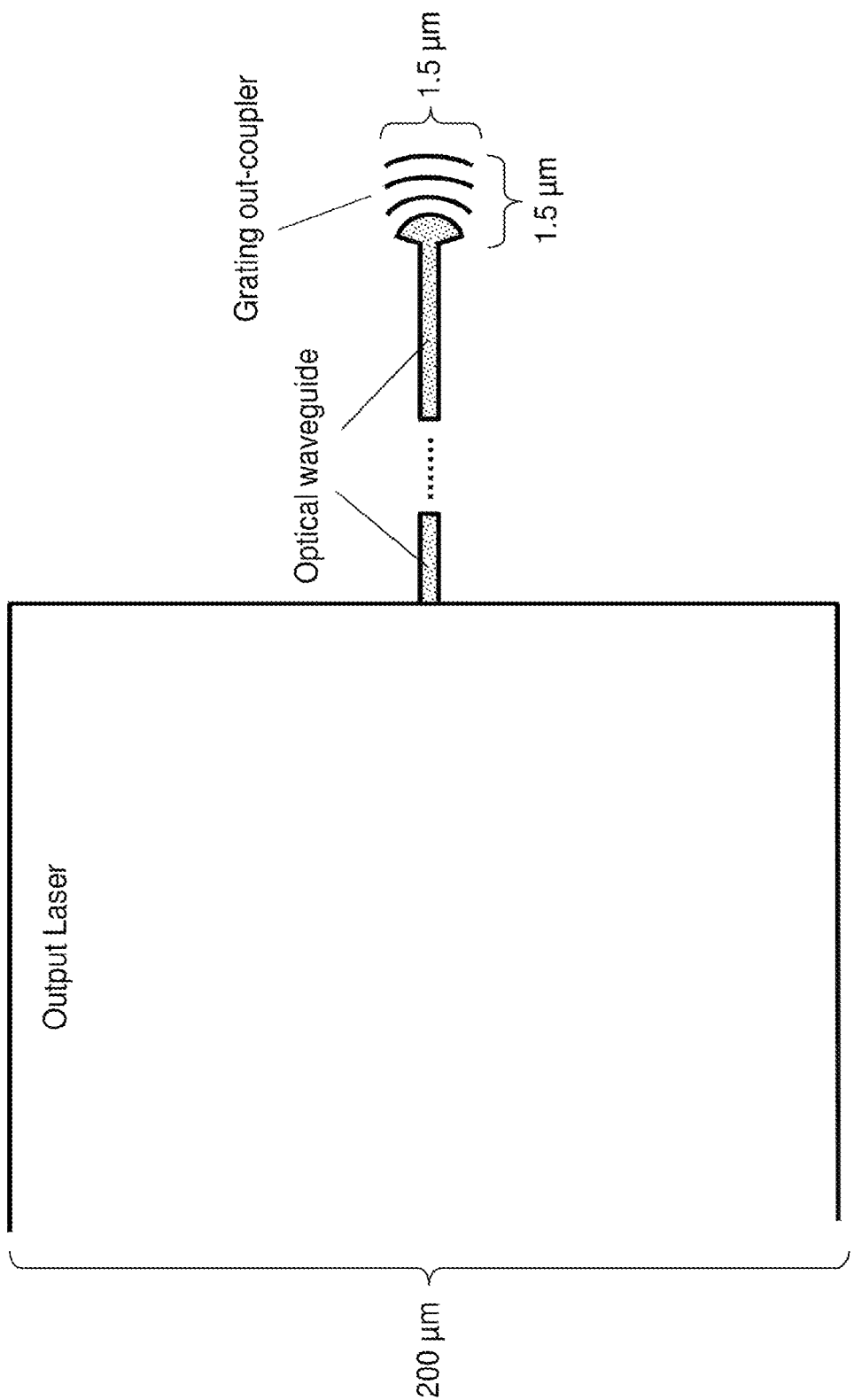

Out-couplers may comprise grating couplers as shown in the upper and middle figures in FIG. 14 (a). A grating coupler can be integrated onto a semiconductor substrate and fabricated cheaply using semiconductor fabrication techniques. They can be fabricated together with the source array for example. A grating coupler may comprise trenches etched vertically down into the waveguides at regular spacings, within a particular region at a desired location. Fabricating the grating couplers may comprise spinning the sample with an electron beam lithography resist and defining a grating pattern with electron beam lithography in the desired locations. The grating dimensions, i.e. the spacing between the trenches, may depend on the laser output wavelength. After development the pattern is transferred by wet or dry shallow etching. Gratings are formed by etching through at least part of the waveguide layer. The trenches may have a groove-shaped pattern. The etching may be performed through all or part of the waveguide. The etching depth may be varied in order to emit a larger portion of the light in the "upward" direction, i.e. the direction perpendicular to the substrate surface and towards the target, and less of the light in the "downward" direction, i.e. the direction perpendicular to the substrate surface but away from the target. An example for the typical size of an integrated out-coupler for operation at 1550 nm is shown in FIG. 14(b).

Alternatively, the out-coupling element comprises a waveguide that, at the proximal end to the source array is aligned in the first direction, and gradually curves such that is aligned to the second direction at the distal end. This may be referred to as a "3D" waveguide. As above, the second direction makes an angle with the first direction. Thus the out-coupling element collects light from the first direction and transmits it in the second direction. An example of such an out-coupling element is shown in the lower figure of FIG. 14 (a). Such a waveguide may be fabricated by focusing a laser inside the material, and writing the 3D waveguide region. The refractive index of the material is altered at the locations where the laser has focused, forming the waveguide.

Alternatively, the out-coupling element comprises metasurfaces, which are planar structures that locally modify the emission properties of light. Metasurfaces can be integrated onto a semiconductor substrate and can be fabricated in the same manner as the grating couplers described above. The planar structures may comprise trenches and/or posts and the separation between adjacent the structures may be smaller than the wavelength of the light. The arrangement of the planar structures may be regular, or may be random.

Each out-coupling element is optically coupled to an output laser 22 such that light emitted from the output laser 22 enters the out-coupling element in the in-plane direction and is emitted in the out of plane direction. As described previously, the timing of the light pulse emission from the output lasers 22 may be controlled such that pulses from the output lasers 22 reach the out-coupling elements at the same time.

Optical waveguides connect the second optical components 22 of the source array to the array of out-coupling elements. The optical waveguides may be integrated on the semiconductor substrate, as described above in relation to FIG. 8, or may include optical interconnects connecting between substrates where the emitter array is located on a separate substrate for example. Interconnects may connect a light guiding region on a semiconductor substrate to a light guiding region on another semiconductor substrate, and may comprise an optical fibre for example. Alternatively, the chips may be directly bonded for example, or flip chip bonded to a third substrate.

Figure 15:
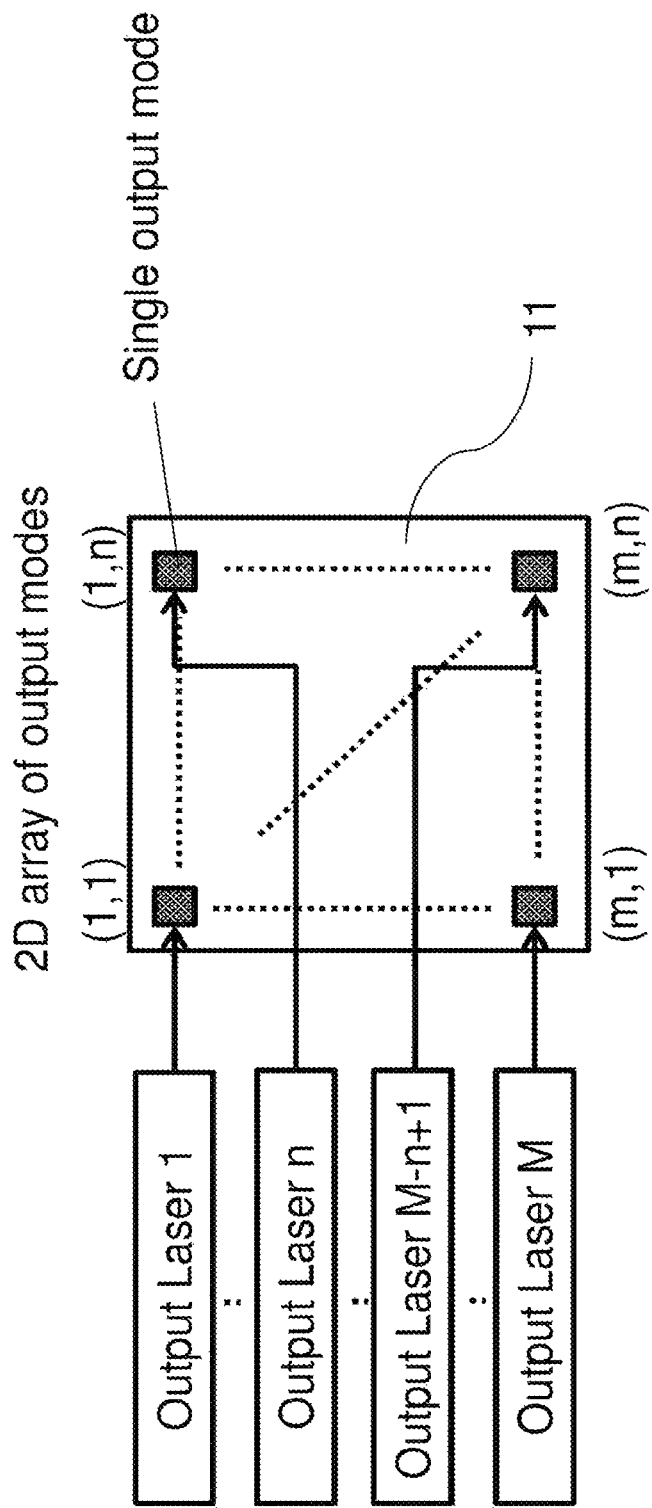
FIG. 15 shows a schematic illustration of an array of out-coupling elements arranged in a 2D m×n array and connected to M output lasers.

FIG. 15 shows a schematic illustration of an array of out-coupling elements arranged in a 2D m×n array. In this example, M output lasers, where M=m×n, are provided such that each output laser is optically connected to one out-coupler. The M output lasers are arranged in a M×1 array. The first output laser may be connected to the out-coupler in row 1 and column 1, and the $n^{th}$ output laser may be connected to the out-coupler in row 1 and column n, and so on until the $(M-n+1)^{th}$ laser which may be connected to the out-coupler in row m and column n, and the $M^{th}$ laser which may be connected to the out-coupler in row m and column 1, the emission of M output lasers is arranged into a 2D array with m×n=M pixels, with the output pulses from each output being emitted perpendicular to the surface of the chip. The out-couplers are arranged in a regular m×n array, where the spacings between neighbouring out-couplers are the same. Each optical out-coupler has a square cross-section in this example, but other shapes may be used. The distance between the centre of one out-coupling element and the centre of a neighbouring out-coupling element is d, where d is the same for all elements in this example.

Alternatively, the source array comprises M output lasers 22, each being connected to one of the m×n out-couplers. In other words, M=m×n. The M output lasers 22 are arranged in an m×n array. FIG. 16(a) shows a schematic illustration of an example regular 2D m×n array of out-couplers, where each out-coupler outputs a single mode. The out-couplers are arranged to form a regular rectangular array of out-couplers, neighbouring out-couplers being separated by a distance d. The m×n output modes are arranged in a regular 2D array where each out-coupler, or pixel, is spaced by d from its nearest neighbours, d being the distance between the centre of one out-coupler and the centre of a neighbouring out-coupler. By varying the pixel spacing, higher order interference may be obtained. In another example, d is set to half of the operating wavelength to obtain a single laser spot in the far-field.

In an alternative example, M output lasers from the source array, arranged in an M×1 array, are optically connected to each row of the m×n array of out-couplers. In other words, M=m, and output laser 1 is optically connected to n out-couplers in row 1, output laser 2 is optically connected to n out-couplers in row 2, and so on. The optical energy from one output laser can be guided into n different tracks using, for example, a directional coupler as described above.

Figure 16B:
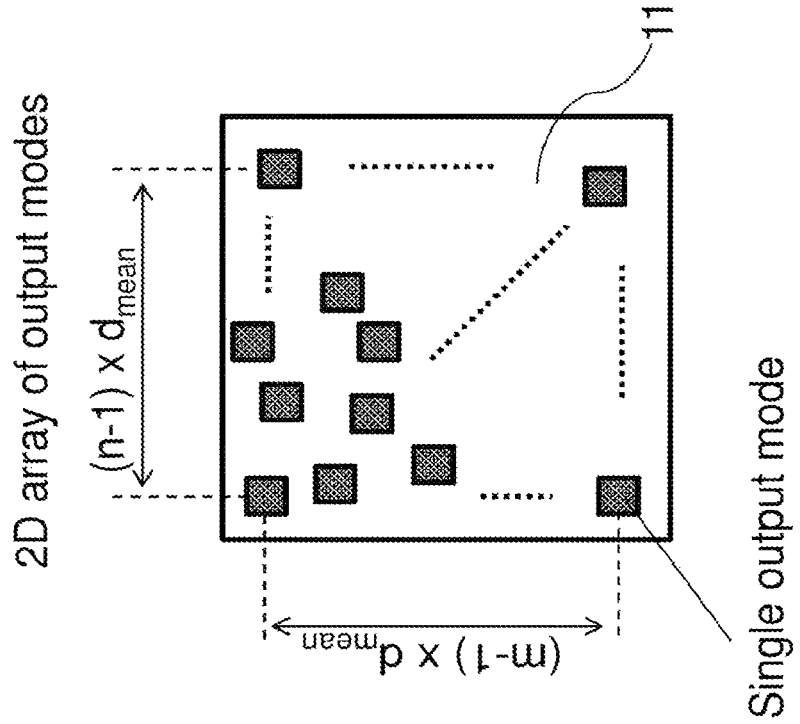
FIG. 16 (a) shows a schematic illustration of an array of out-coupling elements arranged in a regular 2D m×n array.
Figure 16A:
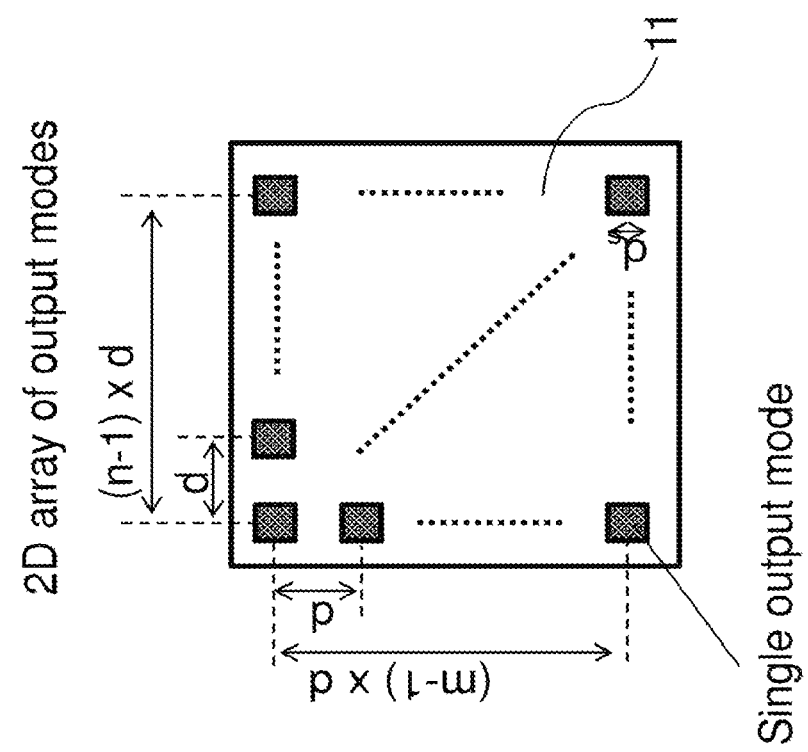

FIG. 16(b) shows an alternative example, in which the out-couplers are arranged in a 2D random array, where each out-coupler is spaced by a different distance from its nearest neighbour. The random arrangement may provide a far field light distribution where higher order foci are suppressed.

The optical out-couplers provide means to arrange the emission of the output lasers into a 2D spatial array.

Light outputted by the source array 10 is fed into the emitter array 11, where it is emitted into free-space by the out-couplers. Each out-coupler emits light with a particular phase and intensity, set by the source array 10. The position of the far field intensity is controlled by setting appropriate values for the relative phase of all output lasers in the array, as will be described below.

Figure 17:
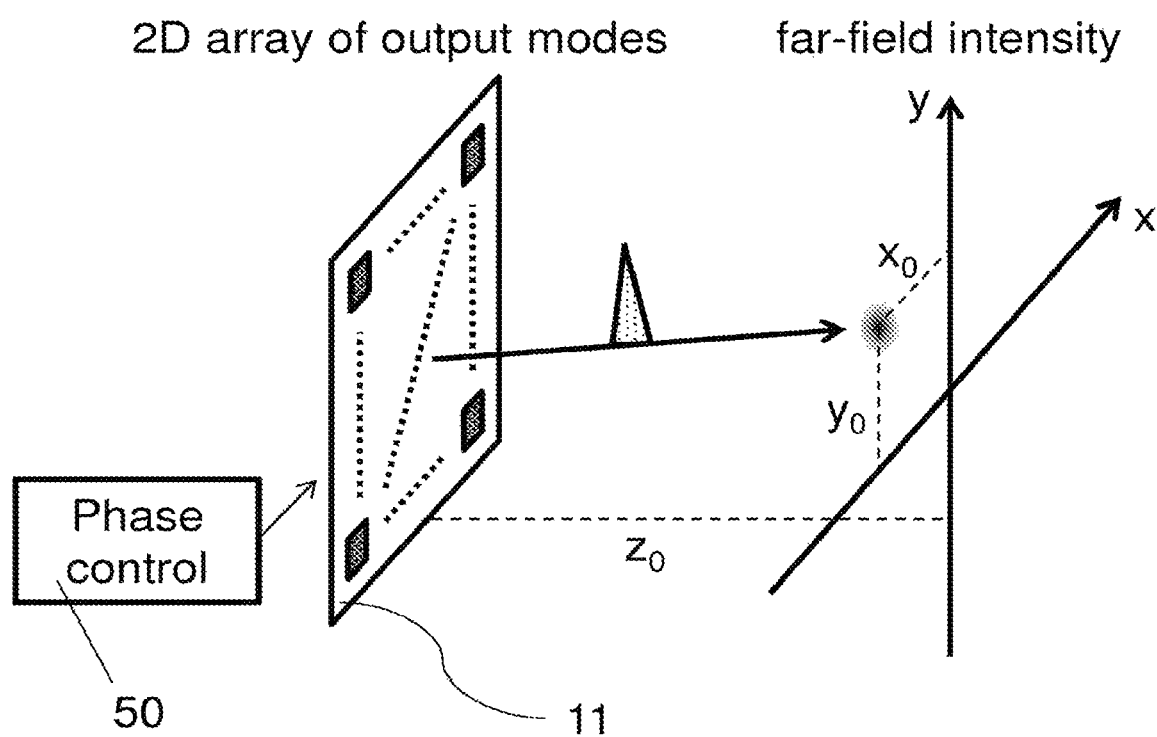
FIG. 17 shows a schematic illustration of the far-field emission from an optical device.

In this section, a 2D rectangular m×n array of out-couplers is described; however, the results can also be adapted other arrangements. Emission from the emitter array may result in a far field intensity pattern having a single laser spot. The far field intensity pattern can be calculated using an approximate analytical expression such as the Fraunhofer approximation, for example. FIG. 17 shows a schematic illustration of the far-field emission from the optical device. FIG. 18(c) shows the far-field pattern across the x axis direction. The far-field pattern across the y-axis direction is the same. The far-field intensity pattern shown in FIG. 18 (c) is calculated using the Fraunhofer approximation.

In FIG. 18(c), the envelope (dashed line) is the normalised far field intensity that would be obtained if light was emitted by a single out-coupler (that is a single point source which is assumed to emit a Gaussian beam profile) in the centre of the array. The dashed line determines the beam steering range for a 0 order array. The solid line shows the far field intensity calculated from an m×n array of radiating pixels having a spacing of d (such as shown in FIG. 16(a) for example), and the calculation assumes a Gaussian beam is emitted by each pixel (or out-coupling element) having an aperture size $d_s$. The spacing, d, is set to be half of the operating wavelength in this example.

In FIG. 18(c), the far field pattern has a zero-order laser focus spot at a location corresponding to the centre of the array, i.e. x=y=0, when the beam emitted by each out-coupler has the same intensity and the same phase (that is the relative phase difference between light emitted at each out-coupler is zero). In general, the far-field spot size is inversely proportional to the array area, which is given by $(m-1) \times (n-1) \times d^2$.

The position of the laser focus can be controlled by setting appropriate values for the relative phase of the output lasers in the array, by using the first controller 50 to control the phase shift applied at the modulation lasers 21. Constructive interference between neighbouring output modes will occur at an angle θ when the wave fronts are in phase as shown in FIG. 18(d). This angle is given by $\theta = \sin^{-1} \varphi\lambda/2\pi d$ with φ being the relative phase between neighbouring output lasers. This results in a displacement $x_0 = z_0 \tan \theta$ in the far-field at $z_0$. The same applies for a displacement $y_0$ along the y-axis. FIG. 17 shows the laser spot being deflected away from the central position by setting appropriate values for the relative phases. The steering angle is controlled by the phase $\Delta\varphi_{(m/n)}$ between neighbouring pixels.

Figures 18A, 18B:
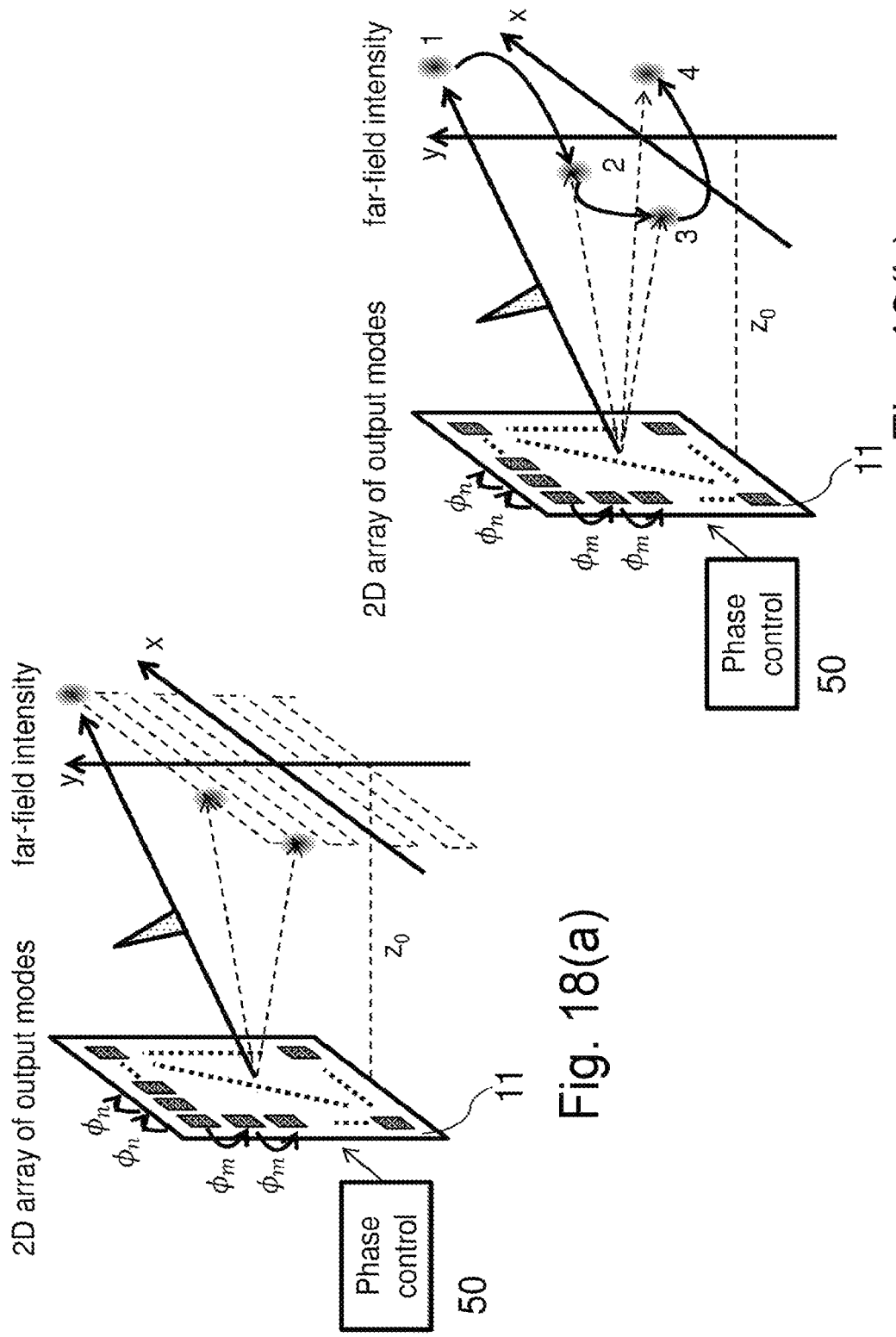
FIG. 18 (a) shows a schematic illustration of the position of the far field illuminated spot being linearly scanned over the field of view in the x direction by scanning the relative phase of neighbouring output pixels.
Figure 18D:
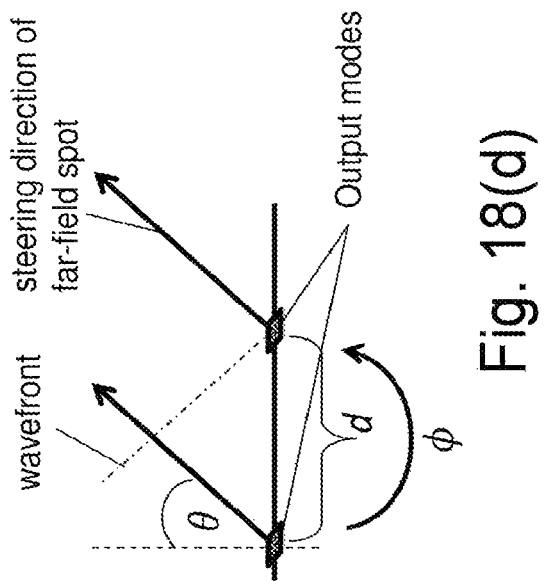
Figure 18C:
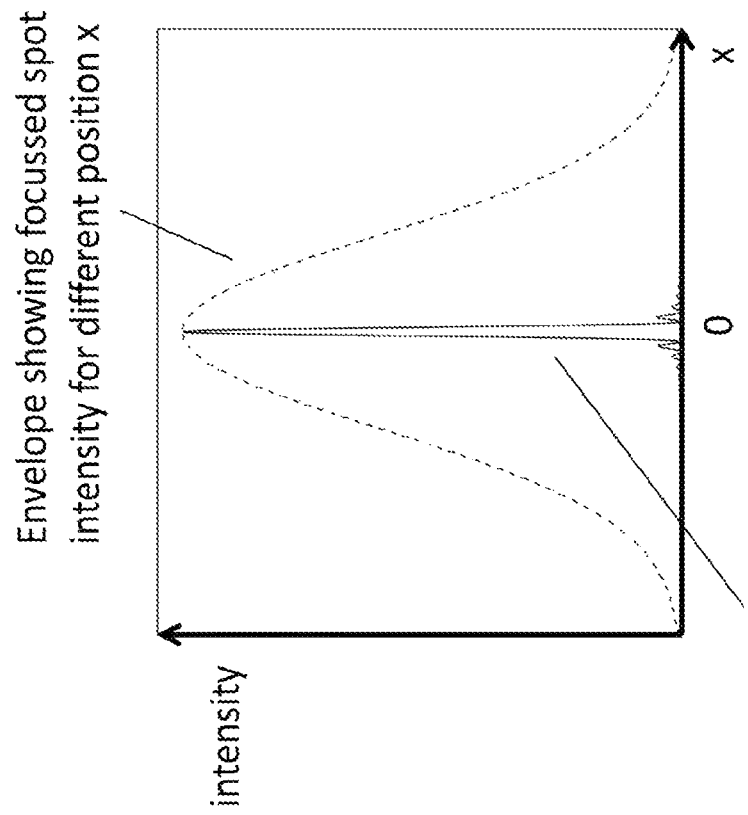
Figure 18E:
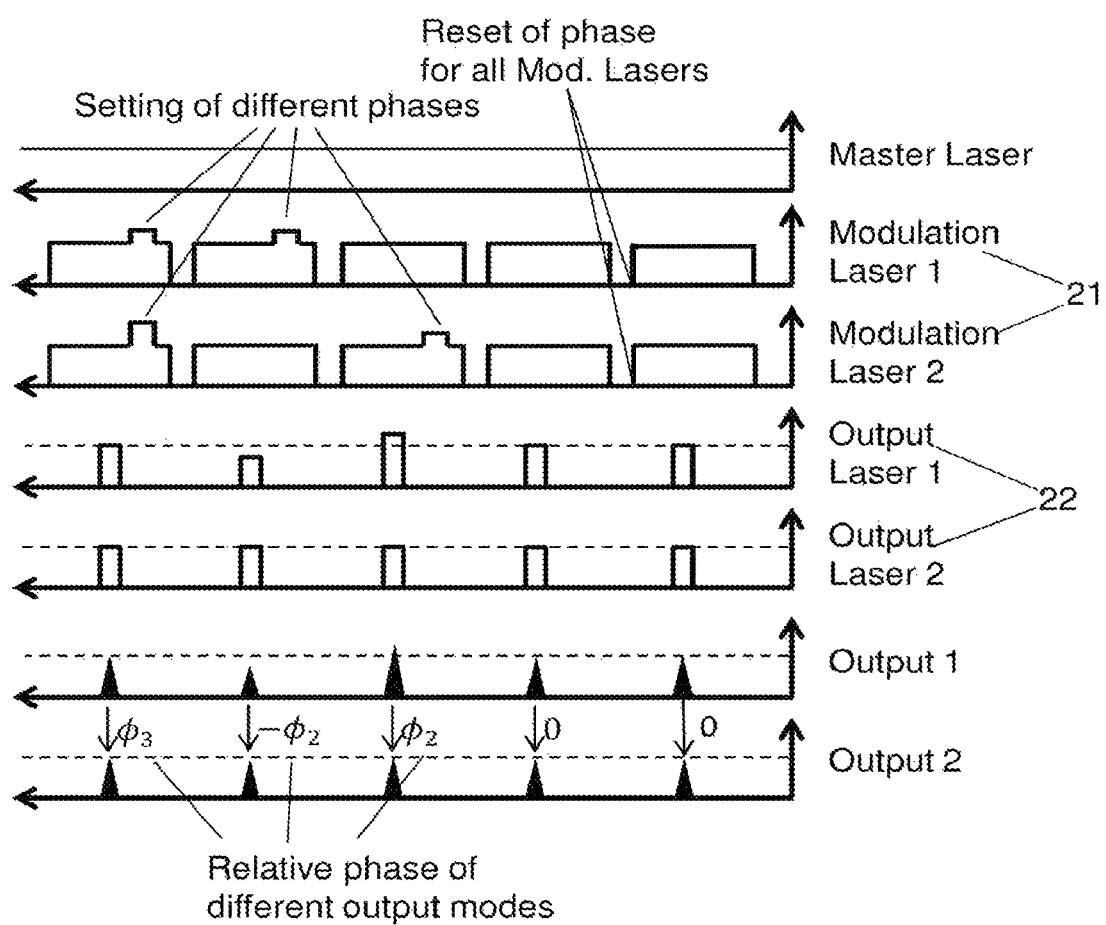

FIG. 18(a) shows the position of the far field illuminated spot being linearly scanned over the field of view in the x direction by scanning the relative phase of neighbouring output pixels. Change of $\phi_n$, i.e. the phase difference between neighbouring pixels in the x direction, steers the spot along the x-axis. Change of $\phi_m$, i.e. the phase difference between neighbouring pixels in the y direction, steers the spot along the y-axis. As can be seen in FIG. 18(a), in order to move the spot along the x-axis direction, the phase difference between each neighbouring pixel in the x-axis direction φn is varied. φn is the phase difference between the first pixel and the second pixel, and also the phase difference between the second pixel and third pixel in a row, and so on. This means that the phase difference between the first pixel and third pixel is $2\phi_n$. The phase control applied by the first controller 50 to the modulation lasers 21 is controlled to vary the phase difference between the neighbouring pixels. Phases $\phi_m$ and $\phi_n$ are varied independently in this case, such that the far-field spot is linearly scanned over a far-field plane as shown.

FIG. 18(b) shows the case where the position of the far field illuminated spot is randomly scanned over the field of view by a pre-defined pattern. The scanning is controlled by the first controller 50. Phases $\phi_m$ and $\phi_n$ are varied according to a pre-defined sequence such that the far-field spot is randomly scattered over a far-field plane in this case.

Phase control of the modulation lasers 21 in the array is used to scan the position of the far-field illuminated spot over an area. For a regularly spaced array, the position along the far-field x-axis, which is matched to the 2D array x-axis, is controlled by varying the relative phase $\phi_n$ of neighboring output modes along the x-axis in the array. The position along the far-field y-axis is controlled by varying the relative phase $\phi_m$ of neighboring output modes along the y-axis in the array.

As the beam is scanned away from the central, 0 order, location, the intensity of the beam will decrease according to the envelope shown in FIG. 18(c). In order to maintain a constant beam intensity, the intensity of the master laser 20, modulation lasers 21 and/or output lasers 22 can be controlled to compensate for any change in intensity caused by the scanning.

Furthermore, since each pixel corresponds to at least one separate laser or optical amplifier (modulation laser 21 and/or output laser 22), the intensity of the individual pixels can be individually controlled. Since multiple lasers/optical amplifiers are used, higher overall output power may also be obtained.

FIG. 18 (e) shows an operation mode which may be used to control the scanning in a LIDAR system for example (described in further detail below). In the phase-locked laser array, the master laser 20 runs continuously. The modulation lasers 21 are turned off before each emission cycle to reset the phase to the phase of the master laser. The phase of the modulation lasers 21 is controlled by modulating the applied current with variable amplitude as described previously. Subsequently, the gain-switched output lasers 22 are driven with variable amplitude and delay to generate laser pulses with controlled relative phase, amplitude and delay in different output modes from the array. The emission times can be seen as running from the right to left direction in this figure, such that the small perturbation applying the phase shift is applied to the modulation lasers 21 at the start of the current pulse, and the output lasers 22 generate a current pulse at a time when the middle section of the coherent light pulse is received (i.e. when the phase shifted coherent light pulse is received).

As can be seen, for the first two sets of pulses, no phase shift is applied at the first modulation laser and the phase difference between the pulses emitted at the output lasers is 0. In reality, some phase shift may need to be applied at one of the modulation lasers to compensate for any phase offset between the output pulses, for example caused by difference in emission times at the output lasers. This may be determined in a calibration run as described previously. For simplicity, it is assumed here that all path lengths and emission times are equal. For the third set of pulses, a phase shift is applied at the second modulation laser, resulting in a phase difference of $\phi_2$ between the pulse emitted from the first output laser and the pulse emitted from the second output laser. For the fourth set of pulses, the same phase shift is applied at the first modulation laser instead, resulting in a phase difference of $-\phi_2$ between the pulse emitted from the first output laser and the pulse emitted from the second output laser. For the fifth set of pulses, the same phase shift is applied at the first modulation laser, and a larger phase shift is applied at the second modulation laser, resulting in a phase difference of $\phi_3$ between the pulse output from the first laser and the pulse output from the second laser.

Optical phased-arrays (OPA) such as those described above set appropriate values for the relative phases between said output lasers 22 (by controlling the phase applied at the modulation lasers 21). This results in moving of the far-field laser spot, which can be used to perform scanning of a target. Optical phased-arrays operate by having an array of optical elements configured to emit light, wherein the light emitted by each element has a controllable relative phase with respect to the others. By choosing appropriate relative phases, the resulting combined light may for example travel in different directions. By dynamically changing the relative phases in time, the laser spot may be scanned over a target.

Since all output modes from the 2D array are phase-locked, this enables engineering of the phase front for laser pulses emitted from the array.

The emission time for all output modes may be synchronized, such that each pixel emits light simultaneously. When interference of all output modes occurs (i.e. when they emit at substantially the same time) the array will emit a single laser pulse to a confined position in the far-field, which can be controlled by setting the relative phases of all output lasers in the array (by controlling the relative phase of the modulation lasers 21).

An OPA is thus implemented using the source array 10 and the emitter array 11 described above. The relative phases can be set using the source array. Using phase modulation to move the laser spot means moving mechanical need not be used, which results in a robust apparatus with a low sensitivity to vibrations, and a high scanning speed, and a compact arrangement may be achieved. Furthermore, adaptive scanning may be performed, where the desired target position is required to take jumps in arbitrary directions. The device may quickly move the target laser position to different points of interest in a scene.

As well as controlling the location of the far-field spot, the far-field intensity pattern may also be controlled. Phase control (via the first controller 50) and amplitude control (via the second controller 60, or additionally or alternatively via modulation lasers 21) of output modes in the array enables control over the far-field intensity pattern. This may be utilized for different versions of flash-based LiDAR, where not only a single spot has to be illuminated with a laser pulse, but a larger area.

As described above, the size of the far-field spot is inversely proportional to the array area. Amplitude control of the output modes enables deactivation of certain areas of the array, effectively changing the array active size. This enables switching from strongly localized illumination on a single spot to diffuse wide angle illumination of a large area in the far field. This may be used for Flash LiDAR with a spatially resolving detector for example. FIG. 18(*g*) shows how the size of the far-field illuminated spot is varied by controlling the intensity of individual pixels in the array. Reduction of the effective active area of the array leads to larger spot size. This may allow for illumination of the entire scene with a single light pulse, utilised in flash LiDAR for example.

Phase control of the output modes may also enable the generation of complex far-field illumination patterns, by control of the phase patterns between the pixels. In order to generate different patterns, the phase difference between light emitted from different sets of neighbouring pixels is varied. This may enable illumination of irregular areas in the far field. This may be utilized for flash LiDAR based on structured illumination, operating with a single pixel detector. FIG. 18(*f*) shows amplitude and phase control for all pixels, enabling the generation of custom illumination patterns instead of a single spot.

Although for a regular array and for scanning of a beam, a required phase shift to be applied may be calculated from the above described expressions, for irregular arrays, and/or for formation of irregular far-field patterns, the phase shifts required in order to generate the required far-field shape and location may be determined numerically through optimisation techniques.

LiDAR is an imaging method which is capable of measuring a distance to a target by illuminating the target with a pulse of light from a laser. When light impinges upon an object, some of the incident light is back scattered (or reflected) towards a sensor of the Lidar system, which is capable of measuring the properties of the received pulse of light. As only a fraction of the incident light is reflected towards the sensor, the intensity of the measured pulse of light is lower that the intensity of the transmitted pulse of light.

Figure 19:
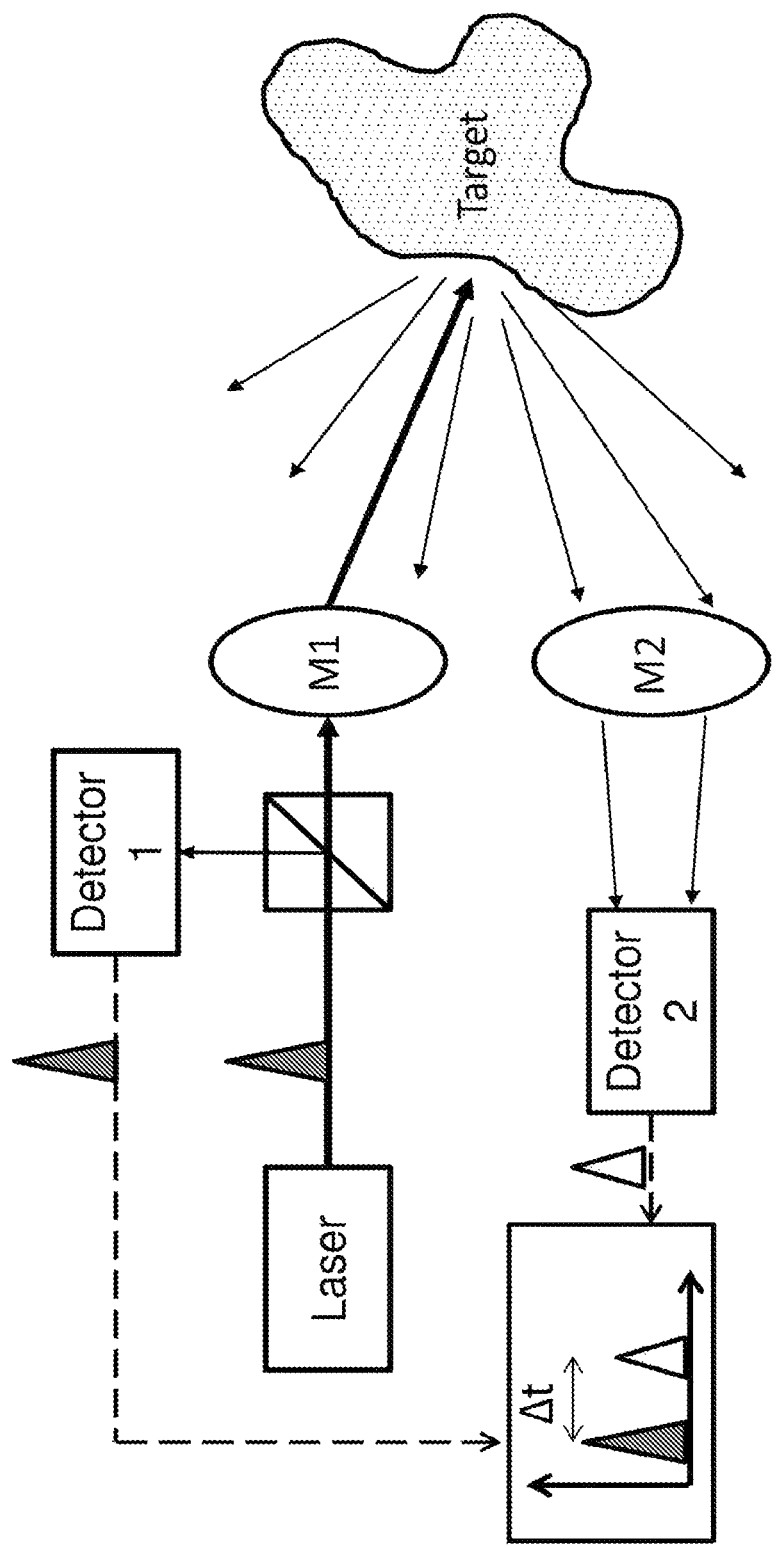
FIG. 19 shows the schematic illustration of an example of a conventional LiDAR system.

In time of flight (ToF) LiDAR, the time delay between the emitted pulse and the detection of the reflected pulse is used to determine the distance from the sensor to the target, the distance being $\frac{1}{2} \cdot c \cdot \Delta t$, where c is the speed of light in air ($3 \times 10^8$ m/s), and $\Delta t$ is the time delay between the emitted and received pulses. The pulse of light may be focused to a laser spot that is small compared to the target; this provides higher resolution and lower measurement uncertainties. As a result, the reflection of the spot yields distance information about a small region of the target only. To obtain information about the entire target, the laser spot is scanned over the area of the target; that is, the laser spot is moved to a point of the target, distance information for that point is acquired, the laser is then moved to another point, distance information for that other point is also acquired, and this is repeated until distance information about the entire target is acquired. An example of a LiDAR system is illustrated in FIG. 19.

For operation of the array in LiDAR mode, single laser pulses with a high number of photons per pulse may be emitted to a specific far-field position.

Figure 20:
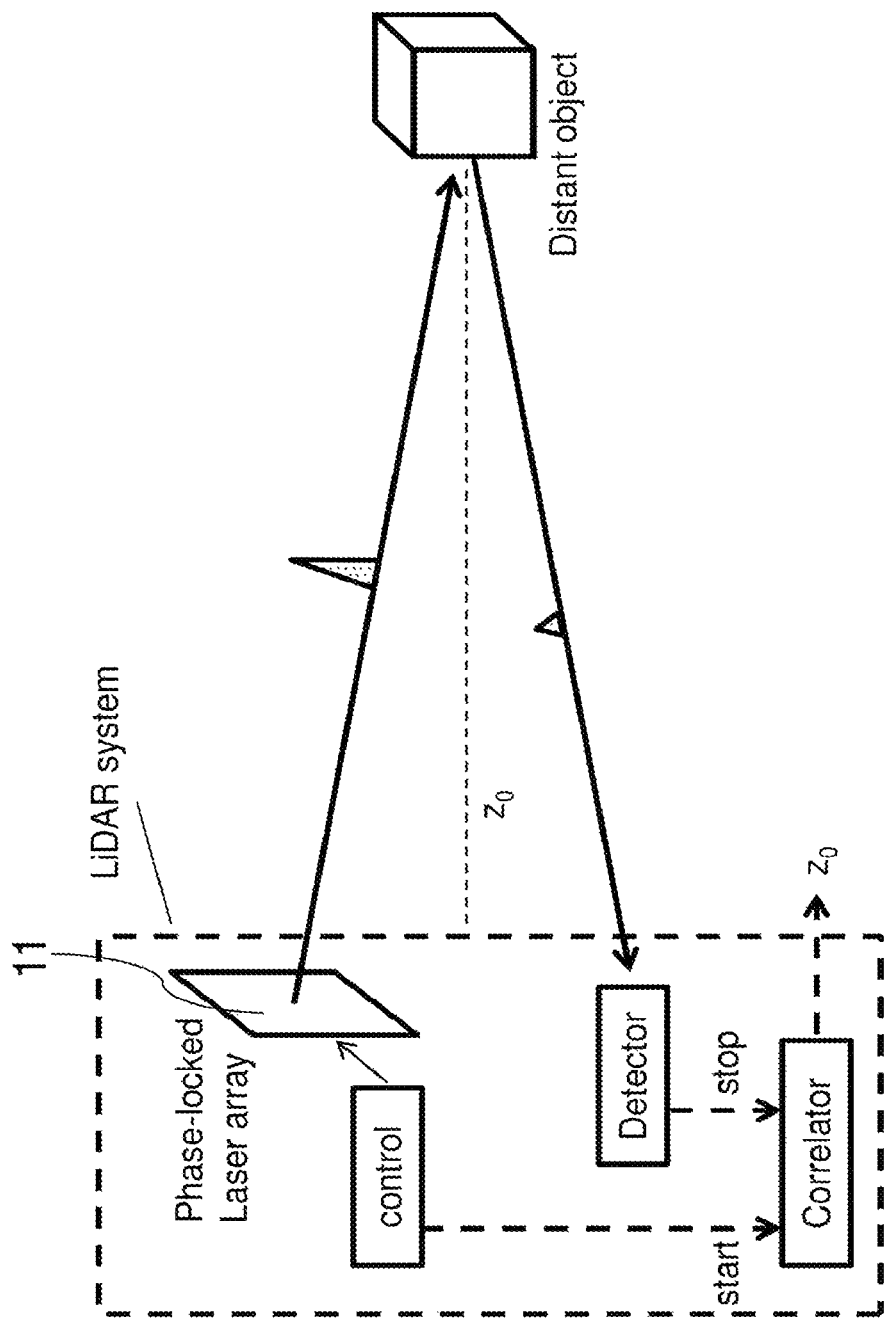
FIG. 20 shows a schematic illustration of a LiDAR system in which the optical device comprising the source array and emitter array are used to generate a pulse of light.

FIG. 20 shows a LiDAR system in which the optical device comprising the source array 10 and emitter array 11 are used to generate a pulse of light. The phase-locked laser array is used to send a laser pulse to a distant object at a distance $z_0$ from the system. A fraction of the light pulse is reflected back to the system where the arrival time of the laser pulse is measured with a detector. The overall time-of-flight $\Delta t$ of the pulse is derived by correlation of the arrival time with the control pulse triggering the emission from the array. The distance of the object from the system is calculated as $z_0 = c\Delta t/2$.

Figure 21:
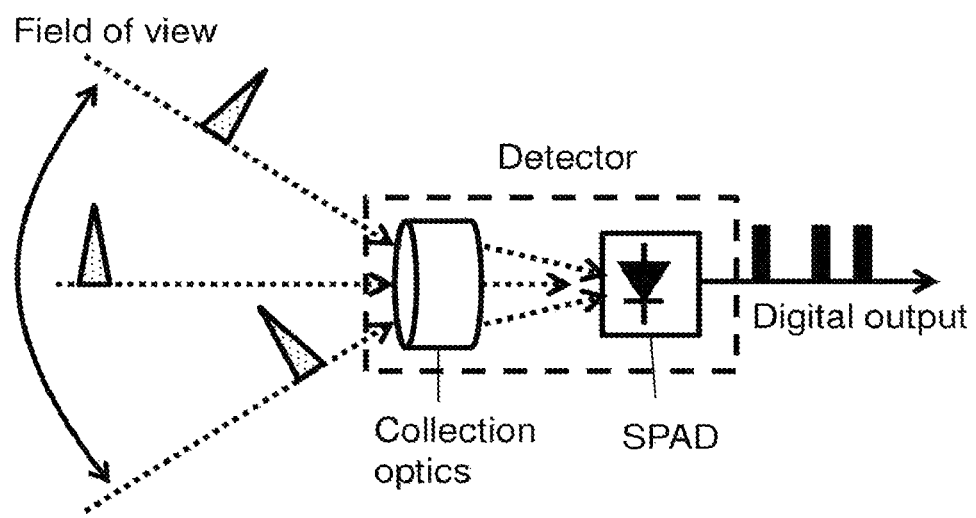
FIG. 21 shows a schematic illustration of a detector according to an embodiment.

The detector used in the LiDAR system may be a fast single photon avalanche photodiode (SPAD). The SPAD can either be operating in linear mode or in Geiger mode. Collection optics may be used to collect light from a large field of view and focus it onto the single SPAD. The collection optics may comprise focusing optics, for example one or more focusing lenses. FIG. 21 shows an example detector configuration in more detail.

A discriminator circuit is used to generate a digital output signal with precise timing for each photon pulse that is detected.

For a flash LiDAR system, the single SPAD may be replaced with an array of SPADs and the collection optics might be replaced with imaging optics for example. This provides spatial and timing resolution for detected laser pulses. A single laser pulse is emitted and directed to a distant object using the in-plane phase-locked laser array.

The size of the illumination spot may be broadened as described in relation to FIG. 18 (g). A fraction of the pulse is reflected and measured with a detector located close to the laser array. The distance $z_O$ of the object is extracted via the time-of-flight of the light pulse, measured by a start-stop correlation between light pulse emission and light pulse detection by each element of the array of SPADs.

Although an application to a LiDAR device has been described above, the optical device may alternatively be used in a quantum communication system. For example, the optical device may be used in a transmitter for a quantum key distribution (QKD) system, for example a free space QKD system such as a satellite QKD system.

According to one example, a differential-phase shift QKD (DPS-QKD) protocol is used to encode the bit values into the phase difference between subsequent light pulses of a sequence of coherent light pulses. The first controller 50 may set the differential phase between subsequent light pulses. For example, a phase difference of 0 between subsequent pulses may be associated with a bit value of 0, while a phase difference of π between subsequent pulses may be associated with a bit value of 1. The light pulses are transmitted to a quantum receiver which detects the phase difference between the coherent pulses received and decodes a bit value of 0 or 1. The security of DPS stems from the fact that if Eve ties to measure one pulse, she destroys the coherence between that pulse and its neighbour and this can be detected by Alice and Bob.

Figure 22A:
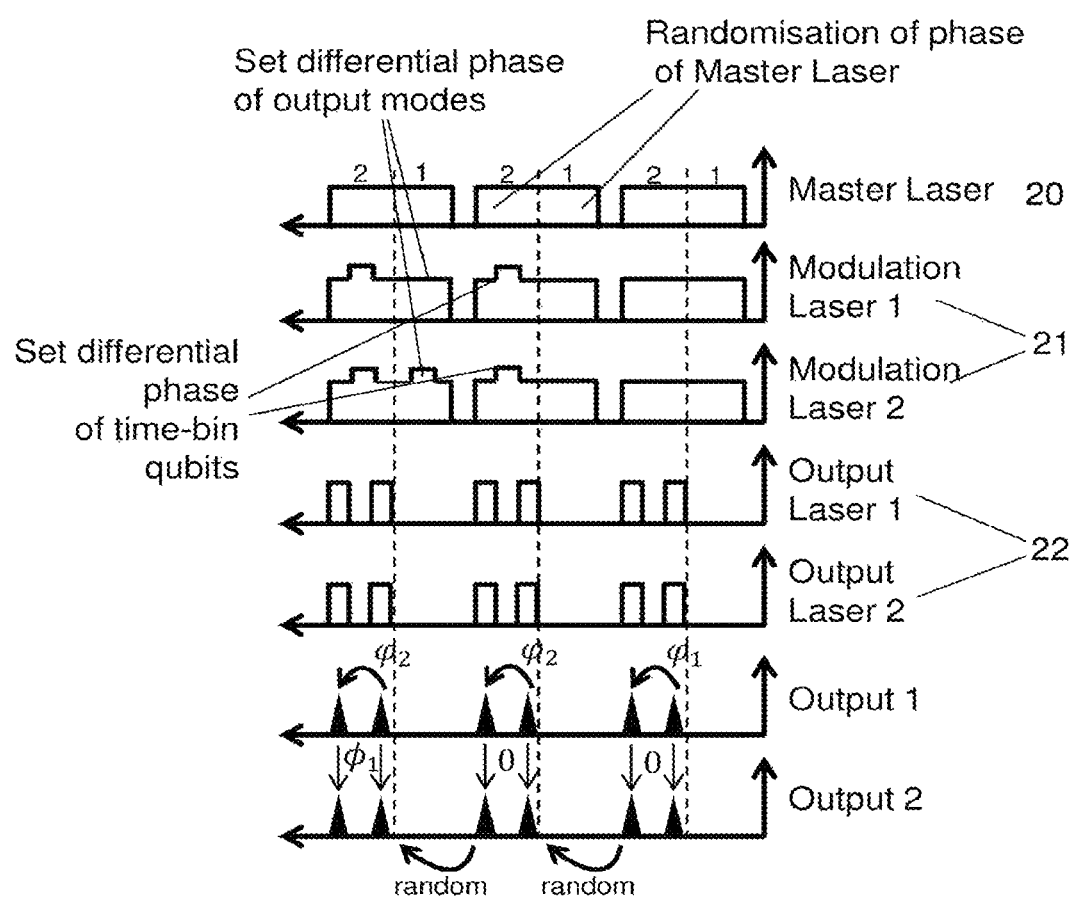
FIG. 22 (a) shows an operation mode which may be used to control the optical array for QKD.

For operation of the phase-locked laser array in QKD mode, the master laser 20 is turned off periodically to randomise the phase after each qubit emission cycle. An example operation is shown in FIG. 22(a). The master laser 20 emits long coherent light pulses. The phase of the modulation lasers 21 is controlled in two steps. In step 1, the relative phase ϕ between different output modes (i.e. different out-couplers) is set. This controls the location of the far-field beam. In step 2, the output lasers are driven with two subsequent pulses, generating a time-bin encoded qubit. The phases of all modulation lasers 21 in the array are changed synchronously in step 2, setting the relative phase φ of the two time-bins for encoding a desired qubit state, for example, according to the DPS-QKD protocol described above, across all the modulation lasers.

Figure 22B:
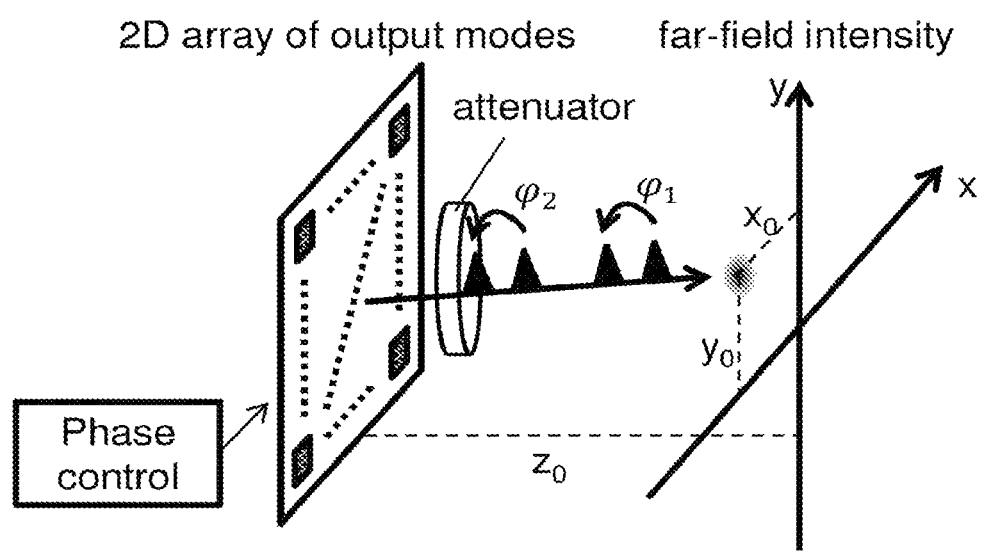
Figure 22C:
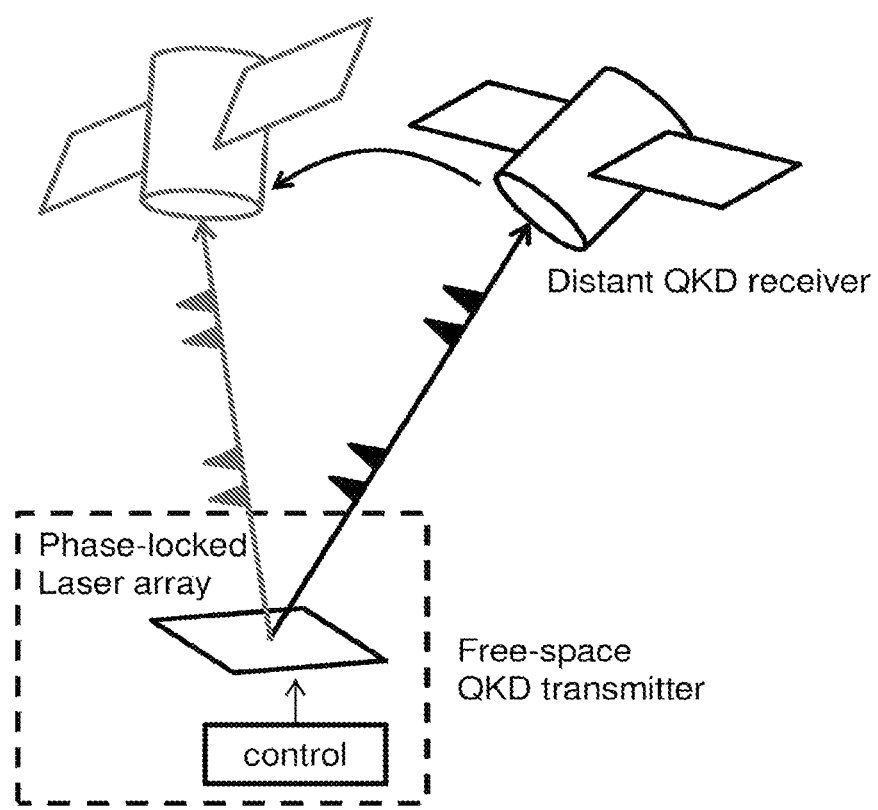

FIG. 22(b) shows an example QKD transmitter comprising a phase-locked laser array operating in QKD mode. The array transmits time-bin qubits to a non-static remote receiving station, such as a satellite, airplane or drone. FIG. 22(c) shows the system including the receiver. The beam steering function of the QKD transmitter array is used to keep the free-space quantum communication link between transmitter and receiver aligned. For operation of the array in QKD mode, single time-bins comprising two consecutive laser pulses that are carrying a differential phase are emitted to a specific far-field position. The time-bins are attenuated to the single-photon level using either integrated attenuators on chip or a single external attenuator covering the array.

While certain arrangements have been described, these arrangements have been presented by way of example only, and are not intended to limit the scope of the inventions. Indeed the methods and systems described herein may be embodied in a variety of other forms; furthermore, various omissions, substitutions and changes in the form of methods and systems described herein may be made.

The invention claimed is:

1. An optical device, comprising:
a first semiconductor substrate;
a reference laser, configured to generate coherent light;
a plurality of first optical components, wherein the reference laser is optically coupled to the plurality of first optical components, wherein each of the plurality of first optical components is configured to output coherent light during a period of time that coherent light from the reference laser is received;
a plurality of second optical components, the second optical components configured to produce optical intensity modulation, wherein each of the plurality of first optical components is optically coupled to at least one corresponding second optical component;
wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier;
one or more first controllers, configured to apply phase control signals to said plurality of first optical components to apply a phase shift;
one or more second controllers, configured to apply pulse control signals to said plurality of second optical components such that a light pulse is outputted during a period of time that coherent light is received, the relative phase between emitted light pulses from the plurality of second optical components being controlled by the relative phase shifts applied by the one or more first controllers;
wherein the reference laser, plurality of first optical components and plurality of second optical components are integrated laterally on the semiconductor substrate in the plane parallel to the surface of the substrate.

2. The optical device according to claim 1, wherein the one or more second controllers are further configured to modify said pulse control signal to vary the intensity of the emitted light pulses.

3. The optical device according to claim 1, wherein the first semiconductor substrate comprises InP.

4. The optical device according to claim 1, further comprising a 2 dimensional array of optical out-couplers, optically connected to the plurality of second optical components, wherein the optical out-couplers are configured to output light in a direction having a component perpendicular to the surface of the first substrate.

5. The optical device according to claim 4, wherein the out-couplers comprise optical grating regions.

6. The optical device according claim 4, wherein the out-couplers comprise waveguides having a first section aligned in the plane parallel to the surface of the substrate and curving to form a second section aligned in a direction perpendicular to the surface of the first substrate.

7. The optical device according to claim 4, wherein the out-couplers are integrated on the first semiconductor substrate.

8. The optical device according to claim 4, wherein the out-couplers are integrated on a second semiconductor substrate.

9. The optical device according to claim 4, wherein the optical out-couplers are arranged in a random array.

10. The optical device according to claim 4, wherein the optical out-couplers are arranged in a regular array.

11. The optical device according to claim 1, wherein the phase control signals comprise electrical signals.

12. The optical device according to claim 2 wherein the intensity of the emitted light pulses is modulated at frequencies greater than or equal to 1 GHz.

13. The optical device according to claim 1 wherein the position of the far-field light emitted from the device is controlled by the phase control signals.

14. The optical device according to claim 2, wherein the size of the far-field light pattern emitted from the device is controlled by varying the intensity of the emitted light pulses.

15. The optical device according to claim 1, wherein the shape of the far-field light pattern emitted from the device is controlled by the phase control signals.

16. A system comprising the optical device according to claim 1, and further comprising a detector unit configured to detect reflected light from an object, and means to determine the distance of the object from the detection.

17. The system of claim 16, wherein the system is a LiDAR system.

18. A quantum communication system, comprising the optical device of claim 1.

19. A method of fabricating an optical device, comprising the steps of:
   forming a reference laser, configured to generate coherent light, a plurality of first optical components, wherein the reference laser is optically coupled to the plurality of first optical components and a plurality of second optical components, the second optical components configured to produce optical intensity modulation, wherein each of the plurality of first optical components is optically coupled to at least one corresponding second optical component, wherein the reference laser, plurality of first optical components and plurality of second optical components are integrated laterally on the semiconductor substrate in the plane parallel to the surface of the substrate,
   wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier;
   electrically contacting first electrodes to the first optical components, wherein the first electrodes are connected to one or more first controllers, configured to apply phase control signals to said plurality of first optical components to apply a phase shift and to control the first optical components such that each of the plurality of first optical components is configured to output coherent light during a period of time that coherent light from the reference laser is received; and
   electrically contacting second electrodes to the second optical components, wherein the second electrodes are connected to one or more second controllers, configured to apply pulse control signals to said plurality of second optical components such that a light pulse is outputted during a period of time that coherent light is received, the relative phase between the emitted light pulses from the plurality of second optical components being controlled by the relative phase shifts applied by the one or more first controllers.

20. A method of operating an optical device, comprising:
   generating coherent light at a reference laser;
   supplying said coherent light to a plurality of first optical components;
   applying phase control signals to said plurality of first optical components to apply a phase shift;
   outputting coherent light from each of the plurality of first optical components during a period of time that coherent light from the reference laser is received;
   supplying said coherent light from each of the plurality of first optical components to at least one corresponding second optical component configured to produce optical intensity modulation;
   applying pulse control signals to said plurality of second optical components such that a light pulse is outputted during a period of time that coherent light is received, the relative phase between the emitted light pulses from the plurality of second optical components being controlled by the relative phase shifts applied by the one or more first controllers;
   wherein the plurality of first optical components each comprises a laser, an optical amplifier or a phase modulator, and the plurality of second optical components each comprises a laser, an optical amplifier or an intensity modulator, and wherein when a first optical component comprises a laser or an optical amplifier the at least one corresponding second optical component comprises a laser, an optical amplifier or an intensity modulator, and wherein when a first optical component comprises a phase modulator the at least one corresponding second optical component comprises a laser or an optical amplifier; and
   wherein the reference laser, plurality of first optical components and plurality of second optical components are integrated laterally on a first semiconductor substrate in the plane parallel to the surface of the substrate.

* * * * *